United States Patent [19]
Yoshii et al.

[11] Patent Number: 6,147,724
[45] Date of Patent: Nov. 14, 2000

[54] BACK LIGHT SYSTEM FOR MINIMIZING NON DISPLAY AREA OF LIQUID CRYSTAL DISPLAY DEVICE

[75] Inventors: Yoshiomi Yoshii; Masahiko Suzuki; Kenichi Iwamoto, all of Mobara; Tsutomu Isono, Ohtaki; Yuji Yamakawa, Okinawa-ken, all of Japan

[73] Assignees: Hitachi, Ltd., Tokyo; Hitachi Device Engineering Co., Ltd., Chiba-ken, both of Japan

[21] Appl. No.: 09/030,083

[22] Filed: Feb. 25, 1998

[30] Foreign Application Priority Data

Apr. 4, 1997 [JP] Japan .................................. 9-086283

[51] Int. Cl.[7] ...................... G02F 1/1335; G02F 1/1333
[52] U.S. Cl. .................. 349/62; 349/61; 349/58
[58] Field of Search ................. 349/61, 62, 70, 349/58

[56] References Cited

U.S. PATENT DOCUMENTS

| | | | |
|---|---|---|---|
| Re. 35,142 | 1/1996 | Kikuchi et al. | 313/594 |
| 5,375,005 | 12/1994 | Komano | 359/48 |
| 5,640,216 | 6/1997 | Hasegawa et al. | 349/58 |
| 5,739,879 | 4/1998 | Tsai | 349/62 |
| 5,886,759 | 3/1999 | Mashino et al. | 349/65 |
| 5,946,062 | 8/1999 | Hasegawa et al. | 349/58 |
| 6,016,175 | 1/2000 | Kim | 349/58 |
| 6,034,750 | 3/2000 | Rai et al. | 349/57 |

FOREIGN PATENT DOCUMENTS 6-243833  9/1994  Japan .

*Primary Examiner*—Kenneth Parker
*Assistant Examiner*—Mike Qi
*Attorney, Agent, or Firm*—Antonelli, Terry, Stout & Kraus, LLP

[57] ABSTRACT

A flat cable including a conductive foil and insulating films is used for the lamp cable that supplies voltage to the fluorescent tube to reduce the installation space of the lamp cable and thereby to reduce the picture-frame area of the liquid crystal display device.

3 Claims, 49 Drawing Sheets

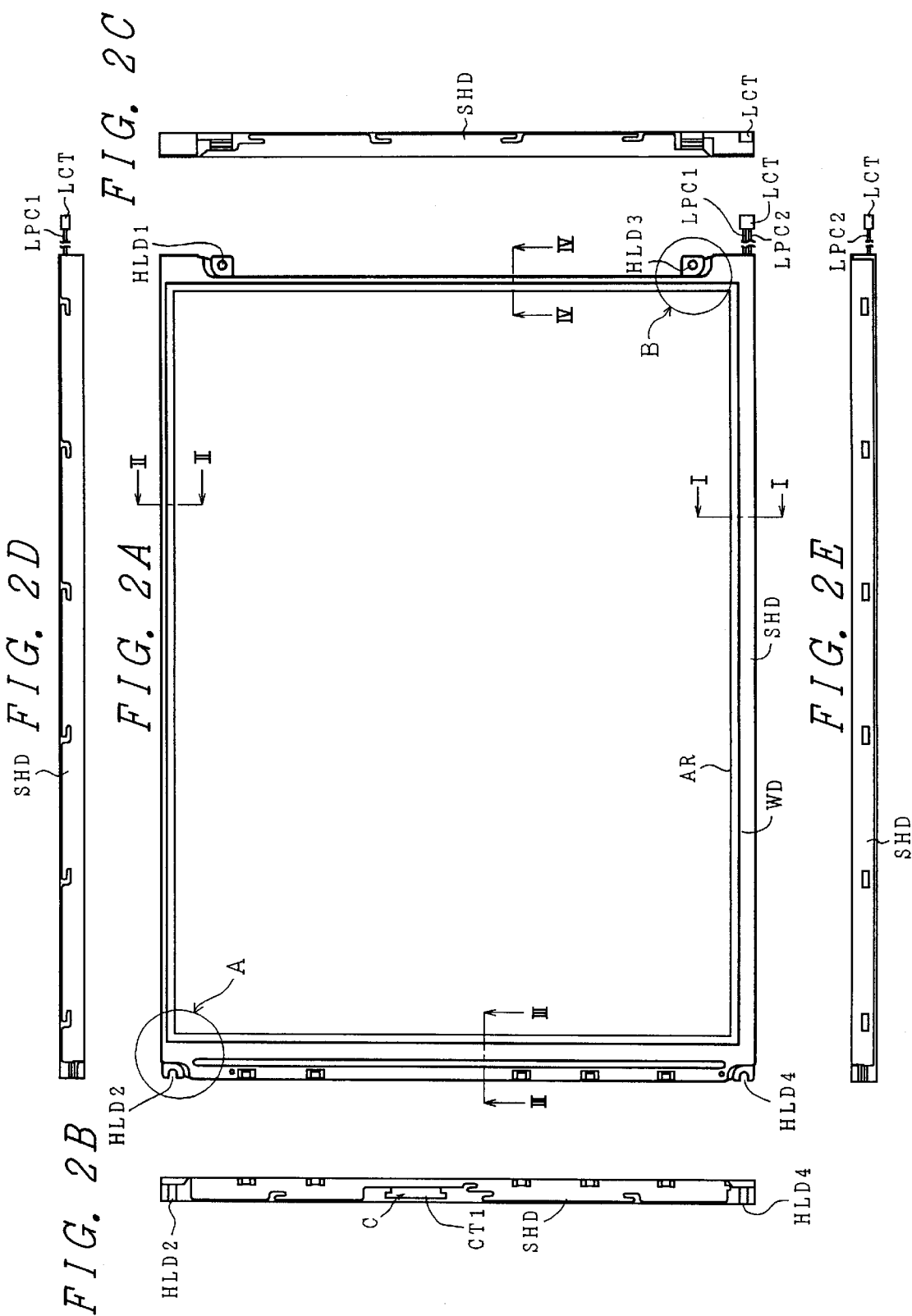

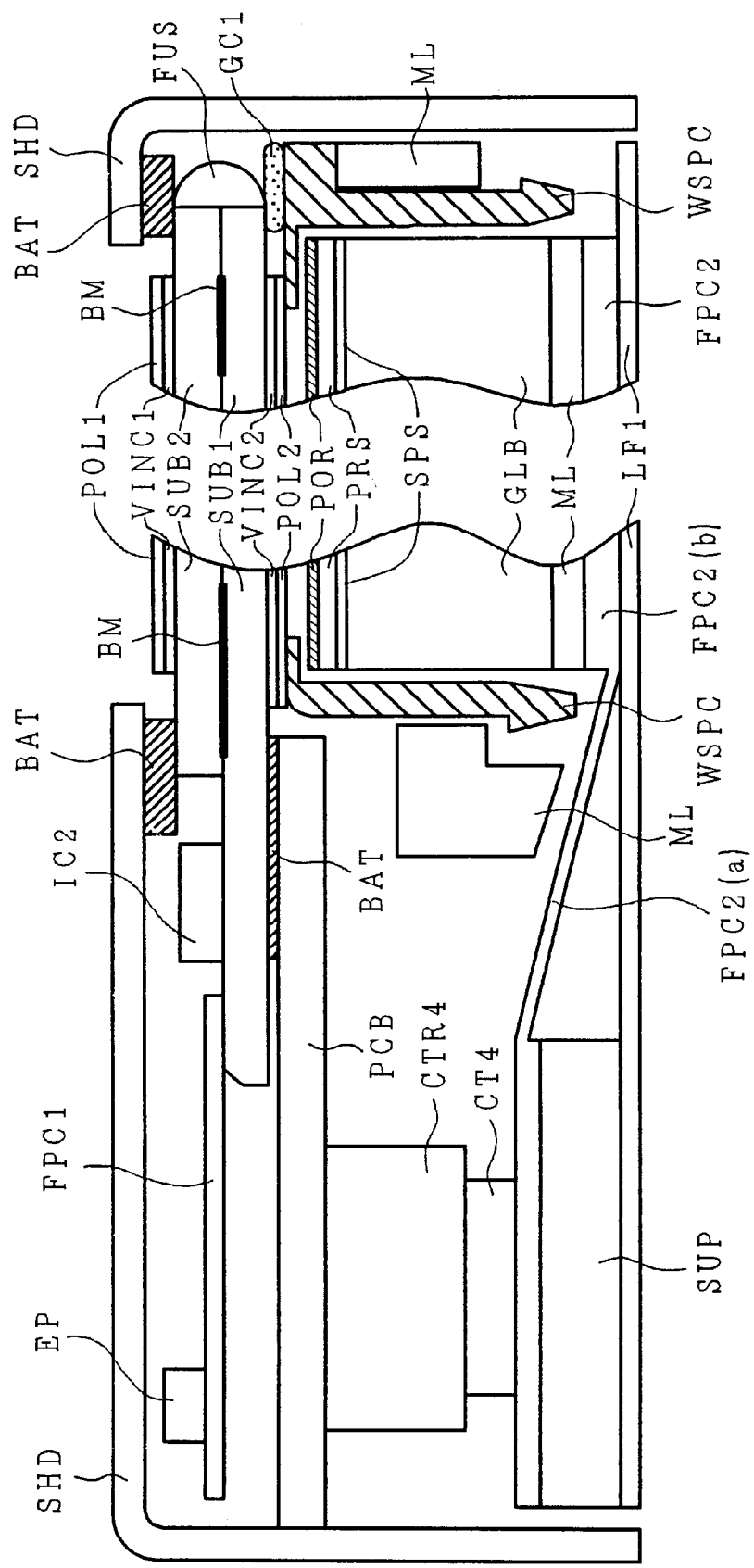

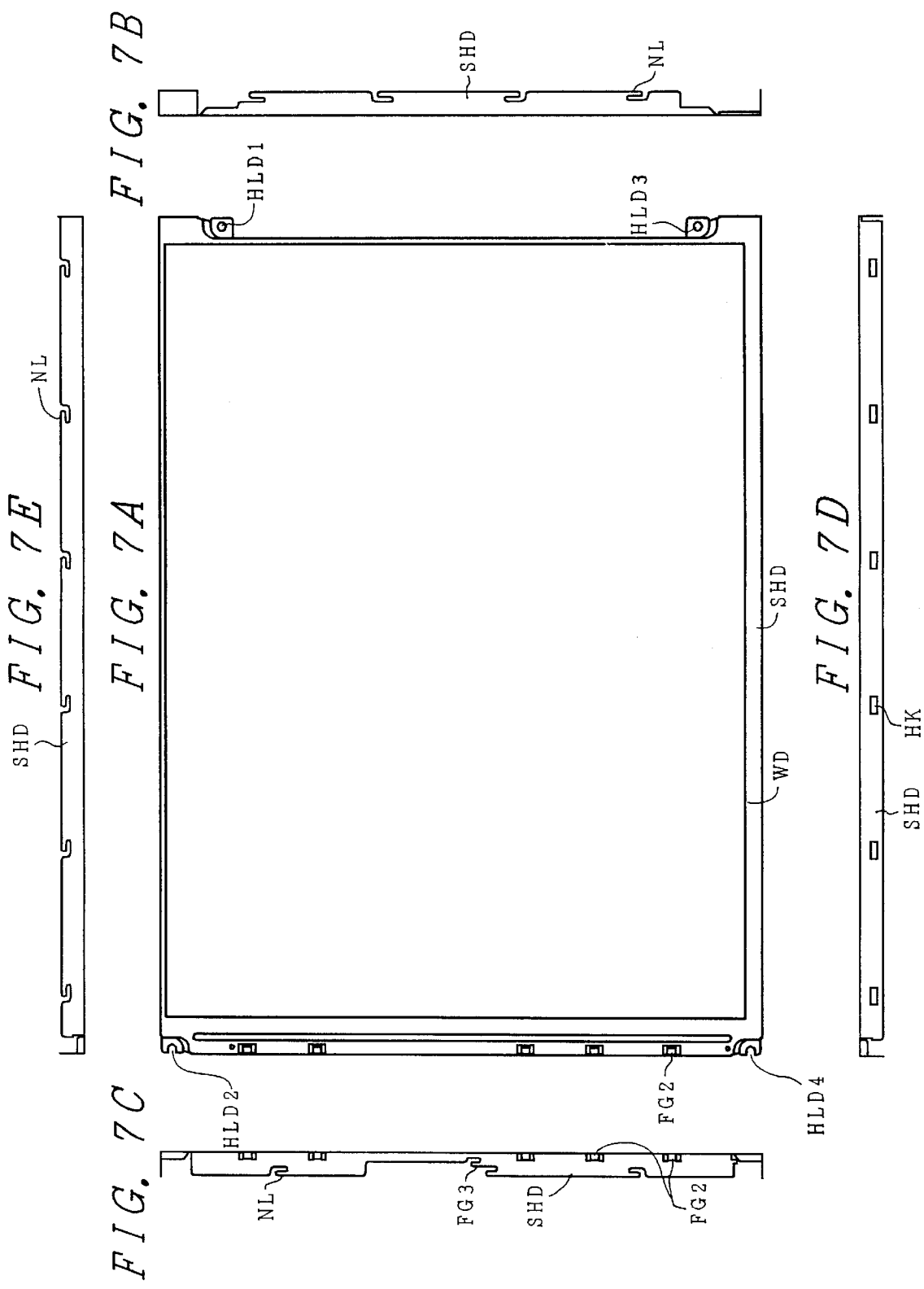

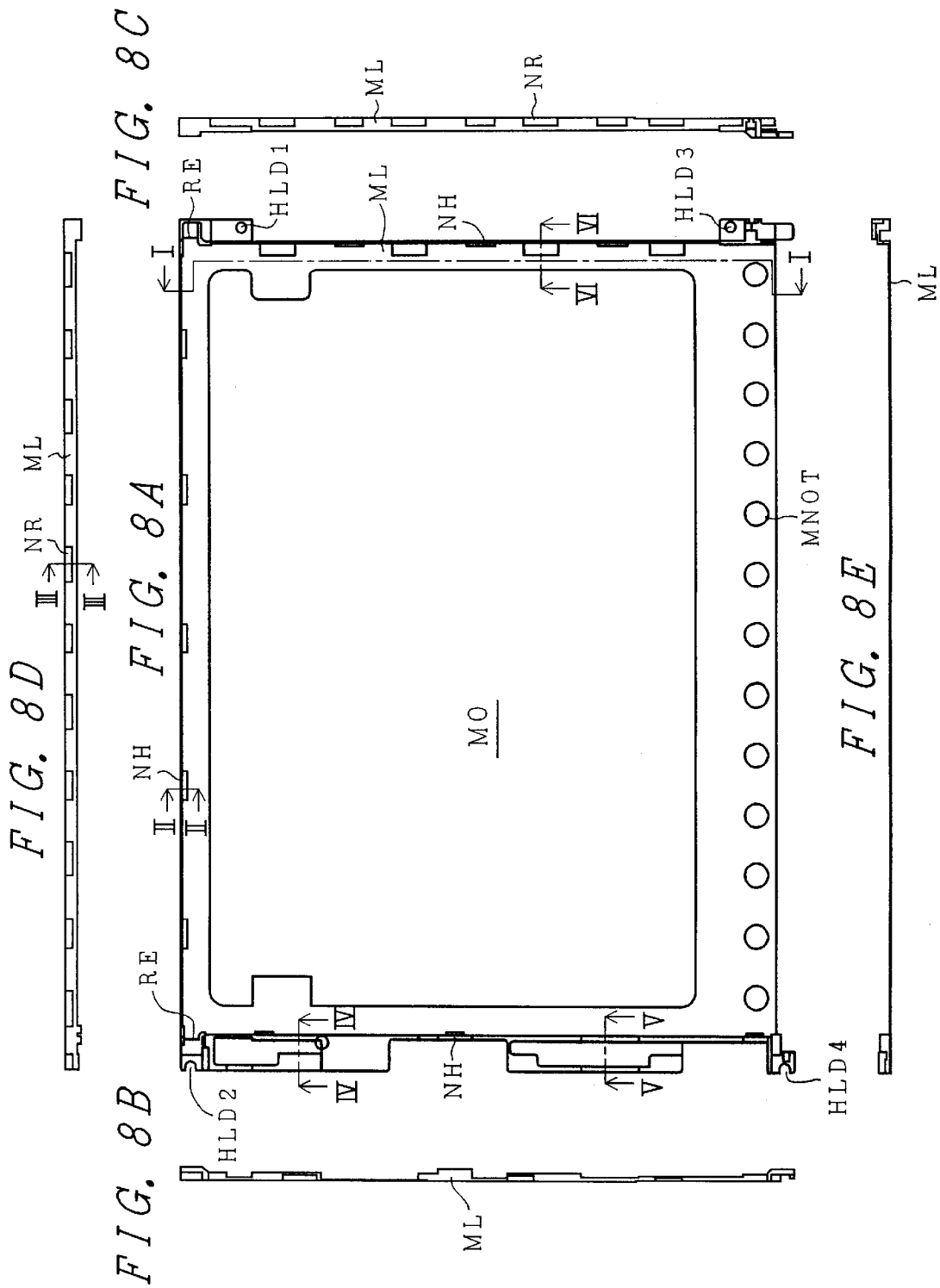

FIG. 10A
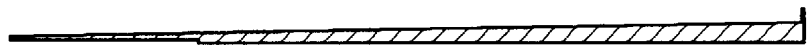
FIG. 10B     FIG. 10C
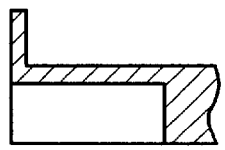   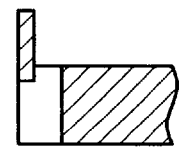
FIG. 10D     FIG. 10E
   
FIG. 10F     FIG. 10G
   

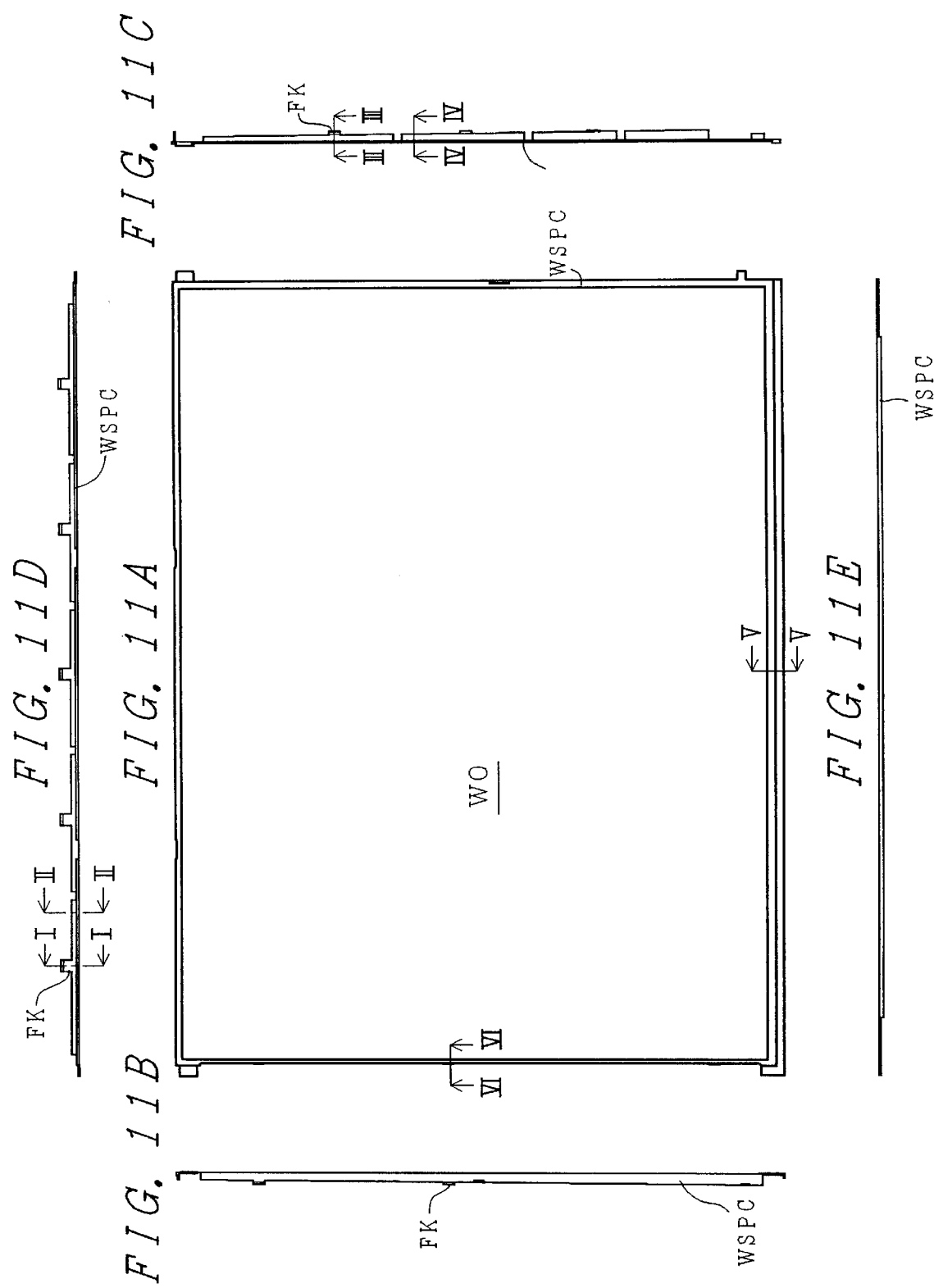

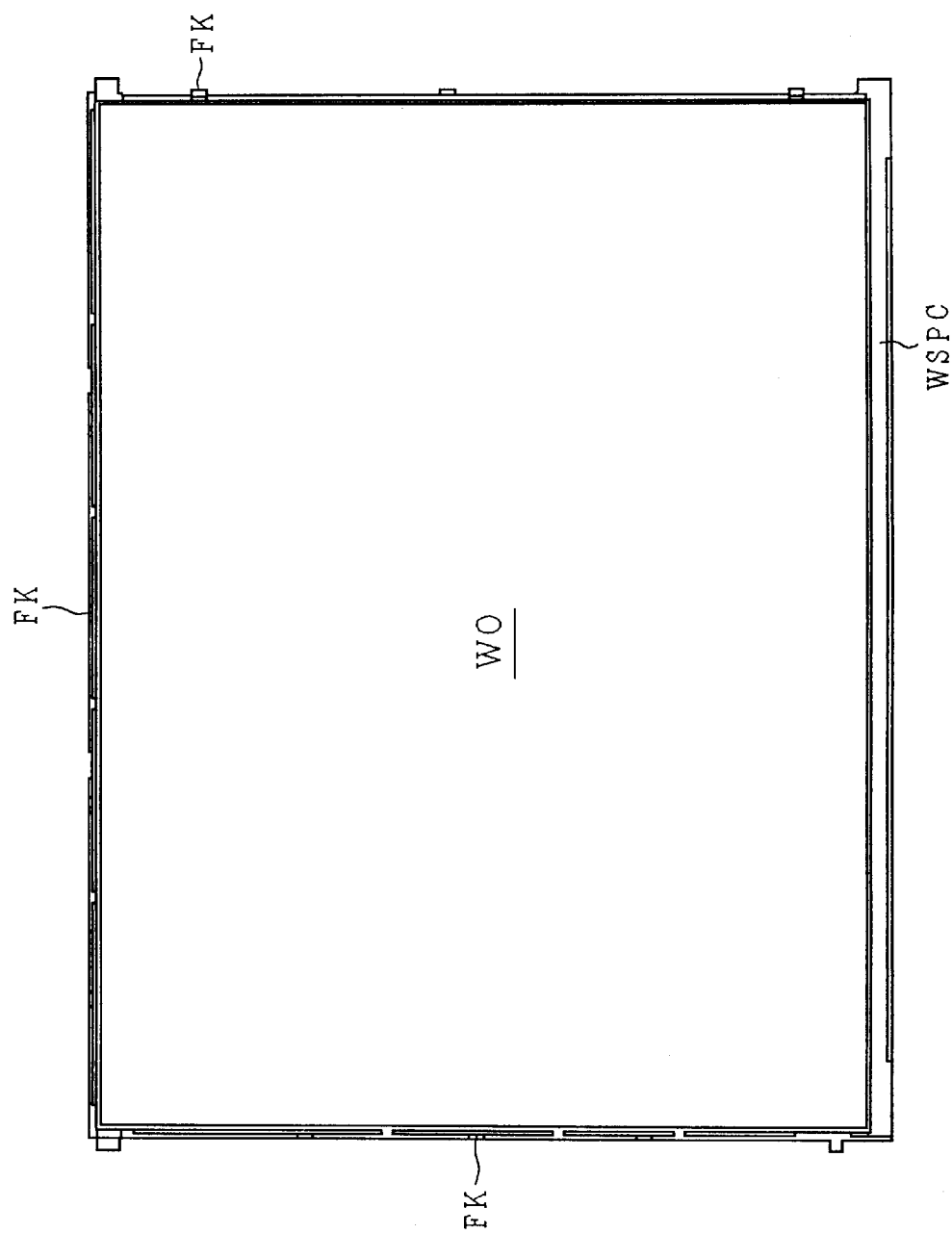

FIG. 13A  FIG. 13B
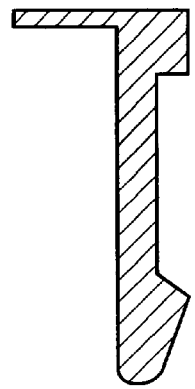 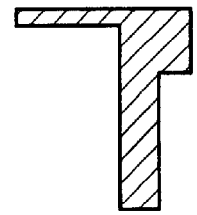
FIG. 13C  FIG. 13D
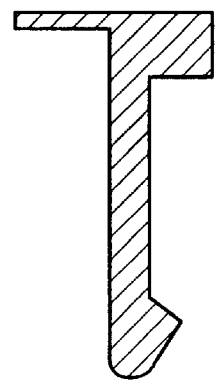 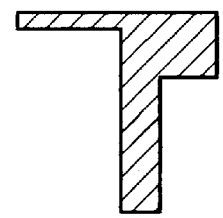
FIG. 13E  FIG. 13F
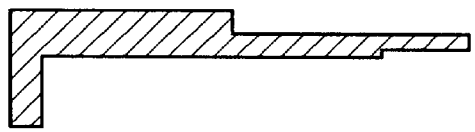 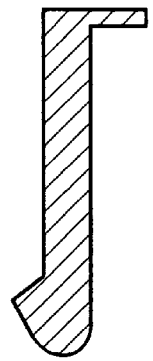

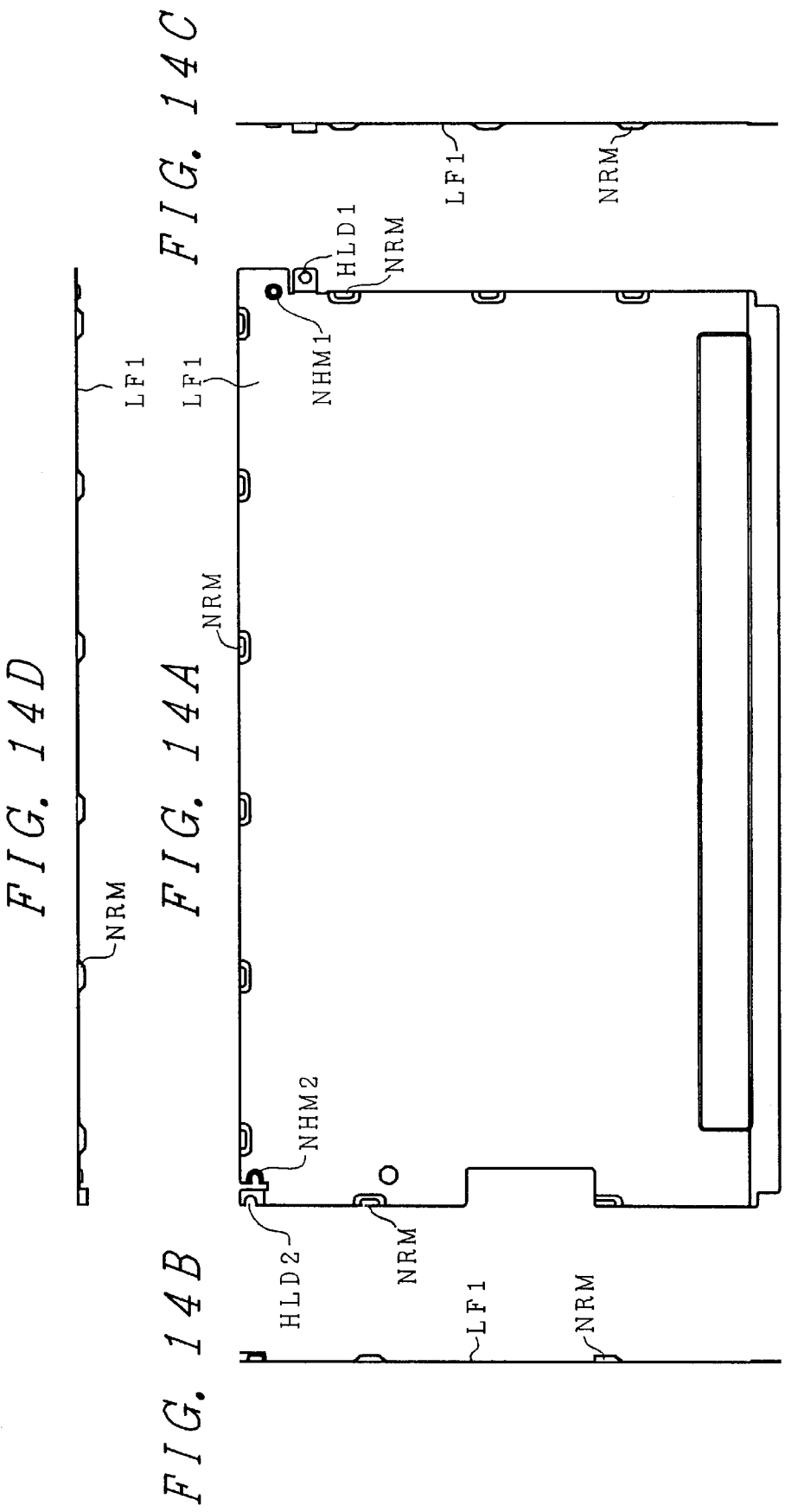

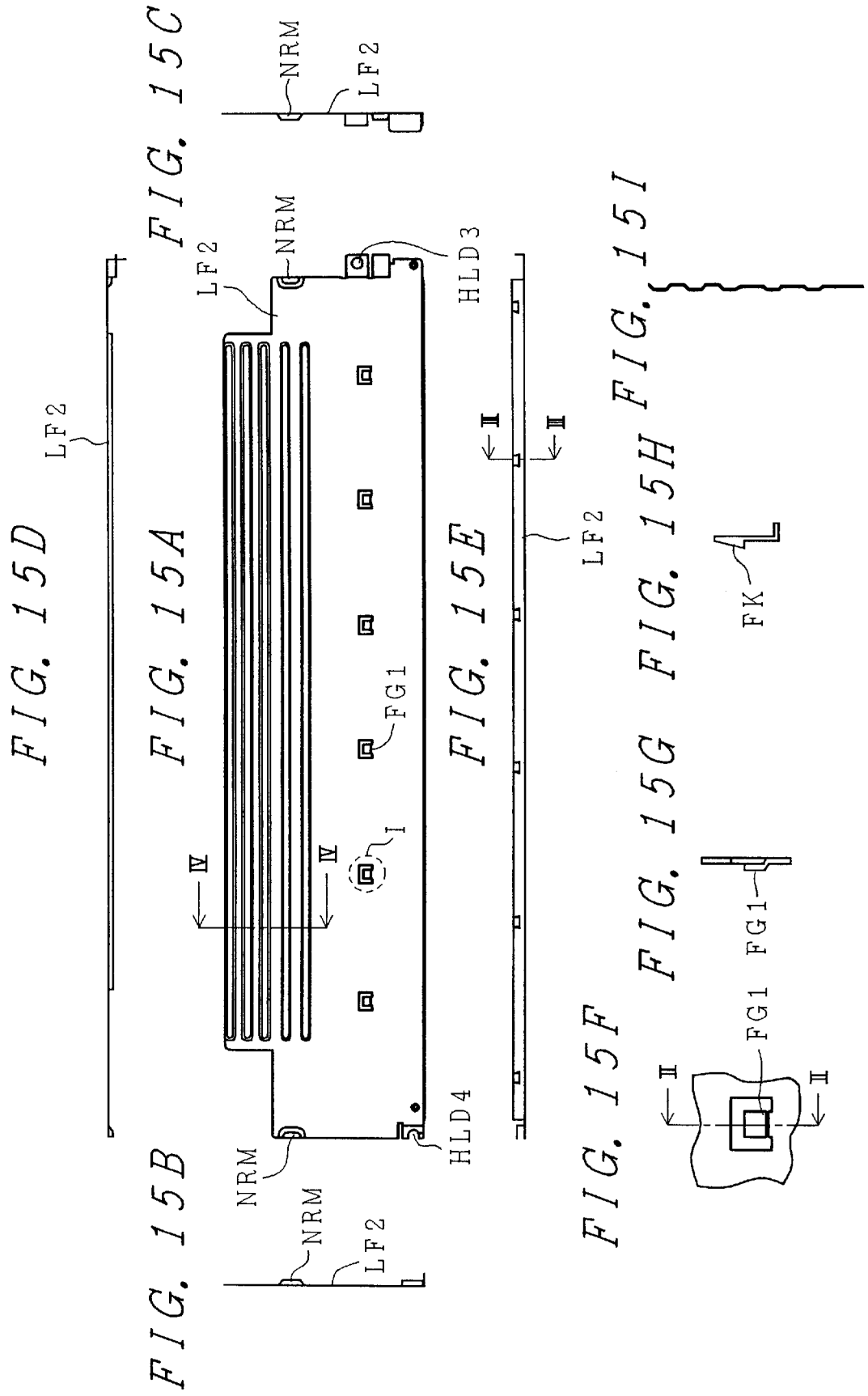

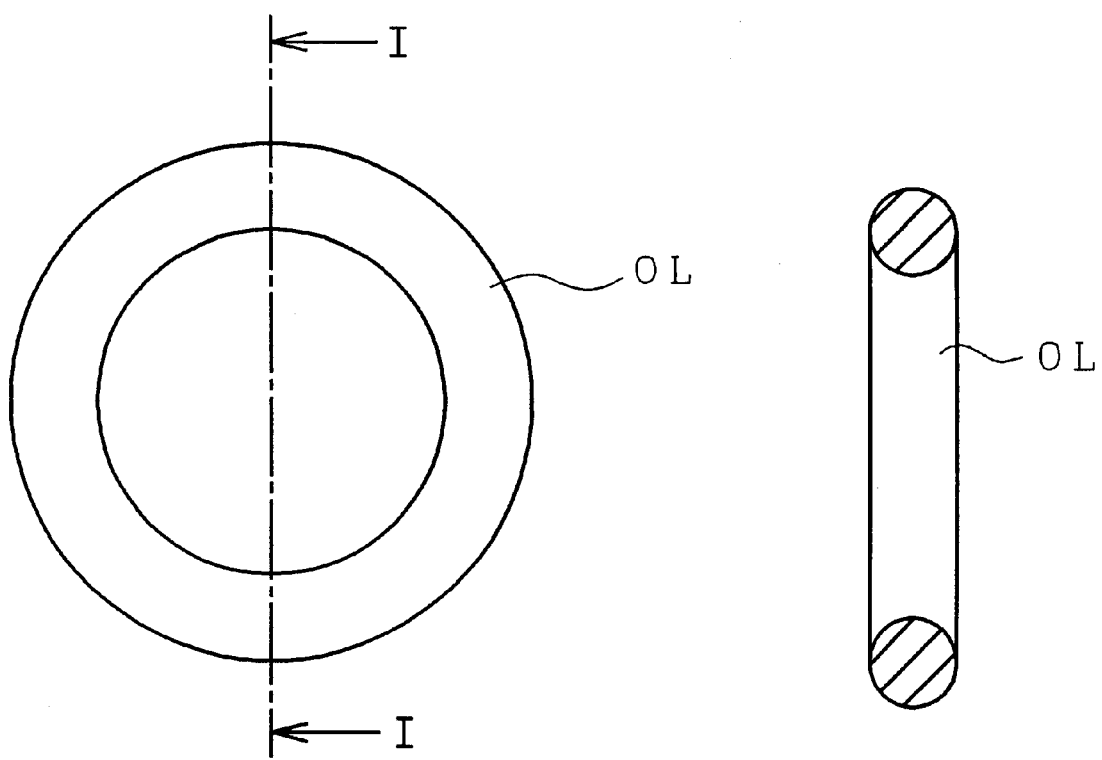

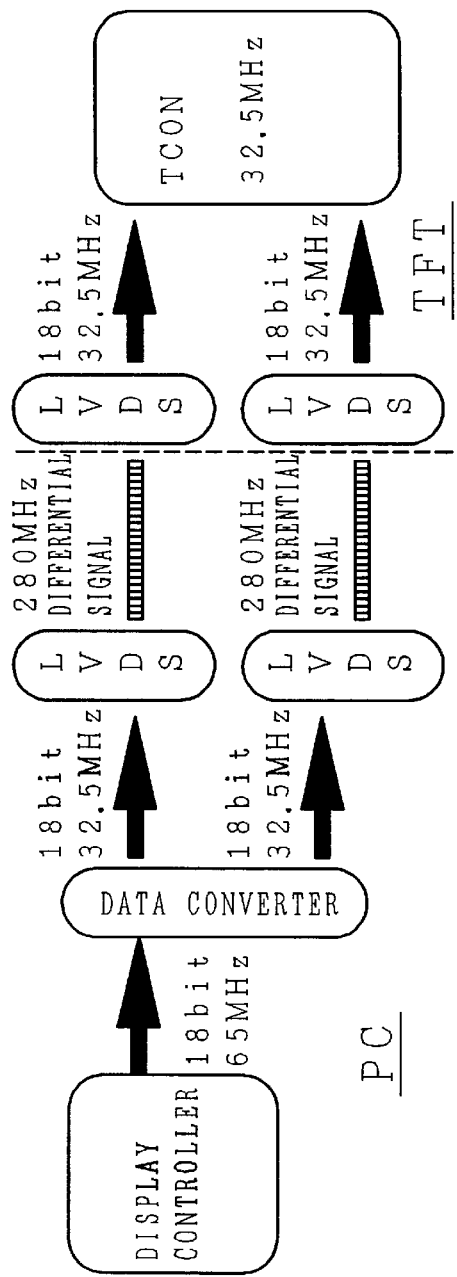
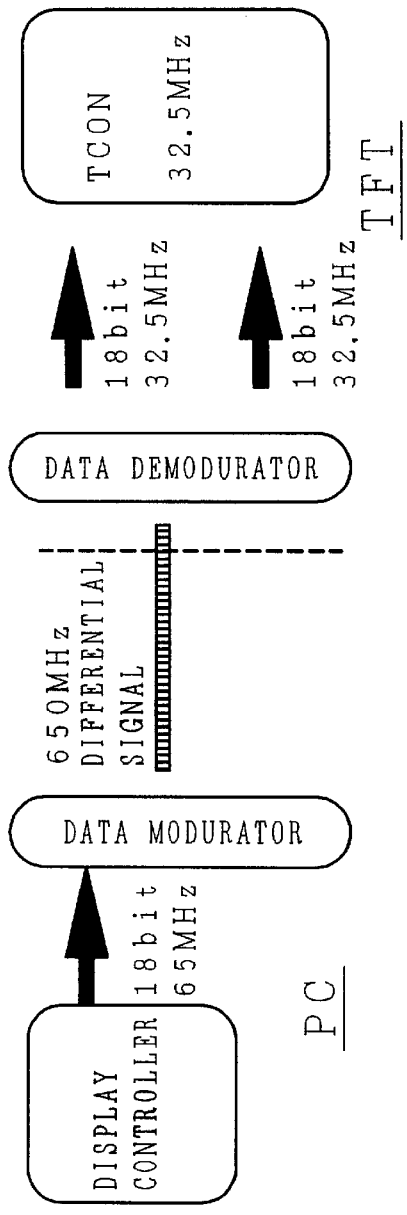
FIG. 37A
FIG. 37B

BACK LIGHT SYSTEM FOR MINIMIZING NON DISPLAY AREA OF LIQUID CRYSTAL DISPLAY DEVICE

BACKGROUND OF THE INVENTION

The present invention relates to a liquid crystal display device and more particularly to a liquid crystal display device with a reduced picture-frame area around the display area that does not contribute to the display.

To meet the growing demands for acquiring necessary information and performing computation anytime and anywhere, portable information processing devices as shown in FIG. 52 have been developed. The portable information processing devices include notebook type personal computers (hereinafter referred to as a notebook computer), word processors, a portable information terminal, and a pocket type computer.

These portable information processing devices mostly use a liquid crystal display device due to its small thickness, lightness, and small power consumption.

The liquid crystal display device comprises a liquid crystal display panel for displaying an image and a drive circuit. The drive circuit is provided around the liquid crystal display panel and constitutes a non-display area (so-called picture-frame area) that does not contribute to the display.

There have been growing demands in recent years for increasing the display area in the portable information processing devices so that the display can be viewed easily. A simple way of increasing the display area is to use a large liquid crystal display device but this degrades the portability, the very feature of the portable information processing devices.

Hence, certain picture-frame reduction techniques have been employed to reduce the non-display area and thereby increase the display area as compared with that of liquid crystal display devices with the same external size.

Such picture-frame reduction techniques are disclosed in Japanese Patent Application No. 75019/1994 and 297234/1995 and have been successful to some extent.

The inventors of this invention, however, have found that problems still remain to be solved in making the display area larger and the picture-frame area smaller than those of the conventional devices.

FIG. 53A shows a case ML of the liquid crystal display device mounted with a backlight comprising a light guide plate GLB and a fluorescent tube LP. FIG. 53B is a cross section taken along the line B—B of FIG. 53A. FIG. 53C is a cross section taken along the line C—C of FIG. 53A.

The conventional liquid crystal display devices, as shown in FIG. 53B and FIG. 53C, use lamp cables LPC1, LPC2 with round cross sections for supplying a voltage to the fluorescent tube LP.

Hence, the area where the lamp cables LPC1, LPC2 are installed in the liquid crystal display device becomes large, making it impossible to reduce the picture-frame area of the liquid crystal display device.

SUMMARY OF THE INVENTION

An object of this invention is to reduce the picture-frame area not contributing to the display on the liquid crystal display device.

To achieve the above object, the liquid crystal display device of the present invention comprises a liquid crystal display element, a backlight to provide light to the liquid crystal display element, and a case accommodating the liquid crystal display element and the backlight, wherein a lamp cable for supplying a voltage to the backlight is formed as a flat cable made of a conductive foil and an insulating film laminated together and is arranged between the backlight and the liquid crystal display element.

The liquid crystal display device of the present invention is characterized in that the device comprises a liquid crystal display element, a backlight to provide light to the liquid crystal display element, and a case accommodating the liquid crystal display element and the backlight, wherein a lamp cable for supplying a voltage to the backlight is formed of a flat cable made of a conductive foil and an insulating film laminated together, the backlight has a light emitting fluorescent tube and insulating bushings covering electrodes at the ends of the fluorescent tube, the lamp cable is connected to one of the electrodes of the fluorescent tube and is bent along the surface of the fluorescent tube, and the bushing covers that part of the lamp cable which is bent along the surface of the fluorescent tube.

The liquid crystal display device of the present invention is characterized in that the device comprises a liquid crystal display element, a backlight to provide light to the liquid crystal display element, and a case accommodating the liquid crystal display element and the backlight, wherein a lamp cable for supplying a voltage to the backlight is formed of a flat cable made of a conductive foil and an insulating film laminated together, the lamp cable has a terminal connected to an electrode of the fluorescent tube, the terminal of the lamp cable is connected to one of the electrodes of the fluorescent tube by soldering and the solder is exposed from the terminal of the lamp cable.

BRIEF DESCRIPTION OF THE DRAWINGS

FIG. 2A is a top plan view of a liquid crystal display module MDL as viewed from the top (i.e., upper side or display side) of the liquid crystal display element PNL;

FIG. 2B is a left side view of the liquid crystal display module MDL;

FIG. 2C is a right side view of the liquid crystal display module MDL;

FIG. 2D is a front side view of the liquid crystal display module MDL;

FIG. 2E is a rear side view of the liquid crystal display module MDL;

FIG. 5A is a cross section of the liquid crystal display module MDL taken along the line III—III of FIG. 2A;

FIG. 5B is a cross section of the liquid crystal display module MDL taken along the line IV—IV of FIG. 2A;

FIG. 7A is a top plan view of an upper shield case SHD;

FIG. 7B is a right side view of the upper shield case SHD;

FIG. 7C is a left side view of the upper shield case SHD;

FIG. 7D is a rear side view of the upper shield case SHD;

FIG. 7E is a front side view of the upper shield case SHD;

FIG. 8A is a top plan view of a mold case ML;

FIG. 8B is a left side view of the mold case ML;

FIG. 8C is a right side view of the mold case ML;

FIG. 8D is a front side view of the mold case ML;

FIG. 8E is a rear side view of the mold case ML;

FIG. 10A is a cross section of the mold case ML taken along the line I—I of FIG. 8A;

FIG. 10B is a cross section of the mold case ML taken along the line III—III of FIG. 8D;

FIG. 10C is a cross section of the mold case ML taken along the line II—II of FIG. 8A;

FIG. 10D is a cross section of the mold case ML taken along the line IV—IV of FIG. 8A;

FIG. 10E is a cross section of the mold case ML taken along the line V—V of FIG. 8A;

FIG. 10F is a cross section of the mold case ML taken along the line VI—VI of FIG. 8A;

FIG. 10G is a cross section of the mold case ML taken along the line VII—VII of FIG. 9;

FIG. 11A is a top plan view of a frame spacer WSPC;

FIG. 11B is a left side view of the frame spacer WSPC;

FIG. 11C is a right side view of the frame spacer WSPC;

FIG. 11D is a front side view of the frame spacer WSPC;

FIG. 11E is a rear side view of the frame spacer WSPC;

FIG. 12 is a bottom view of the frame spacer WSPC;

FIG. 13A is a cross section of the frame spacer WSPC taken along the line I—I of FIG. 11D;

FIG. 13B is a cross section of the frame spacer WSPC taken along the line II—II of FIG. 11D;

FIG. 13C is a cross section of the frame spacer WSPC taken along the line III—III of FIG. 11C;

FIG. 13D is a cross section of the frame spacer WSPC taken along the line IV—IV of FIG. 11C;

FIG. 13E is a cross section of the frame spacer WSPC taken along the line V—V of FIG. 11A;

FIG. 13F is a cross section of the frame spacer WSPC taken along the line VI—VI of FIG. 11A;

FIG. 14A is a top plan view of a first lower shield case LF1;

FIG. 14B is a left side view of the first lower shield case LF1;

FIG. 14C is a right side view of the first lower shield case LF1;

FIG. 14D is a front side view of the first lower shield case LF1;

FIG. 15A is a top plan view of a second lower shield case LF2;

FIG. 15B is a left side view of the second lower shield case LF2;

FIG. 15C is a right side view of the second lower shield case LF2;

FIG. 15D is a front side view of the second lower shield case LF2;

FIG. 15E is a rear side view of the second lower shield case LF2;

FIG. 15F is an enlarged view of part I enclosed by a dashed line of FIG. 15A;

FIG. 15G is a cross section taken along the line II—II of FIG. 15F;

FIG. 15H is a cross section taken along the line III—III of FIG. 15E;

FIG. 15I is a cross section taken along the line IV—IV of FIG. 15A;

FIG. 25A is a plan view of an O-ring OL;

FIG. 25B is a cross section of the O-ring OL taken along the line I—I of FIG. 25A;

FIG. 37A illustrates the flow of display data between a host computer and a controller unit 101 of an embodiment;

FIG. 37B illustrates the flow of display data between the host computer and the controller unit 101 of another embodiment;

FIG. 48B is an enlarged view of a projection PJ5 of FIG. 48A;

FIG. 49A illustrates an example where a chip IC1 on the liquid crystal display element PNL is attached to the shield case SHD with a double-sided adhesive tape BAT;

FIG. 49B illustrates an example where the liquid crystal display element PNL is secured to the shield case SHD by sticking a double-sided adhesive tape BAT on a portion where the liquid crystal display element PNL and the video signal line-side flexible printed circuit board FPC2 overlap;

FIGS. 49C and 49D illustrate an example where a vinyl chloride spacer CLSPC is installed between the IC chips;

FIG. 49E illustrates an example where rubber spacers GSPC are installed between the IC chips to protect the IC chips;

FIG. 49F illustrates an example where the vinyl chloride spacers CLSPC are installed between the IC chips and at a portion where the liquid crystal display element PNL and the flexible printed circuit board FPC2 overlap;

FIGS. 50A and 50B are cross sections of a sixth embodiment of this invention in which the glass substrates SUB1, SUB2 of the liquid crystal display element PNL are secured to the shield case SHD;

FIGS. 51A and 51B are cross sections of another example of the sixth embodiment of this invention in which the glass substrates SUB1, SUB2 of the liquid crystal display element PNL are secured to the shield case SHD;

FIG. 52 illustrates the liquid crystal display device of this invention mounted on an information processing apparatus;

FIGS. 53A, 53B and 53C illustrate a structure for housing a backlight, of a conventional liquid crystal display device; and FIG. 54 illustrates an example for comparison to explain the advantages of this invention.

DETAILED DESCRIPTION OF THE PREFERRED EMBODIMENTS

Now, this invention will be described in conjunction with various preferred embodiments.

Embodiment 1

Figure 1A:
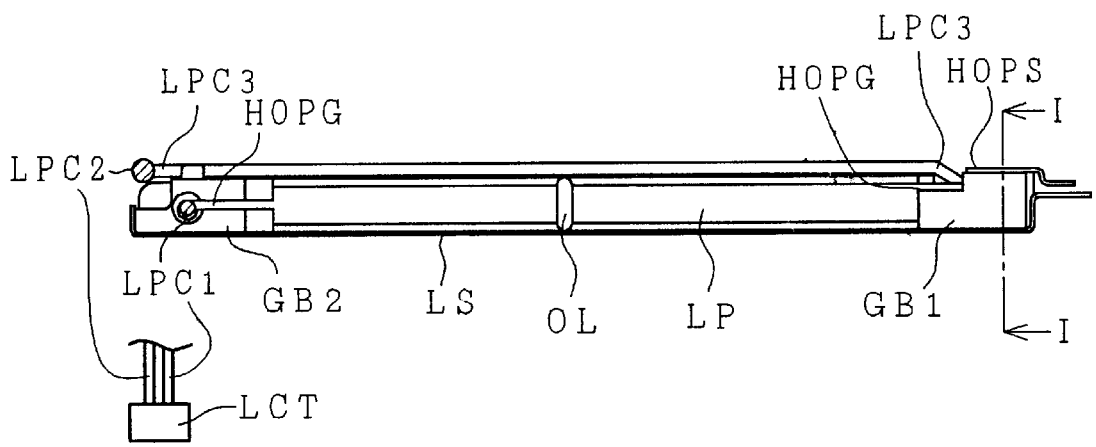
FIG. 1A is an end view of a lamp unit, a light source of the liquid crystal display device.
Figure 1B:
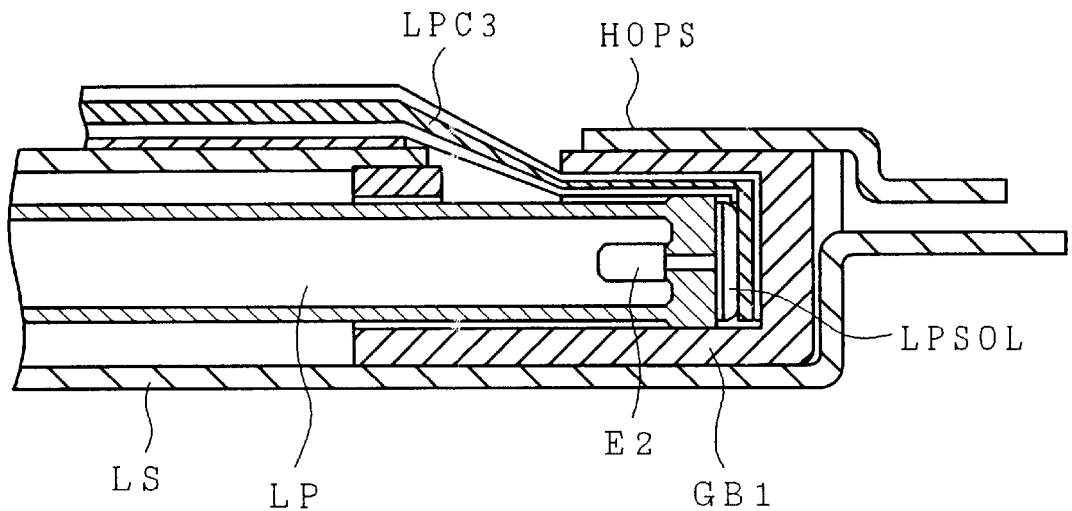
FIG. 1B is a cross section of the part of the lamp unit where the fluorescent tube LP and the lamp cable LPC3 are connected.
Figure 1C:
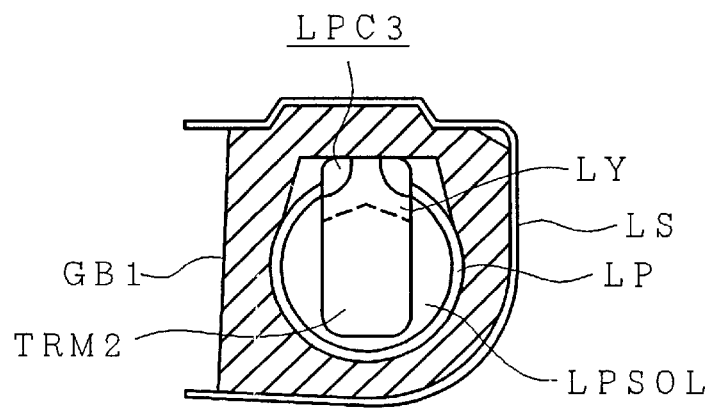
FIG. 1C is a cross section taken along the line I—I of FIG. 1A.

The major parts of the first embodiment of this invention are shown in FIGS. 1A, 1B and 1C.

FIG. 1A shows an external view of a lamp unit, the light source of the liquid crystal display device (hereinafter referred to as a liquid crystal display module MDL).

FIG. 1B is a cross section of a part of the lamp unit where the fluorescent tube LP and the lamp cable LPC3 are connected.

FIG. 1C is a cross section taken along the line I—I of FIG. 1A.

According to this invention because the lamp cable LPC3 is formed as a flat cable as shown in FIG. 1B, it can be installed in a narrow space between the liquid crystal display element and the backlight, so that the picture-frame area of the liquid crystal display module MDL can be reduced.

Further, according to this invention, as shown in FIG. 1B, because the lamp cable LPC3 is formed as a flat cable and bent along the surface of the fluorescent tube LP and because both the fluorescent tube LP and the lamp cable LPC3 are covered with a rubber bushing GB1, it is possible to reduce the size of the portion that holds the fluorescent tube LP and therefore the picture-frame area of the liquid crystal display module MDL.

Further, as shown in FIG. 1B, the lamp cable LPC3 is led out of the lamp reflector LS and the rubber bushing GB1 through openings (or slits) HOPS, HOPG of the lamp reflector LS and the rubber bushing GB1. According to this invention because the rubber bushing GB1 is exposed from the end of the opening HOPS, the lamp cable LPC3 is protected against damage by pointed metal parts or burrs formed when making the lamp reflector LS by blanking.

As shown in FIG. 1B, the lamp cable LPC3 inside the rubber bushing GB1 is bent at a portion where a metal foil is sandwiched between insulating films, and thus the lamp cable LPC3 is prevented from being broken in the rubber bushing GB1.

According to this invention, as shown in FIG. 1C, the terminal TRM of the lamp cable LPC3 is made narrower than the region of the fluorescent tube LP where solder LPSOL is provided.

Figure 54:
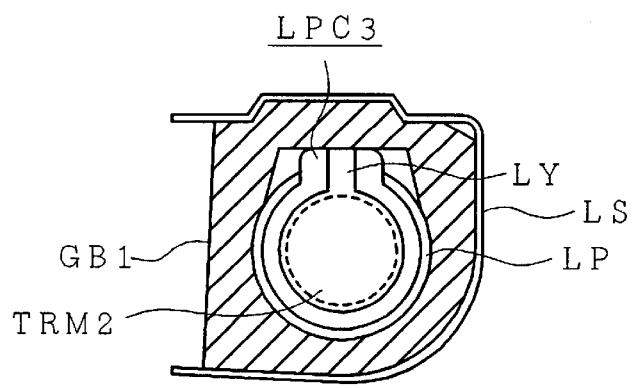

FIG. 54 represents a comparative example for comparison with this invention. In the example of FIG. 54, the terminal TRM2 of the lamp cable LPC3 completely covers the region of the fluorescent tube LP provided with the solder LPSOL to increase the connection area between the terminal TRM2 and the terminal of the fluorescent tube LP. Hence, with the comparative example of FIG. 54, the state of the connection between the terminal TRM2 and the electrode of the fluorescent tube LP cannot be checked, leaving a possibility that the lamp of the liquid crystal display device may fail to turn on due to defective connection of the lamp cable LPC3.

According to this invention because the solder LPSOL is exposed from the terminal TRM2, as shown in FIG. 1C, the state of connection between the fluorescent tube LP and the lamp cable LPC3 can be checked, eliminating the possibility of turn-on failure of the lamp of the liquid crystal display device.

The construction of the liquid crystal display module MDL to which this invention is applied will be described in detail.

Appearance of Liquid Crystal Display Module MDL

FIGS. 2A, 2B, 2C, 2D and 2E are complete assembly drawings of the liquid crystal display module MDL. FIG. 2A is a front view as viewed from the front (i.e., upper side or display side) of the liquid crystal display element PNL. FIG. 2D is a front side view, FIG. 2C is a right side view, FIG. 2B is a left side view, and FIG. 2E is a rear side view.

Figure 3:
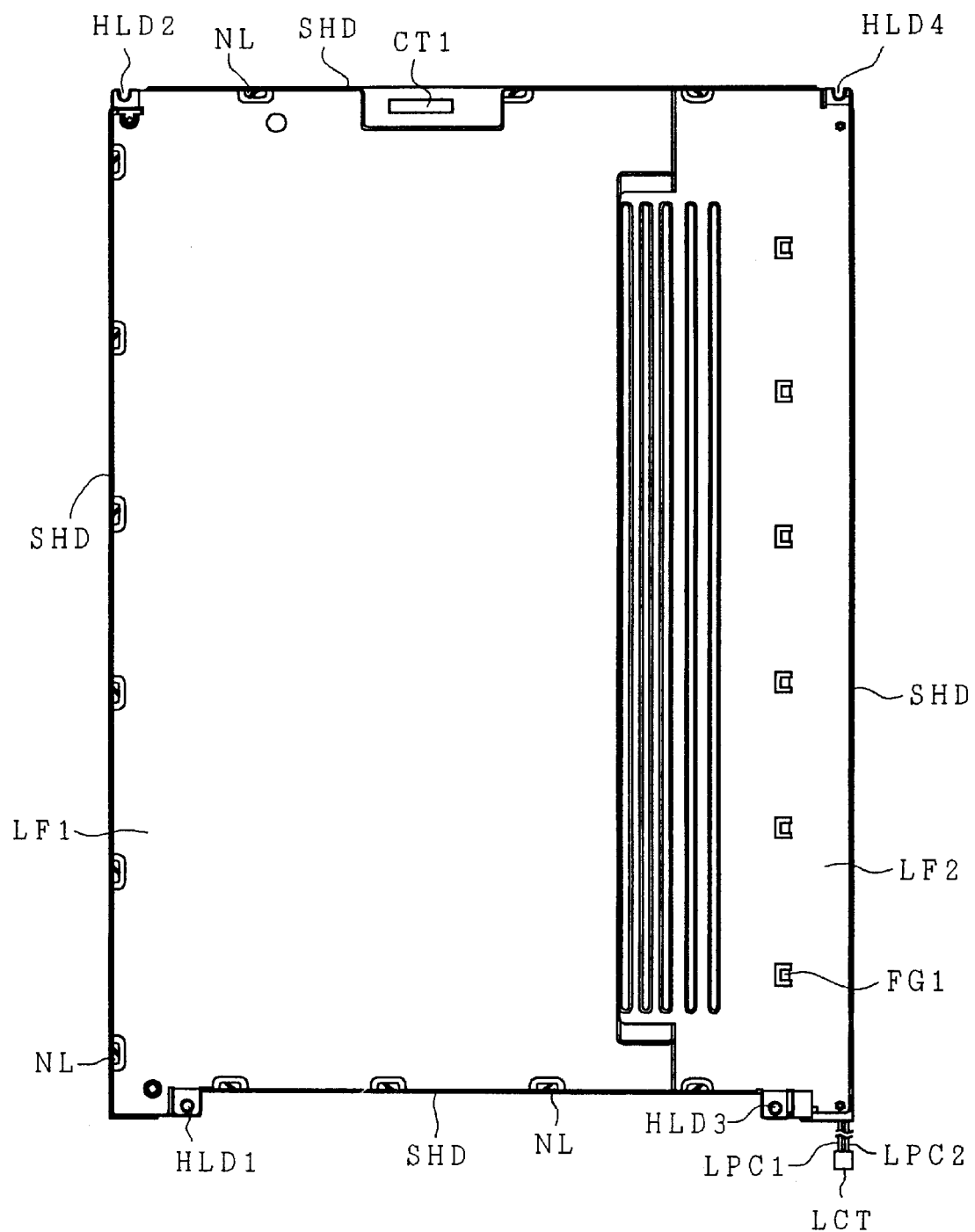
FIG. 3 is a bottom view of the liquid crystal display module MDL of this invention, i.e. a bottom view of the liquid crystal display element.

FIG. 3 is a complete assembly drawing of the liquid crystal display module MDL, as viewed from the bottom (lower side) of the liquid crystal display element.

The module MDL has two kinds of housing and holding member, a mold case ML and a shield case SHD.

HLD1, HLD2, HLD3 and HLD4 are four mounting holes to mount the module MDL as a display unit on an information processing apparatus such as notebook type personal computers and word processors.

Figure 52:
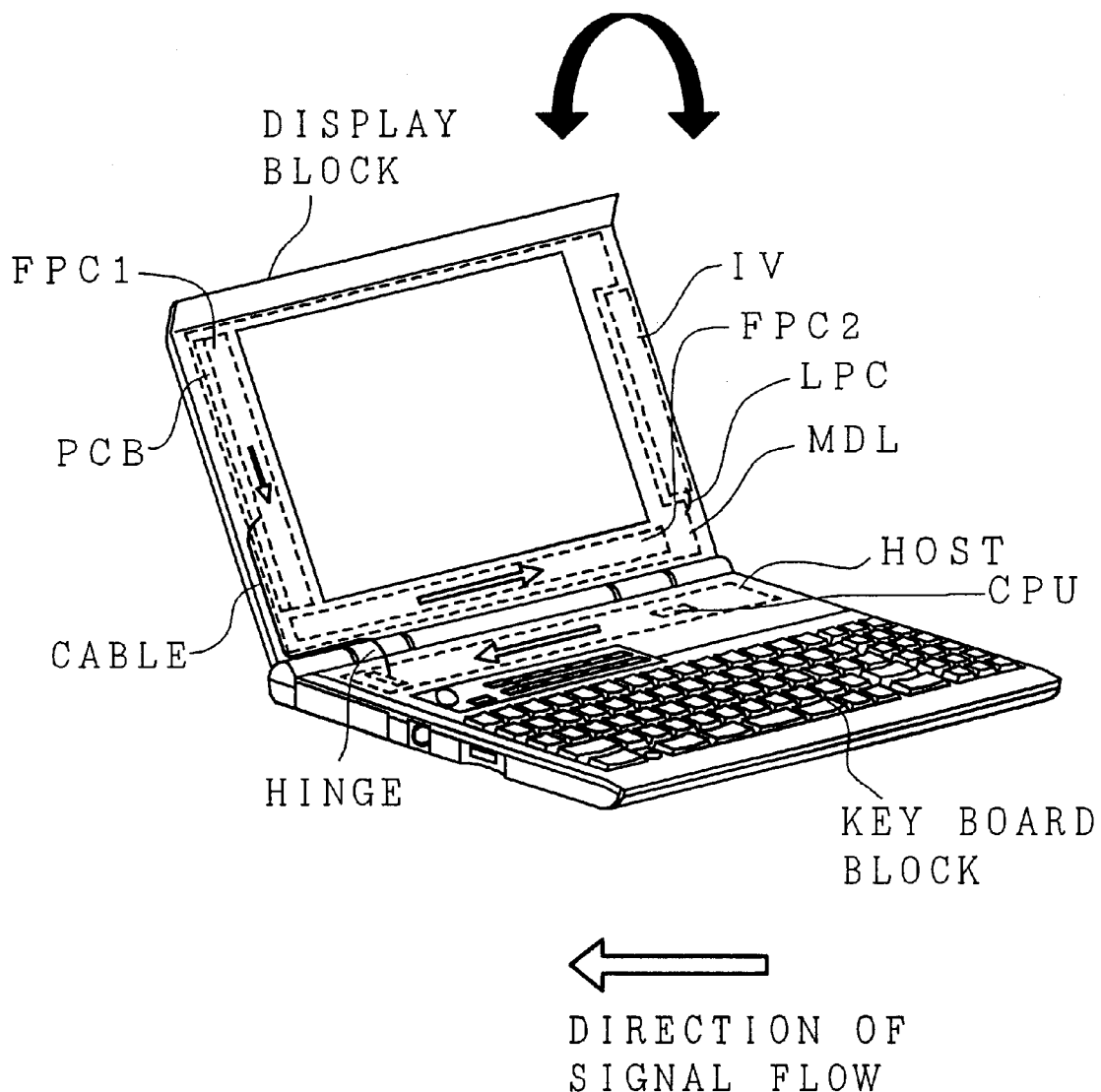
Figure 53A:
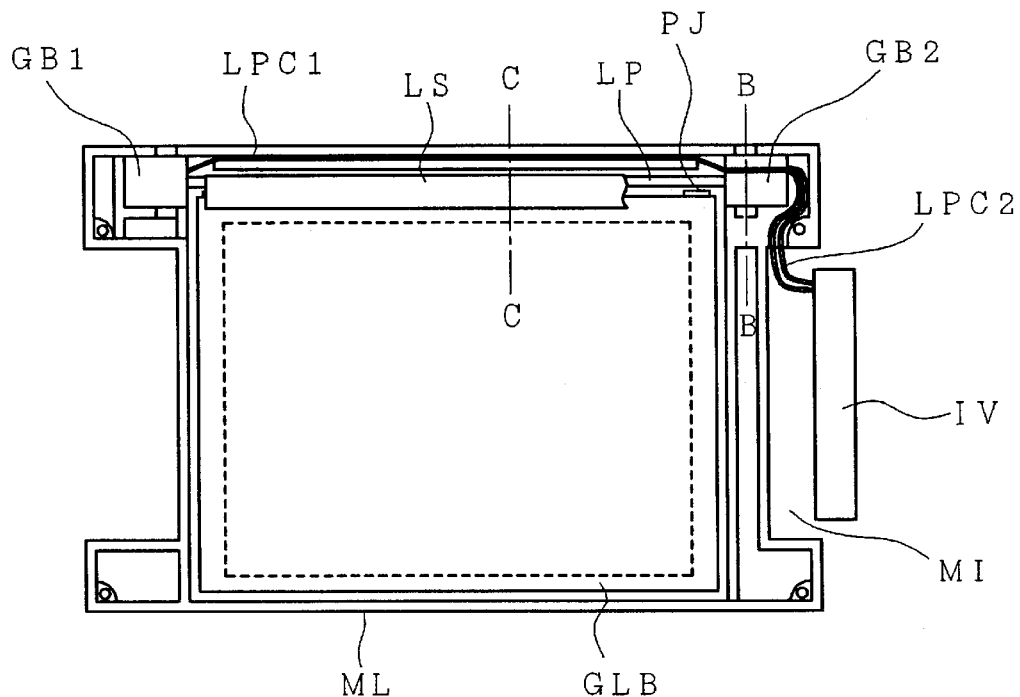
Figure 53B:
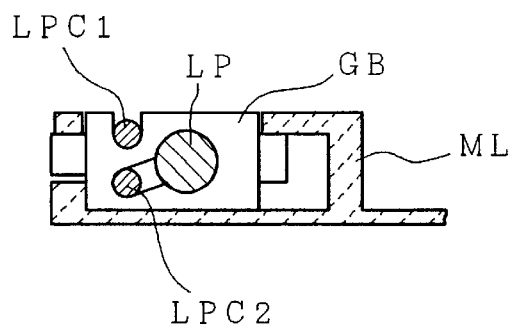
Figure 53C:
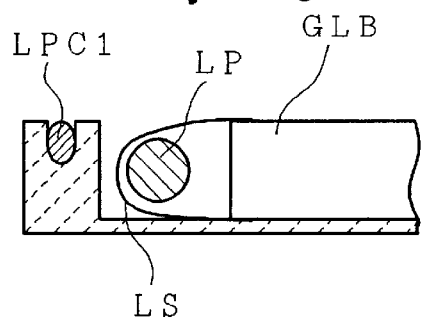

The shield case SHD of FIG. 7 is formed with mounting holes HLD1, HLD2, HLD3 and HLD4 at locations aligned with the mounting holes HLD1, HLD2, HLD3 and HLD4 of the mold case ML of FIG. 8. Screws or other fastenings are inserted into these mounting holes to secure the mold case ML and the shield case SHD to the information processing apparatus. In this module MDL, an inverter IV for the backlight is installed in a recess between the mounting holes HLD1 and HLD3, as shown in FIG. 52, to supply electricity to the fluorescent tube LP of the backlight through the connector LCT and the lamp cables LPC1, LPC2. Signals from the host computer and necessary electricity are supplied through an interface connector CT1 provided at the back of the module to the controller unit and power supply unit of the liquid crystal display module MDL.

The liquid crystal display module MDL shown in FIG. 2 has the following dimensions: the long side W (the side defined by the corners on the HLD1 and HLD2 sides) is 297.5 mm, the short side H (the side defined by the corners on the HLD2 and HLD4 sides) is 214.5 mm, the thickness T is 8.0 mm, the width X1 measured from the display area AR (the effective pixel area) to the upper edge of the shield case SHD (on the line II—II of FIG. 2) is 3.9 mm, the width X2 to the lower edge (on the line I—I of FIG. 2) is 7.9 mm, the width Y1 to the left edge (on the line III—III of FIG. 2) is 15.5 l mm, and the width Y2 to the right edge (on the line IV—IV of FIG. 2) is 4.2 mm.

The display area AR has a 270.3 mm long side W and a 202.8 mm short side and has a diagonal length of 34 cm (13.3 inches).

In the display area AR are arranged 1024 pixels along the long side (horizontal or x direction) and 768 pixels along the short side (vertical or y direction), one pixel consisting of three R, G, B color pixels.

The liquid crystal display module MDL of FIG. 2 has an advantage over the liquid crystal display module MDL described in the Japanese Patent Application No. 297234/1995 mentioned earlier in that, although the external dimensions and the display area AR of the liquid crystal display module MDL are large, the picture-frame area not contributing to the display is small. Hence, with the liquid crystal display module MDL shown in FIG. 2, an easy-to-view large display can be obtained without degrading the portability of the portable information processing apparatuses. The liquid crystal display module MDL of FIG. 2 weighs about 650 g, light enough for use in portable information processing apparatuses.

Figure 6A:
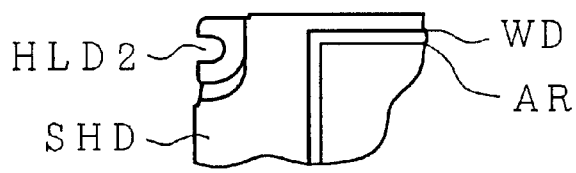
FIG. 6A is an enlarged view of part A of FIG. 2A.
Figure 6B:
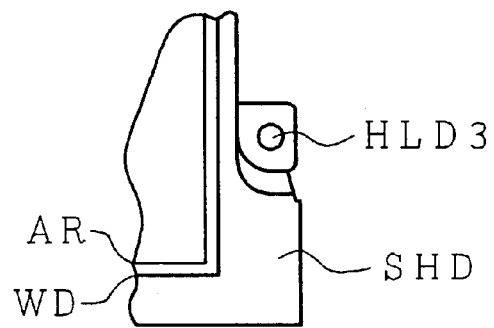
FIG. 6B is an enlarged view of part B of FIG. 2A.

The mounting holes of the liquid crystal display module MDL are shaped as shown in FIG. 6A and 6B. The mounting holes on the lamp cables LPC1, LPC2 side (see part B in FIG. 2A) have a round shape like HLD3 shown in FIG. 6B. The mounting holes on the interface connector CT1 (see part A in FIG. 2A) side are formed into a U-shaped notch like HLD2 of FIG. 6A.

Figure 6C:
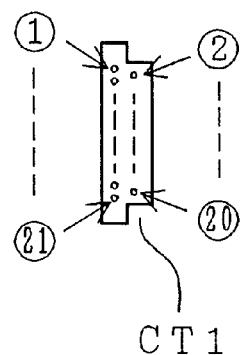
FIG. 6C is an enlarged view of part C of FIG. 2B.

The arrangement (see part C) of pins of the interface connector CT1 for connection with an external device (e.g., host computer) of the liquid crystal display module MDL is shown in FIG. 6C.

Cross Section of Liquid Crystal Display Module MDL

Figure 4A:
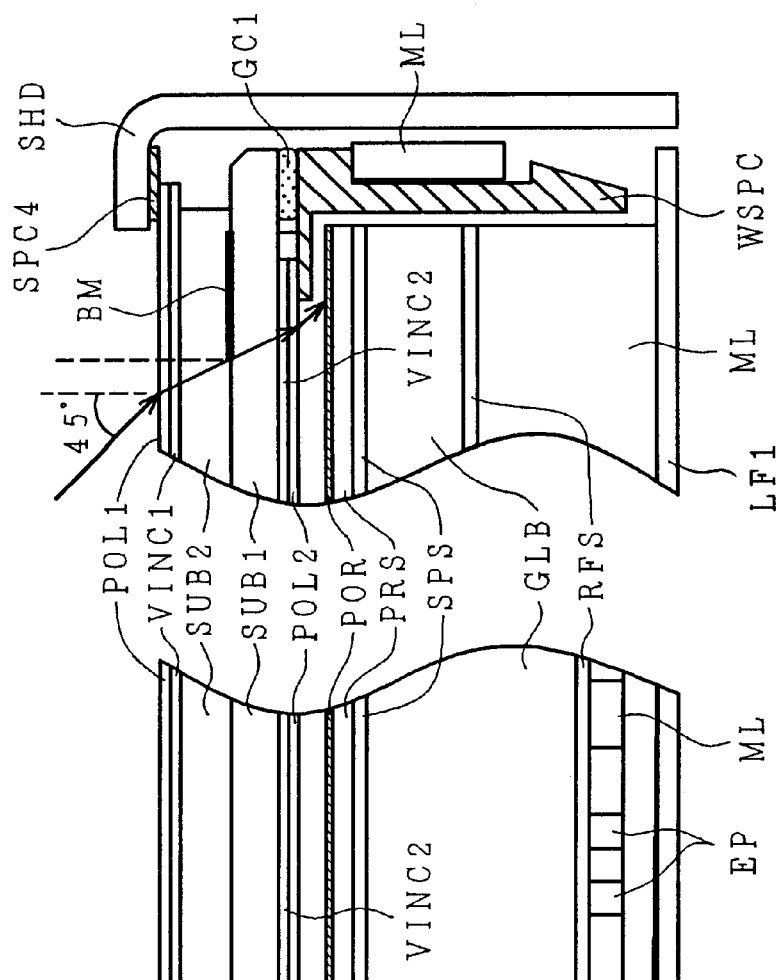
FIG. 4A is a cross section of the liquid crystal display module MDL taken along the line I—I of FIG. 2A.
Figure 4B:
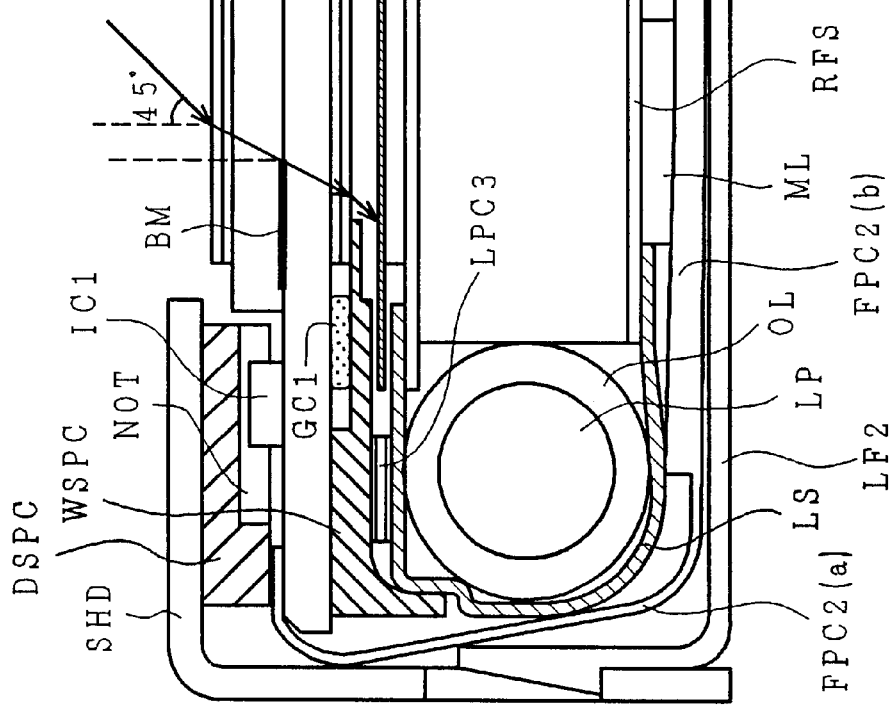
FIG. 4B is a cross section of the liquid crystal display module MDL taken along the line II—II of FIG. 2A.

FIG. 4A is a cross section of the liquid crystal display module MDL taken along the line I—I of FIG. 2. FIG. 4B is a cross section of the liquid crystal display module MDL taken along the line II—II of FIG. 2. FIG. 5A is a cross section of the liquid crystal display module MDL taken along the line III—III of FIG. 2. FIG. 5B is a cross section of the liquid crystal display module MDL taken along the line IV—IV of FIG. 2.

Members shown in FIG. 4A and 4B and FIG. 5A and 5B will be described below.

Symbol SHD denotes a shield case (upper case) that covers the periphery of the liquid crystal display element PNL and the drive circuit of the liquid crystal display element PNL.

Symbol ML denotes a mold case (lower case) to accommodate the backlight.

LF1 and LF2 denote first and second lower shield cases covering the lower case.

WSPC denotes a frame spacer surrounding the backlight.

SUB1 and SUB2 denote glass substrates constituting the liquid crystal display element PNL. In this embodiment, SUB1 is a substrate on which are formed thin-film transistors and pixel electrodes, and SUB2 is a substrate on which color filters and common electrodes are formed.

FUS denotes a sealing material that seals liquid crystals sealed in between SUB1 and SUB2.

BM denotes a light shielding film formed on the SUB2. In the liquid crystal display module MDL of this embodiment, the area surrounding the display area AR that is shielded from light by the light shielding film BM is optimized, so that even when the user views the display area at an angle of more than 45 degrees, neither light directly leaking from the backlight nor the area around the display area AR not related to the display (for example, an area hidden by the frame spacer WSPC) are viewed. Hence, there is no need to cover the glass substrates SUB1, SUB2 with the shield case more than necessary, allowing the picture-frame area to be reduced.

POL1 denotes an upper polarizing plate bonded to the glass substrate SUB2, and POL2 is a lower polarizing plate bonded to the glass substrate SUB1. The liquid crystal display element PNL of this embodiment displays an image by transmitting or interrupting the light emitted from the backlight by means of the polarizing plates POL1, POL2 and the liquid crystal layer interposed between the glass substrates SUB1 and SUB2.

VINC1 denotes a viewing angle enlarging film bonded to the glass substrate SUB2, and VINC2 is a viewing angle enlarging film bonded to the glass substrate SUB1. In this embodiment, the glass substrates SUB1, SUB2 are thus provided with the viewing angle enlarging films to eliminate the viewing angle dependence wherein the contrast varies with the angle at which the user views the display-a problem inherent in the liquid crystal display element. In the liquid crystal display module MDL of this embodiment, therefore, the viewing angle enlarging films eliminate a contrast difference between the central part and the peripheral part of the display area AR, realizing a liquid crystal display device having a wide display area with a diagonal size D of 34 cm (13.3 inches) or larger.

Although the viewing angle enlarging films may be bonded to the outside of the polarizing plates, they are provided between the polarizing plates and the glass substrates in this embodiment to enhance the viewing angle enlargement effect.

Symbol LP denotes a fluorescent tube, the light source of the backlight.

GLB denotes a light guide plate of the backlight that turns the light coming from the fluorescent tube LP into a uniform plane light source directed toward the glass substrates SUB1, SUB2. The light guide plate GLB is tapered in cross section so that it is thick on the fluorescent tube LP side and thin on the opposite side to reduce its weight.

RFS denotes a reflection sheet that reflects the light reaching the bottom of the light guide plate GLB toward the light guide plate GLB.

SPS denotes a diffusion sheet that diffuses in various directions the light emitted from the upper surface of the light guide plate GLB toward the liquid crystal display element PNL.

PRS denotes a prism sheet PRS that converges the light diffused by the diffusion sheet SPS into a predetermined range of output angle to enhance the luminance of the backlight.

POR denotes a polarizing reflection plate which is provided to improve the luminance of the liquid crystal display device. The polarizing reflection plate POR transmits only light having a specific polarizing axis and reflects light with other polarizing axes. Thus, by aligning the polarizing axis of light transmitted by the polarizing reflection plate POR with the polarizing axis of the lower polarizing plate POL2, the light, which has been absorbed by a conventional lower polarizing plate POL2, can be changed, after traveling back and forth between the polarizing reflection plate POR and the light guide plate GLB, into polarized light that passes through the lower polarizing plate POL2 and can be outputted from the polarizing reflection plate POR, increasing the luminance of the liquid crystal display device.

LS denotes a lamp reflector that reflects light emitted from the fluorescent tube LP toward the light guide plate GLB. The lamp reflector LS also holds the fluorescent tube LP as described later. Because the lamp reflector LS holds the light guide plate GLB from both sides and thus is secured to the light guide plate GLB as shown in FIG. 4A, the fluorescent tube LP can be replaced easily.

The frame spacer WSPC mentioned earlier holds the peripheral part of the light guide plate GLB and the hook of the frame spacer WSPC is inserted into the hole of the mold case ML to firmly secure the light guide plate GLB to the mold case ML, thus preventing the light guide plate GLB from butting against the liquid crystal display element PNL. In this embodiment, the diffusion sheet SPS, the prism sheet PRS and the polarizing reflection plate POR are also held by the frame spacer WSPC, so that the diffusion sheet SPS, the prism sheet PRS and the polarizing reflection plate POR do not distort, allowing the backlight that illuminates the liquid crystal display element PNL with a diagonal size D of 34 cm (13.3 inches) or larger to be installed in the liquid crystal display device.

The frame spacer WSPC has a function of precisely aligning the polarizing axis of the transmitted light through the polarizing reflection plate POR with the polarizing axis of the liquid crystal display element PNL (more precisely, the polarizing axis on the backlight side defined by the lower polarizing plate POL2 or the orientation film of the glass substrate SUB2).

That is, as shown in FIG. 5A, because the frame spacer WSPC holds immovably one side of the polarizing reflection plate POR by one sidewall of the frame spacer WSPC, the polarizing axes of the polarizing reflection plate POR and the liquid crystal display element PNL are prevented from becoming deviated due to the rotational movement.

Further, in this embodiment, because the polarizing reflection plate POR and the liquid crystal display element PNL are held by the same holding member, or the frame spacer WSPC, the polarizing axes of the polarizing reflection plate POR and the liquid crystal display element PNL are not deviated even when a strong impact is exerted on the liquid crystal display module MDL.

Prevention of deviation of the polarizing axes of the liquid crystal display element PNL and the polarizing reflection plate POR is an important factor. If these polarizing axes become misaligned, the luminance of the liquid crystal display module MDL greatly deteriorates, rendering the image display impossible in the worst case.

Symbol GC1 denotes a rubber cushion installed between the frame spacer WSPC and the glass substrate SUB1.

LPC3 denotes a lamp cable for supplying voltage to the fluorescent tube LP, which cable is formed as a flat cable to reduce the installation space. This cable is installed between the frame spacer WSPC and the lamp reflector LS. The lamp cable LPC3 is bonded to the lamp reflector LS with double-sided adhesive tape, so that when the fluorescent tube LP is replaced, the lamp cable LPC3 can be replaced together with the lamp reflector LS, eliminating the need to detach the lamp cable LPC3 from the fluorescent tube LP and facilitating the replacement of the fluorescent tube LP. Further, the lamp cable LPC3 is made of a multilayer film of flexible films and metal films and thus serves as a cushion to prevent interference between the frame spacer WSPC and the lamp reflector LS.

OL denotes an O-ring serving as a cushion between the fluorescent tube LP and the lamp reflector LS. The O-ring OL is made of a transparent plastic so as not to lower the luminance. The O-ring OL is also made of an insulating material with a low dielectric constant. Further, the O-ring OL also serves as a cushion to prevent the fluorescent tube LP from butting against the light guide plate GLB.

IC1 denotes a drain driver chip for driving the video signal line of the liquid crystal display element PNL. It has a drive circuit integrated in a semiconductor chip mounted on the glass substrate SUB1. The drain driver chip IC1 is mounted on only one of the four sides of the glass substrate SUB1, so that on the side opposite the side where the drain driver chip IC1 is mounted, the picture-frame area of the liquid crystal display module MDL can be reduced (see FIG. 1B). The fluorescent tube LP and the lamp reflector LS are stacked below the part of the glass substrate SUB1 where the drain driver chip IC1 is mounted. This arrangement allows the fluorescent tube LP and the lamp reflector LS to be installed compactly in the liquid crystal display module MDL.

IC2 denotes a gate driver chip for driving the scan signal line of the liquid crystal display element PNL. It has a drive circuit integrated in a semiconductor chip mounted on the glass substrate SUB1.

Although the mounting technique of this embodiment has been described as an example of an active-matrix liquid crystal display device using thin-film transistors, it can also be applied to a passive-matrix liquid crystal display device with no thin-film transistors. In the case of a passive-matrix liquid crystal display device, as the drain driver chip IC1, a segment driver chip is used and is mounted on the glass substrate SUB1, and as the gate driver chip IC2, a common driver chip is used and is mounted on the glass substrate SUB2.

FPC1 denotes a scan signal line-side flexible printed circuit board which is connected to external terminals of the glass substrate SUB1 through an anisotropic conductive film to supply electricity and drive signals to the gate driver chip IC2. On the scan signal line-side flexible printed circuit board FPC1 are mounted such chip parts EP as resistors and capacitors.

FPC2 denotes a video signal line-side flexible printed circuit board which is connected to external terminal of the glass substrate SUB1 through an anisotropic conductive film to supply electricity and drive signals to the drain driver chip IC1. On the video signal line-side flexible printed circuit board FPC2 are mounted on such chip parts EP as resistors and capacitors. In this embodiment, to reduce the picture-frame area, the video signal line-side flexible printed circuit board FPC2 is bent to wrap the lamp reflector LS, with a part b of the FPC2 securely held between the mold case ML at the back of the backlight and the second lower shield case LF2. The mold case ML is provided with notches to secure a space for the chip parts EP. The video signal line-side flexible printed circuit board FPC2 comprises a thin part a that can easily be bent and a thick part b for multilayer wiring. In this embodiment, because the lower shield case that covers the bottom surface of the liquid crystal display module MDL is divided into a first lower shield case LF1 and a second lower shield case LF2, the lamp reflector LS can be exposed by removing the second lower shield case LF2 and turning over the video signal line-side flexible printed circuit board FPC2, facilitating the replacement of the fluorescent tube LP.

PCB denotes an interface printed circuit board formed with a power supply circuit and a controller circuit and is made of a multilayer printed circuit board. In this embodiment, to reduce the picture-frame area, the interface printed circuit board PCB is stacked under the scan signal line-side flexible printed circuit board FPC1 and bonded to the glass substrate SUB1 with a double-sided adhesive tape BAT.

As shown in FIG. 5A, the interface printed circuit board PCB is provided with a connector CTR4 connected to a connector CT4 of the video signal line-side flexible printed circuit board FPC2. Though not shown, the FPC1 is also electrically connected through a connector to the PCB.

Symbol SUP denotes a reinforcement plate installed between the first lower shield case LF1 and the connector CT4 to prevent the connector CT4 from coming off the connector CTR4.

SPC4 denotes a spacer made of non-woven cloth, which is installed between the shield case SHD and the upper polarizing plate POL1 and is bonded to the shield case with an adhesive material. The spacer SPC4 may be replaced with a double-sided adhesive tape to bond SHD and POL1 together.

In this embodiment, to prevent the liquid crystal display element PNL from projecting from the shield case SHD, the upper polarizing plate POL1 of plastic film is extended from the glass substrate SUB1 and held by the shield case SHD as shown in FIG. 4B. With this arrangement in which the upper polarizing plate POL1 projecting from the glass substrate SUB2 is held by the shield case SHD, this embodiment has a sufficient strength even when the picture-frame area is reduced.

Prevention of the liquid crystal display element PNL from projecting from the shield case SHD can also be realized by extending the viewing angle enlarging film VINC1 of plastic film from the glass substrate SUB1 and holding the extended VINC1 with the shield case SHD. In this embodiment, both the upper polarizing plate POL1 and the viewing angle enlarging film VINC1 are extended from the glass substrate SUB1 and held by the shield case SHD, so that even if the area where the shield case SHD covers the liquid crystal display element PNL is small, the liquid crystal display element PNL does not project from the shield case SHD.

Symbol DSPC denotes a drain spacer installed between the shield case SHD and the glass substrate SUB1 to prevent the shield case SHD and the glass substrate SUB1 from butting against each other. The drain spacer DSPC covers the drain driver chip IC1 and has a notch NOT at a location corresponding to the drain driver chip IC1, so that the SHD and DSPC do not butt against the drain driver chip IC1, which is therefore protected against breakage. The drain spacer DSPC also holds the video signal line-side flexible printed circuit board FPC2 on the external connection terminals of the glass substrate SUB1 to prevent it from being separated from the glass substrate SUB1, thus ensuring reliable electrical connection between the SUB1 and the FPC2. The drain spacer DSPC is made of vinyl chloride plastic that does not collapse when an impact is exerted to protect the drain driver chip IC1 and which can absorb an impact to some extent to protect the glass substrate SUB1.

FUS denotes a sealing material FUS applied in the liquid crystal injection port.

BAT denotes a double-sided adhesive tape. In this embodiment, as shown in FIG. 5A and 5B, on the gate driver chip IC2 side (G side) and on the liquid crystal filling port side of the liquid crystal display element PNL, the glass substrate SUB2 on the color filter side is bonded to the shield case SHD with the double-sided adhesive tape BAT. As shown in FIG. 4B, on the side (LD side) of the liquid crystal display element PNL where the drain driver chip IC1 is not mounted, the glass substrate SUB2 is bonded to the shield case SHD through the spacer SPC4 to which an adhesive is applied. (The spacer SPC4 performs a function equivalent to a double-sided adhesive tape.) Hence, in this embodiment, except for the side (D side) of the liquid crystal display element PNL where the drain driver chip IC1 is mounted, the liquid crystal display element PNL is bonded to the shield case SHD and not displaced from the shield case SHD if it receives a strong impact.

Further, in this embodiment, on the liquid crystal filling port side the ends of the glass substrate SUB1 and the glass substrate SUB2 are substantially aligned and bonded as shown in FIG. 5B. Because the end portion where the glass substrate SUB1 and the glass substrate SUB2 are stacked in alignment with each other is held between the shield case SHD and the frame spacer WSPC to fix the liquid crystal display element PNL, the area where the shield case SHD covers the liquid crystal display element PNL can be reduced and the portion of the glass substrate SUBI or glass substrate SUB2 held between the shield case SHD and the frame spacer WSPC does not crack even if it receives a strong impact. Further, the end portions where the glass substrates SUB1 and SUB2 are stacked may be held between the shield case SHD and the mold case ML to fix the liquid crystal display element PNL. The construction, in which the end portions where the glass substrates SUB1 and SUB2 are stacked are held between the shield case SHD and the frame spacer WSPC to fixedly support the liquid crystal display element PNL, can also be applied to the LD side (see FIG. 4B). This means that, by adopting the construction in which the end portions where the glass substrates SUB1 and SUB2 are stacked are supported on both the LD side and the liquid crystal filling port side, the picture-frame area can be reduced further and the liquid crystal display module MDL can withstand stronger impacts.

Next, members making up the liquid crystal display module

MDL will be described in further detail.

Upper Shield Case SHD

FIG. 7A illustrates a front view of the upper shield case SHD, 7B a right side view of the upper shield case SHD, 7C a left side view of the upper shield case SHD, 7D a rear side view of the upper shield case SHD, and 7E a front side view of the upper shield case SHD.

The upper shield case SHD (referred to simply as a shield case) is made by the press forming technique, i.e., blanking and bending a single metal plate. Symbol WD denotes an opening to expose the display area of the liquid crystal display element PNL and will be referred to as a display window. NL denotes a fixing claw for locking together the shield case SHD and the lower shield cases LF1, LF2, and HK denotes a hook hole for fixing. The fixing daw and the hook hole are formed integrally to the shield case SHD. The fixing claw NL shown in FIG. 7 is in a state before being bent. FG2 is a frame ground, a projection of a bent metal plate, provided for electrical connection with the ground line of the scan signal line-side flexible printed circuit board FPC1 provided below the frame ground FG2. FG3 denotes also a frame ground for electrical connection with the ground line of the interface printed circuit board PCB. HLD1, HLD2, HLD3 and HLD4 denote mounting holes formed in the shield case SHD.

The shield case SHD covers the drive circuit of the liquid crystal display element PNL to shield it against harmful electromagnetic interference (EMI) emitted from the liquid crystal display module.

Mold Case ML

Figure 9:
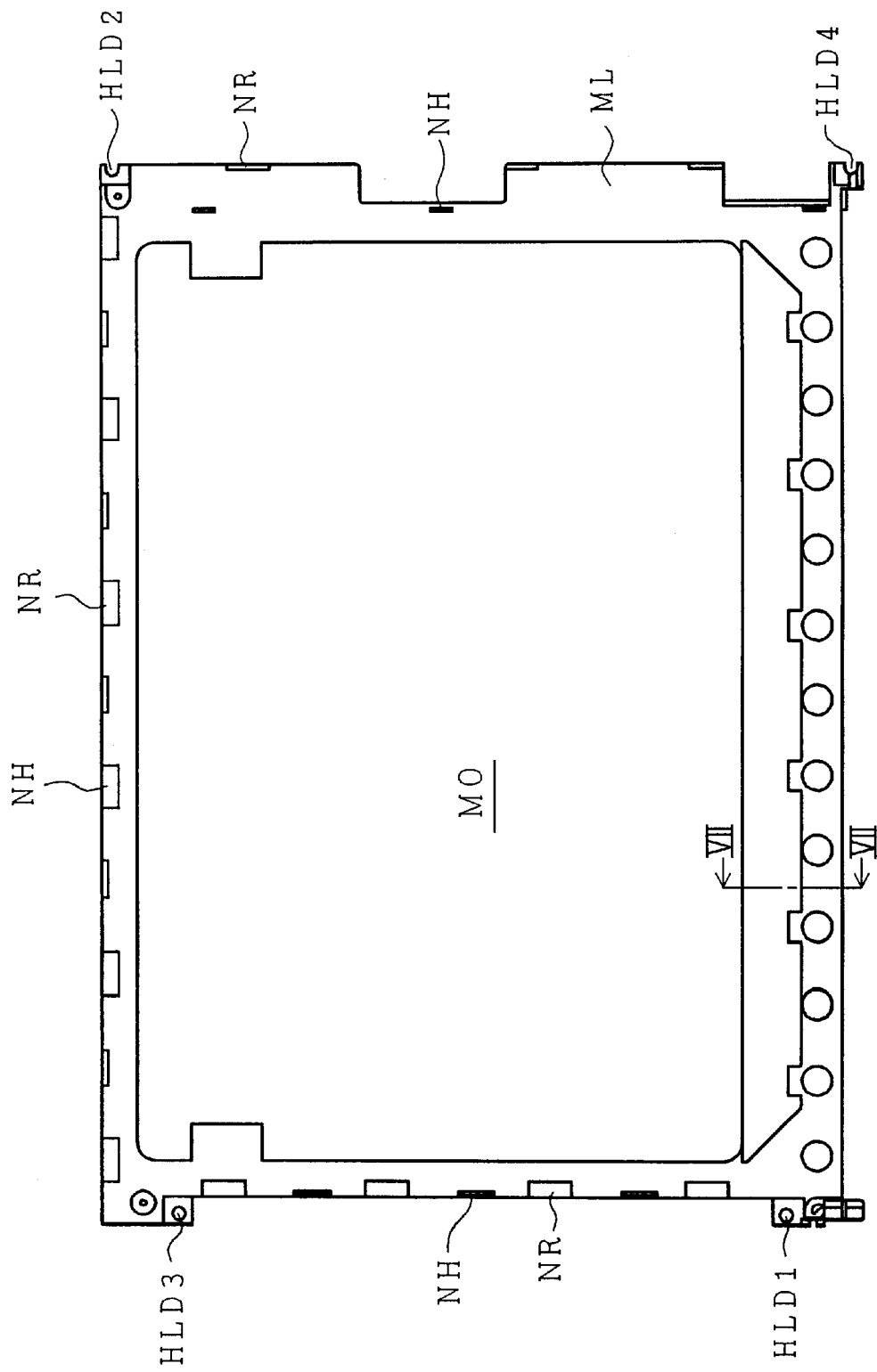
FIG. 9 is a bottom view of the mold case ML.

FIG. 8A is a front view of the mold case ML, 8B a left side view of the mold case ML, FIG. 8C a right side view of the mold case ML, FIG. 8D a front side view of the mold case ML, and FIG. 8E a rear side view of the mold case ML. FIG. 9 is a bottom view of the mold case ML. A cross section taken along the line I—I of FIG. 8A is shown in FIG. 10A. A cross section taken along the line II—II of FIG. 8A is shown in FIG. 10C. A cross section taken along the line III—III of FIG. 8B is shown in FIG. 10B. A cross section taken along the line IV—IV of FIG. 8A is shown in FIG. 10D. A cross section taken along the line V—V of FIG. 8A is shown in FIG. 10E. A cross section taken along the line VI—VI of FIG. 8A is shown in FIG. 10F. A cross section taken along the line VII-VII of FIG. 9 is shown in FIG. 10G.

The mold case ML has a function of the lower case of the liquid crystal display module MDL, accommodates the backlight, and holds the light guide plate GLB and the reflection sheet RFS. The mold case ML is made by molding synthetic resin in one piece by using one molding die. The mold case ML can be firmly joined to the upper shield case SHD by means of the fixing members and through the action of the elastic members, and hence the vibratory impact resistance and heat shock resistance are improved, enhancing the reliability.

In the bottom surface of the mold case ML, an opening portion MO is formed at the central part except for the peripheral frame portion. By providing the opening portion MO at the bottom of the mold case ML, the bottom of the mold case ML can be prevented from bending outward, keeping the maximum thickness of the liquid crystal display module MDL from increasing. Further, the provision of the opening portion MO at the bottom of the mold case ML also minimizes the weight of the opening portion MO made of synthetic resin in one piece, reducing the weight of the liquid crystal display module MDL.

Symbol HLD1, HLD2, HLD3 and HLD4 in FIG. 8A and FIG. 9 denote mounting holes formed in the mold case ML. The shield case SHD also has mounting holes at locations aligned with the corresponding holes of the mold case ML. Screws are passed through the mounting holes of the shield case SHD and mold case ML to secure and mount them to a product to which the liquid crystal display device is applied. RE denotes a part for positioning the light guide plate GLB and the reflection sheet RFS and is formed as recesses, into which projections provided to the light guide plate GLB and the reflection sheet RFS are fitted to mount the light guide plate GLB and the reflection sheet RFS in the correct orientation on the mold case ML. The positioning recess RE also prevents the light guide plate GLB and the reflection sheet RFS from being displaced in the mold case ML. Further, the positioning recess RE is also used for positioning the diffusion sheet SPS, the prism sheet PRS and the polarizing reflection plate POR. NR denotes a receiving part for receiving the fixing claw NL of the upper shield case SHD and is formed as a recess in the mold case ML. By inserting the fixing claw NL of the shield case SHD through the lower shield cases LF1, LF2, folding it and fitting it in the receiving part NR, the shield case SHD can be firmly joined to the mold case ML and lower shield cases LF1, LF2. NH denotes a hook hole formed in the mold case ML. The hook hole NH is a hole through which the hook provided to the frame spacer WSPC is passed, and the hook that is passed through the hook hole NH engages with the mold case ML to join the frame spacer WSPC to the mold case ML firmly. The surface of the mold case ML that holds the reflection sheet RFS and the light guide plate GLB is inclined as shown in FIG. 10A. In this embodiment, because the light guide plate GLB is tapered, the mold case ML that holds the light guide plate GLB is also provided with a slope according to the taper of the light guide plate GLB. The mold case ML is formed at its back with a notch MNOT at a location that, when the video signal line-side flexible printed circuit board FPC2 is bent, faces the position of the chip parts EP mounted on the FPC2.

Frame Spacer WSPC

FIG. 11A is a front view of the frame spacer WSPC, FIG. 11B a left side view of the frame spacer WSPC, FIG. 11C a right side view of the frame spacer WSPC, FIG. 11D a front side view of the frame spacer WSPC, and FIG. 11E a rear side view of the frame spacer WSPC. FIG. 12 shows a bottom view of the frame spacer WSPC. A cross section taken along the line I—I of FIG. 11D is shown in FIG. 13A. A cross section taken along the line II—II of FIG. 11D is shown in FIG. 13B. A cross section taken along the line III—III of FIG. 11C is shown in FIG. 13C. A cross section taken along the line IV—IV of FIG. 11C is shown in FIG. 13D. A cross section taken along the line V—V of FIG. 11A is shown in FIG. 13E. A cross section taken along the line VI—VI of FIG. 11A is shown in FIG. 13F.

The frame spacer WSPC is made by molding synthetic resin in one piece by using a single molding die. The frame spacer WSPC has a function of securing the light guide plate GLB to the mold case ML to prevent the light guide plate GLB from butting against the liquid crystal display element PNL. In this embodiment, the frame spacer WSPC also secures the polarizing reflection plate POR, the prism sheet PRS and the diffusion sheet SPS to the mold case ML to prevent them from coming into contact with the liquid crystal display element PNL. Further, the frame spacer WSPC also holds the peripheral parts of the polarizing reflection plate POR, the prism sheet PRS and the diffusion sheet SPS to prevent them from curving, so that the backlight can illuminate the liquid crystal display element PNL uniformly. The frame spacer WSPC is colored black to prevent light from the backlight from being reflected by the WSPC and adversely affecting the display. The frame spacer WSPC is colored black by forming it out of a black resin, mixing pigments such as carbon black in the resin, or coating the surface with a flat black paint. In FIG. 11 and FIG. 12, symbol WO denotes an opening provided in the frame spacer WSPC through which the light from the backlight illuminats the liquid crystal display element PNL. FK denotes a hook provided to the frame spacer WSPC that fits into the hook hole NH of the opening portion MO to firmly join the frame spacer WSPC to the opening portion MO.

Lower Shield Case LF1, LF2

FIG. 14A shows a front view of the lower shield case LF1, FIG. 14C is a right side view of the lower shield case LF1, FIG. 14B is a left side view of the lower shield case LF1, and FIG. 14D is a front side view of the lower shield case LF1.

FIG. 15A shows a front view of the lower shield case LF2, FIG. 15C is a right side view of the lower shield case LF2, FIG. 15B is a left side view of the lower shield case LF2, FIG. 15D is a front side view of the shield case LF2, and FIG. 15E is a rear side view of the lower shield case LF2.

The lower shield cases LF1, LF2 are made by a press forming technique, i.e., by blanking and bending a single metal plate.

The first lower shield case LF1 and the second lower shield case LF2 cover the bottom surface of the mold case ML and have the function of blocking harmful electromagnetic waves EMI emitted from the liquid crystal display module MDL.

The first lower shield case LF1 receives a bent claw NL of the shield case SHD at its claw receiving portion NRM and secured to the liquid crystal display module MDL. The first lower shield case LF1 is also secured to the mold case ML by inserting screws through the screw holes NHM1 and screw notches NHM2.

The second lower shield case LF2, too, receives a bent claw NL of the shield case SHD at its claw receiving portion NRM and secured to the liquid crystal display module MDL.

HLD1, HLD2, HLD3 and HLD4 of FIG. 14A and 15A denote mounting holes formed in the lower shield cases LF1, LF2. The shield case SHD and mold case ML, too, have mounting holes aligned with the corresponding holes of the lower shield cases LF1, LF2. Screws are inserted through the mounting holes of the shield case SHD, the mold case ML and the lower shield cases LF1, LF2 to fasten and mount them to a product to which the liquid crystal display device is applied.

The second lower shield case LF2 also has the function of holding the bent video signal line-side flexible printed circuit board FPC2 as shown in FIG. 4A.

Symbol FG1 denotes a frame ground provided to the second lower shield case LF2 so as to electrically connect the case LF2 with the ground line of the FPC2. An enlarged view of part I enclosed by a dashed line of FIG. 15A is shown in FIG. 15F. A cross section taken along the line II—II of FIG. 15F is shown in FIG. 15G. The frame ground FG1 is fabricated by a press forming technique, i.e., blanking and bending a metal plate.

FK denotes a hook. A cross section taken along the line III—III of FIG. 15E is shown in FIG. 15H. The hook FK is hooked in the hook hole HK formed in the shield case SHD to couple the second lower shield case LF2 to the shield case SHD.

The second lower shield case LF2 is corrugated for reinforcement. A cross section taken along the line IV—IV of FIG. 15A is shown in FIG. 15I. The second lower shield case LF2 has the corrugated portion of FIG. 15I along a long side. The first lower shield case LF1 and the shield case SHD, too, are provided with corrugated portions for reinforcement.

Prism Sheet PRS

Figure 16A:
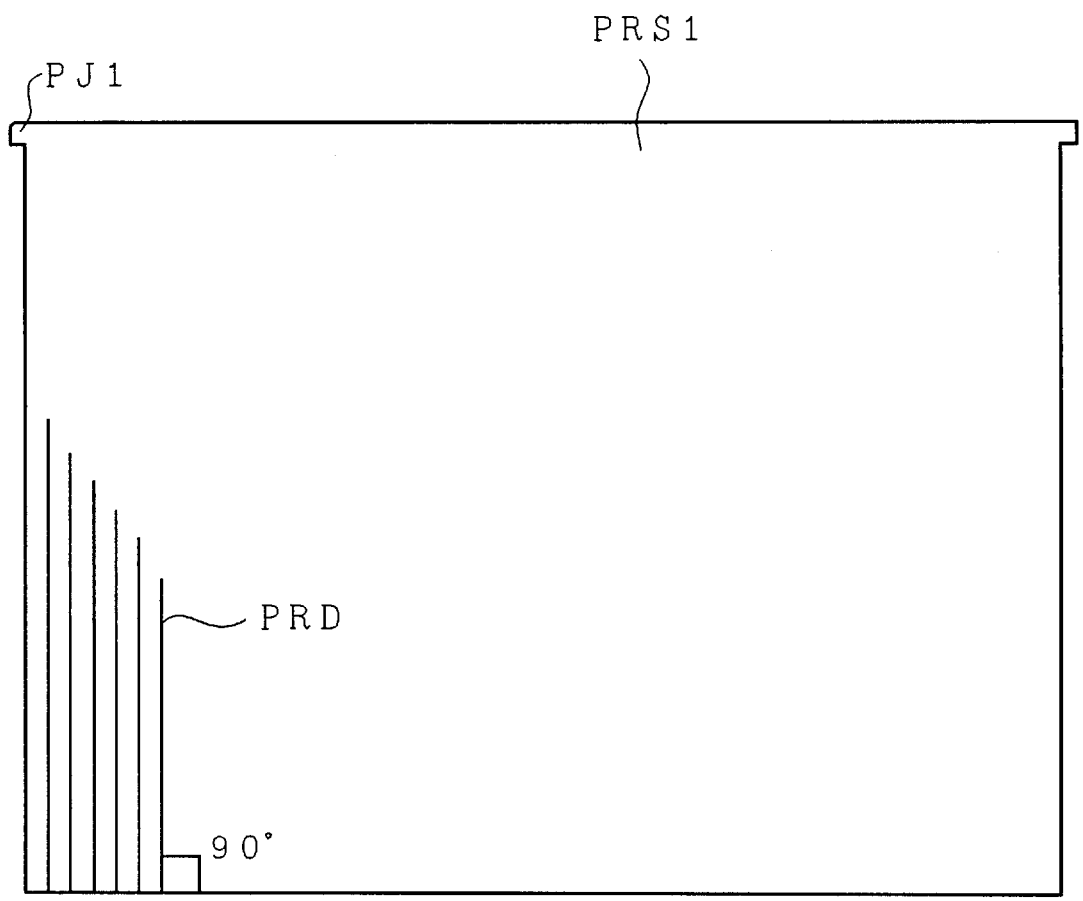
FIG. 16A is a plan view of a first prism sheet PRS1.
Figure 16B:
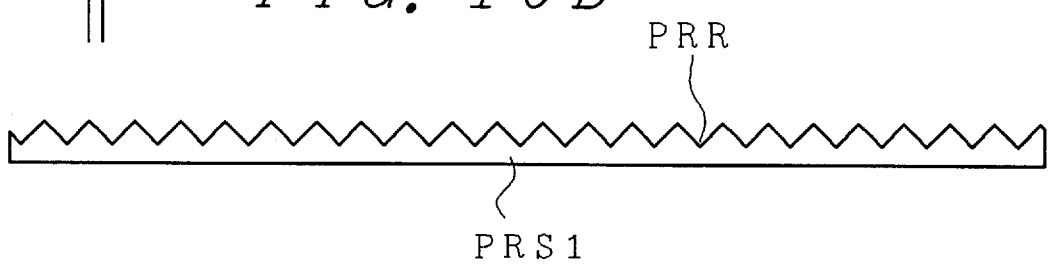
FIG. 16B is a side view of the first prism sheet PRS1 as viewed from the direction of the arrow of FIG. 16A.
Figure 17A:
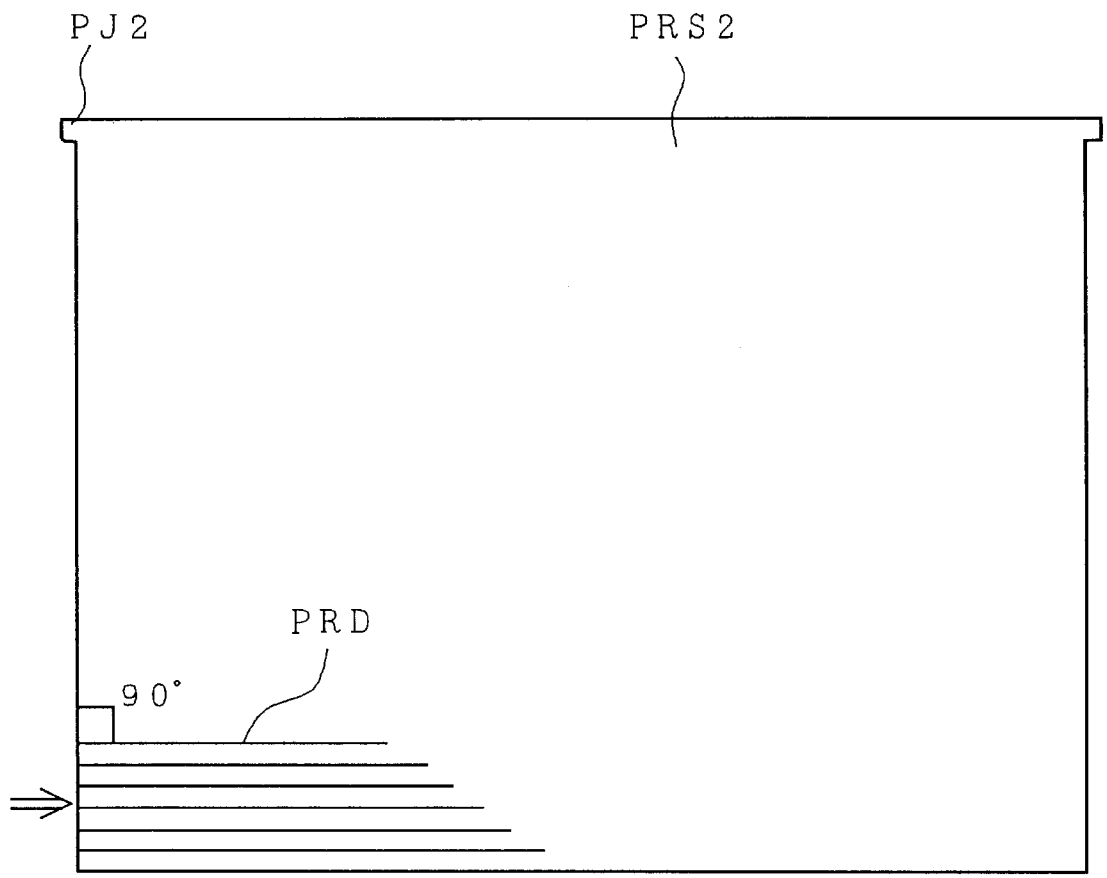
FIG. 17A is a plan view of a second prism sheet PRS2.
Figure 17B:
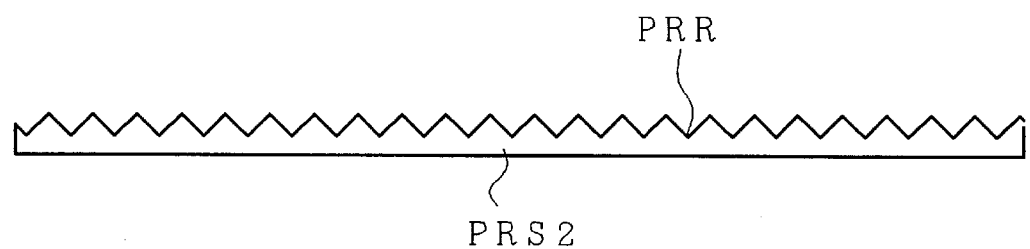
FIG. 17B is a side view of the second prism sheet PRS2 as viewed from the direction of the arrow of FIG. 17A.

The prism sheet PRS comprises two prism sheets-a first prism sheet PRS1 and a second prism sheet PRS2. The plan view of the first prism sheet PRS1 is shown in FIG. 16A and the plan view of the second prism sheet PRS2 is shown in FIG. 17A. The prism sheet PRS is made of a transparent film, and at least one of its surfaces is provided with prism grooves PRR. The prism sheet PRS collects light coming from the light guide plate GLB and improves the luminance of the backlight. The first prism sheet PRS1 is provided with a prism groove PRR of FIG. 16B when viewed from the direction of the arrow of FIG. 16A and collects light in the direction of the long side of the first prism sheet PRS1. The second prism sheet PRS2 has prism grooves PRR of FIG. 17 when viewed from the direction of the arrow of FIG. 17A and collects light in the direction of the short side of the second prism sheet PRS2. Because the light collecting directions of the first prism sheet PRS1 and the second prism sheet PRS2 differ, it is possible to collect light in any direction by stacking the first prism sheet PRS1 and the second prism sheet PRS2.

The first prism sheet PRS1 and the second prism sheet PRS2 are stacked one on the other, with one surface of the film not provided with the prism grooves PRR facing the other surface provided with the prism grooves PRR. This arrangement prevents deterioration of display quality caused by the so-called Newton's rings—the fringes produced by the interference between the light reflected from the surface of the first prism sheet PRS1 and the light reflected from the surface of the second prism sheet PRS2.

Symbol PJ1 and PJ2 denote projections to align the directions of mounting of the first and second prism sheets PRS1, PRS2 and have different shapes to distinguish the PRS1 and the PRS2.

Polarizing Reflection plate POR

Figure 18:
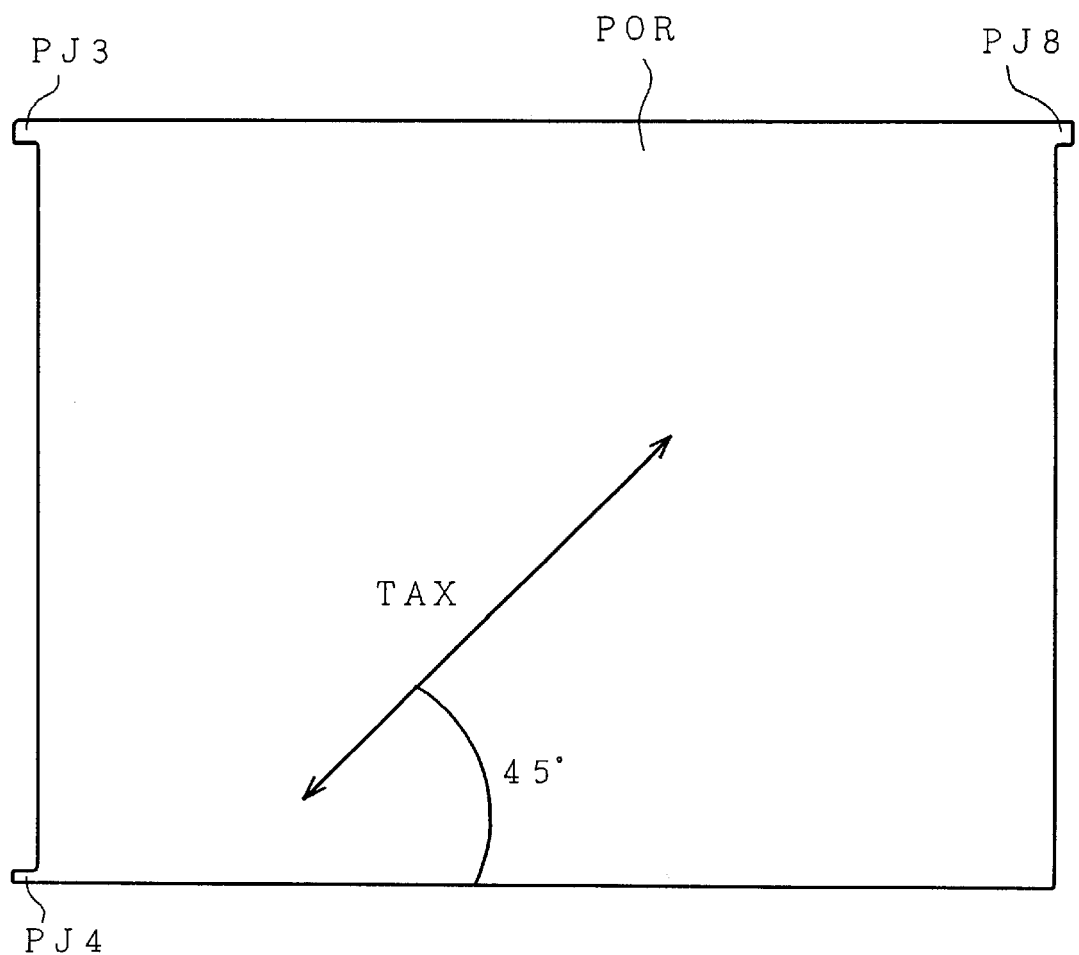
FIG. 18 is a plan view of a polarized light reflection plate POR.

FIG. 18 is the plan view of the polarizing reflection plate POR. The polarizing reflection plate POR is made of plastic film, and has a property to transmit only polarized light with a specific polarizing axis and reflect polarized light with other polarizing axes. A known example of the polarizing element is the one that uses the cholesteric liquid crystal disclosed in U.S. Pat. No. 5,325,218. Other examples of polarizing element are found in Japanese Patent Laid-Open No. 212104/1992, 30816/1990, 168626/1988, and U.S. Pat. No. 5,333,072. The polarizing axis of light which the polarizing reflection plate POR transmits is called a transmission axis. In this embodiment, the transmission axis TAX of the polarizing reflection plate POR is aligned with the transmission axis of the polarizing plate POL2 which is provided on the surface of the liquid crystal display element PNL illuminated by the backlight. Hence, the light emerging from the polarizing reflection plate POR passes through the lower polarizing plate POL2 without being absorbed by it, and thus the amount of light passing through the liquid crystal display element PNL increases. The light reflected by the polarizing reflection plate POR is returned toward the light guide plate GLB side, i.e., the light source side and, while the light goes back and forth between the polarizing reflection plate POR and the light source side, it is converted into light that can pass through the polarizing reflection plate POR, i.e., the light that can pass through the polarizing plate POL2, thus improving the emission efficiency of the backlight. Hence, the polarizing reflection plate POR minimizes the power consumption and improves the luminance of the liquid crystal display module MDL. Because the light emerging from the polarizing reflection plate POR is polarized light, it is possible to omit the polarizing plate POL2 by aligning the transmission axis TAX of the polarizing reflection plate POR with the orientation direction of the orientation film of the liquid crystal display element PNL.

PJ3, PJ4 and PJ8 denote projections to ensure that the polarizing reflection plate POR is mounted in a predetermined direction. To distinguish the polarizing reflection plate POR from other optical films such as the first prism sheet PRS1 and second prism sheet PRS2, these two or more projections are different in shape from PJ1 and PJ2. The polarizing reflection plate POR needs to be precisely aligned with the lower polarizing plate POL2 and the orientation film of the liquid crystal display element PNL, and therefore the alignment is made at three points. By aligning the POR at two or more points, it is possible to prevent the polarizing reflection plate POR from being rotated and the transmission axis of the POR from becoming out of alignment with the polarizing axis of the POL2 and the orientation axis of the orientation film.

Fluorescent Tube LP

Figure 19B:
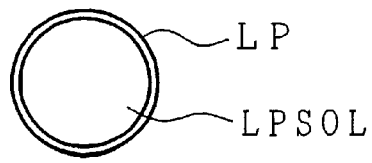
FIG. 19B is a side view of the fluorescent tube LP.
Figure 19A:
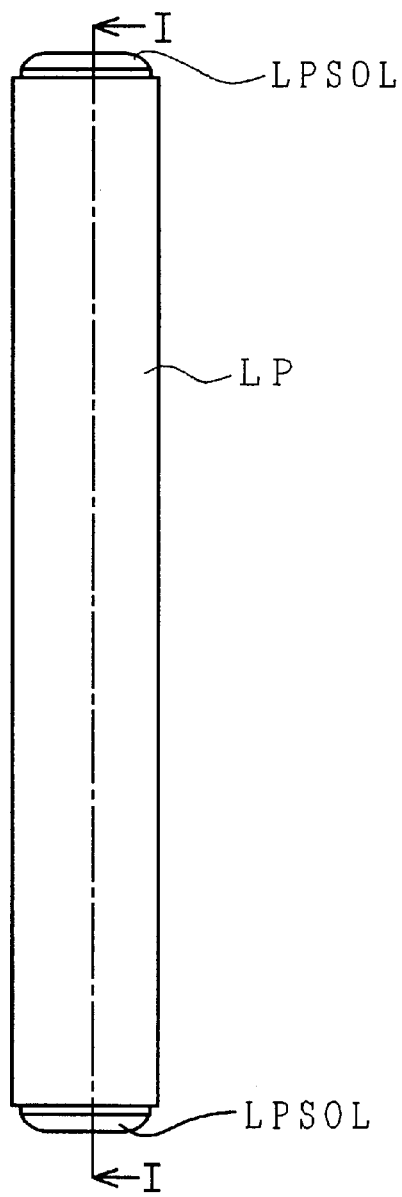
FIG. 19A is a plan view of a fluorescent tube LP.
Figure 19C:
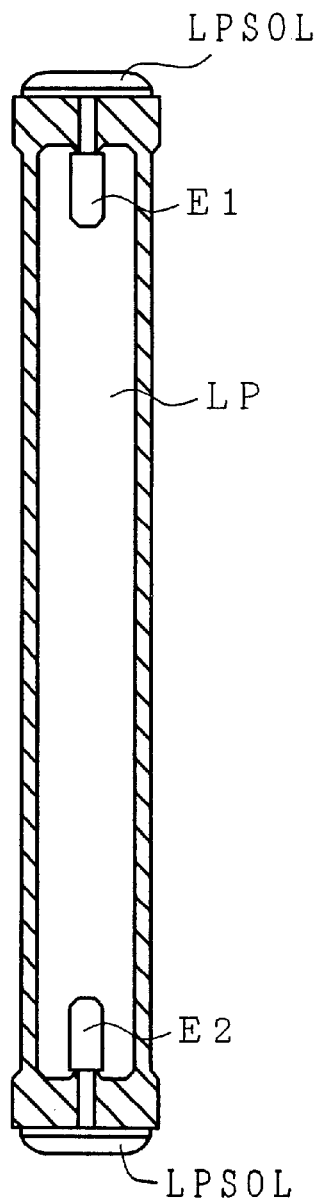
FIG. 19C is a cross section taken along the line I—I of FIG. 19A.

A plan view of the fluorescent tube LP is shown in FIG. 19A and a side view is shown in FIG. 19B. A cross section taken along the line I—I of FIG. 19A is shown in FIG. 19C. The fluorescent tube LP contains gas sealed in a glass tube whose inner surface is coated with phosphor. E1 and E2 denote electrodes. When a voltage is applied to the E1 and E2, a discharge occurs in the tube causing the fluorescent tube LP to emit light. The electrodes of the fluorescent tube LP have polarities, a high voltage side (hot side) and a low voltage side (cold side). In this example the electrode E1 is the high voltage side and the electrode E2 is the low voltage side. LPSOL denotes solder provided to the electrodes of the fluorescent tube LP. The electrodes E1, E2 are connected to the lamp cable LPC3 by the solder LPSOL.

Lamp Cable LPC3

Figures 20A, 20B, 20C:
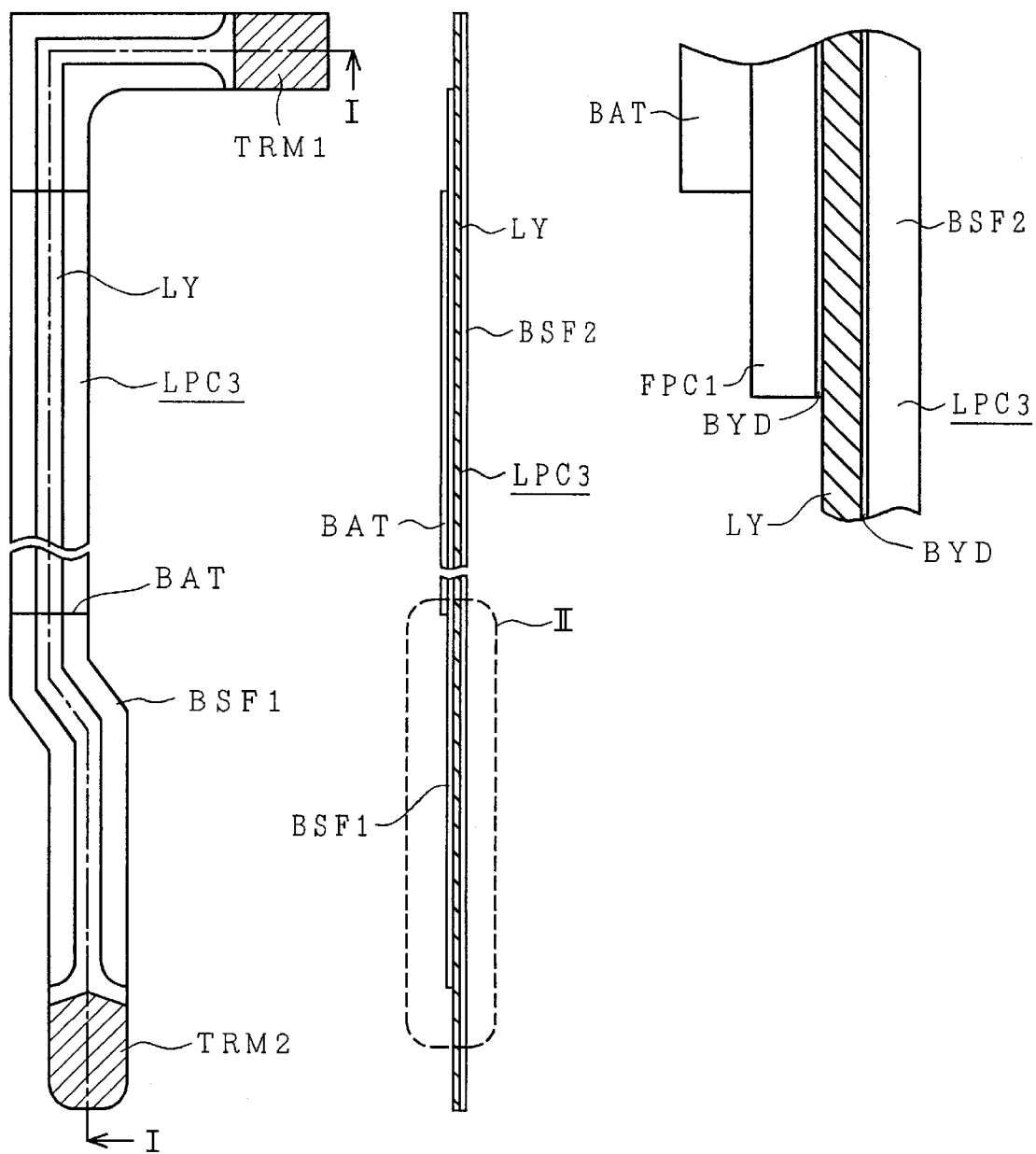
FIG. 20A is a plan view of a lamp cable LPC3.
FIG. 20B is a cross section taken along the line I—I of FIG. 20A.
FIG. 20C is an enlarged view of part II of FIG. 20B.

A plan view of the lamp cable LPC3 for supplying electricity to the fluorescent tube LP is shown in FIG. 20A. A cross section taken along the line I—I is shown in FIG. 20B. An enlarged view of part II enclosed by a dashed line is shown in FIG. 20C.

The lamp cable LPC3 is installed in the liquid crystal display module MDL and is formed as a flat cable to reduce the installation space as shown in FIG. 4. The lamp cable LPC3 has a construction in which a metal foil conductor LY is sandwiched between plastic films BSF1, BSF2, so that it can be bent flexibly. BYD denotes a bonding agent to bond the plastic films BSF1, BSF2 and the metal foil conductor LY together. The plastic film BSF1 has a double-sided adhesive tape BAT attached to its upper surface, so that it can be secured to another member, such as the lamp reflector LS as shown in FIG. 1A. TRM2 denotes a terminal that is connected to the electrode E1 or E2 of the fluorescent tube LP by the solder LPSOL. The terminal TRM2 has an elongate shape, for example an elliptical one, so that when it is soldered to the electrode E1 or E2, the solder LPSOL is exposed and seen as shown in FIG. 1C. Hence, the condition of the solder connection can be checked. The terminal TRM2 is connected to the low voltage side terminal E2 to reduce power consumption. TRM1 denotes a terminal that is connected to the lamp cable LPC2 led out of the shield case, as shown in FIG. 1A. One of the plastic films BSF1, BSF2 may be an insulating paint.

Rubber Bushings GB1, GB2

The rubber bushings GB1, GB2 holding the fluorescent tube LP are shown in FIGS. 21A, 21B, 21C, 21D, 21E, 22A, 22B and 22C.

Figure 21A:
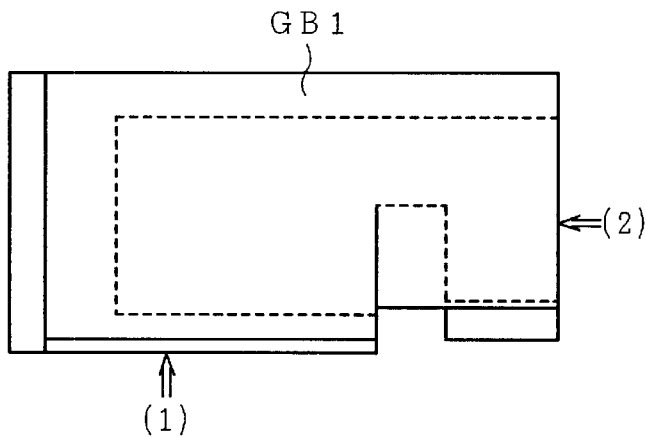
FIG. 21A is a plan view of a first rubber bushing GB1.
Figure 21C:
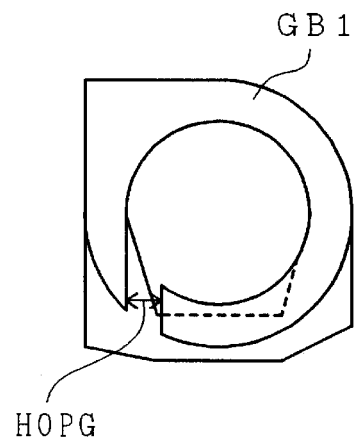
FIG. 21C is a view of the first rubber bushing GB1 as viewed from direction 2 of FIG. 21A.
Figure 21B:
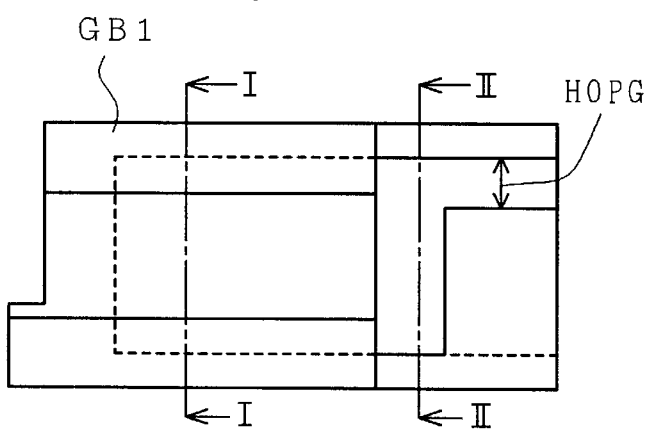
FIG. 21B is a view of the first rubber bushing GB1 as viewed from direction 1 of FIG. 21A.
Figure 21D:
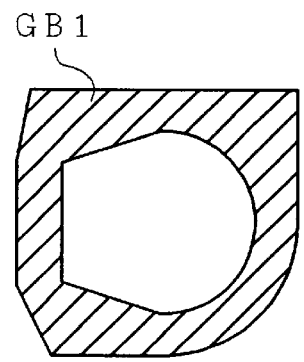
FIG. 21D is a cross section taken along the line I—I of FIG. 21B.
Figure 21E:
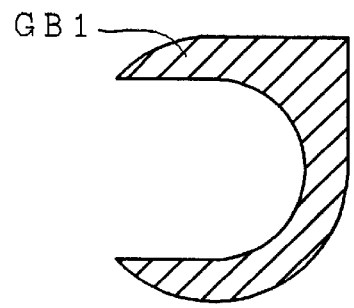
FIG. 21E is a cross section taken along the line II—II of FIG. 21B.

FIG. 21A illustrates, as viewed from one direction, the rubber bushing GB1 that holds the fluorescent tube LP on the side where the fluorescent tube LP is connected with the lamp cable LPC3. FIG. 21B is a view as viewed from direction 1 and FIG. 21C is a view as viewed from direction 2. A cross section taken along the line I—I is shown in FIG. 21D and a cross section taken along the line II—II is shown in FIG. 21E.

Figure 22A:
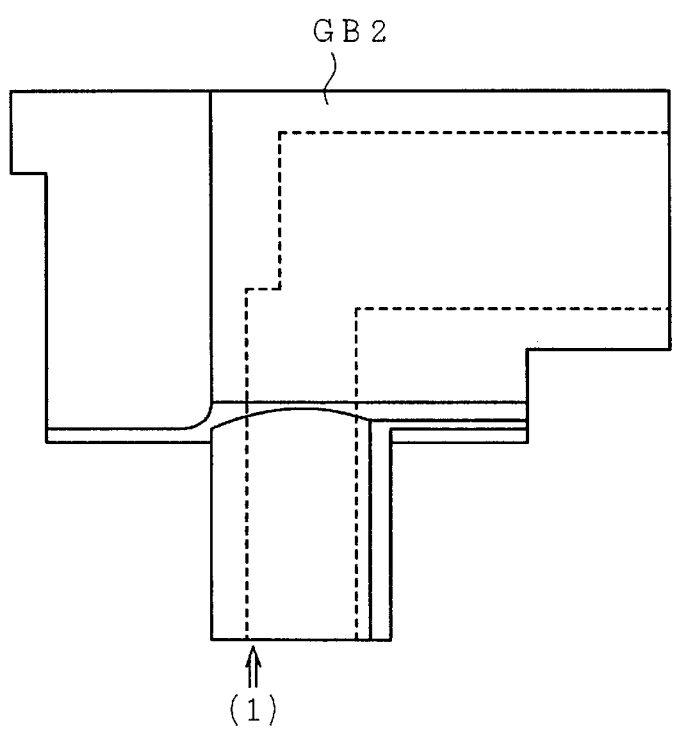
FIG. 22A is a plan view of a second rubber bushing GB2.
Figure 22C:
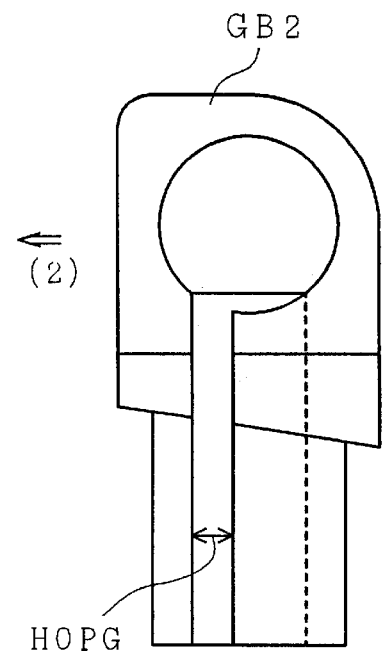
FIG. 22C is a view of the second rubber bushing GB2 as viewed from direction 2 of FIG. 22A.
Figure 22B:
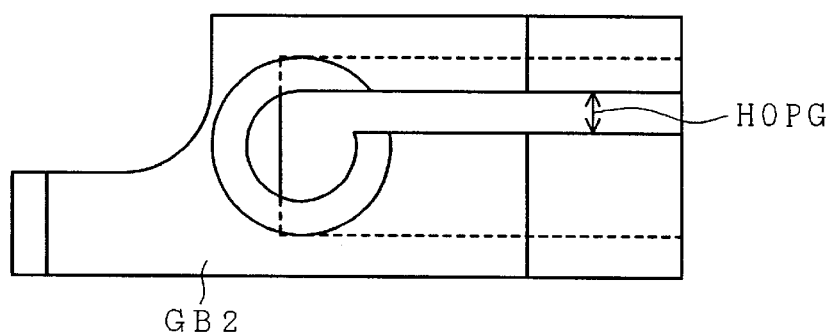
FIG. 22B is a view of the second rubber bushing GB2 as viewed from direction 1 of FIG. 22A.

FIG. 22A shows the rubber bushing GB1 holding one end of the fluorescent tube LP and the second rubber bushing GB2 holding the other end, as viewed from one direction. FIG. 22B shows the rubber bushings GB1, GB2 as viewed from direction 1 and FIG. 22C shows them as viewed from direction 2.

FIG. 1A shows rubber bushings GB1 and GB2, which hold the fluorescent tube LP.

The rubber bushings GB1, GB2 are made of an insulating elastic material such as rubber to protect the fluorescent tube LP against vibrations and impacts. Because the rubber bushings GB1, GB2 are each provided with a slit HOPG through which the lamp cables LPC3 and LPC1 are passed, the work of covering the rubber bushings GB1, GB2 over the electrodes of the fluorescent tube LP after connecting the lamp cables LPC3, LPC1 to these electrodes can be done easily. The rubber bushings GB1, GB2 are, as shown in FIG. 1A, fitted into the lamp reflector LS to fix the fluorescent tube LP. The rubber bushing GB2 is provided with a notch to accommodate the connecting portion between the lamp cable LPC2 and the lamp cable LPC3, as shown in FIG. 1A.

Lamp Reflector LS

Figure 23A:
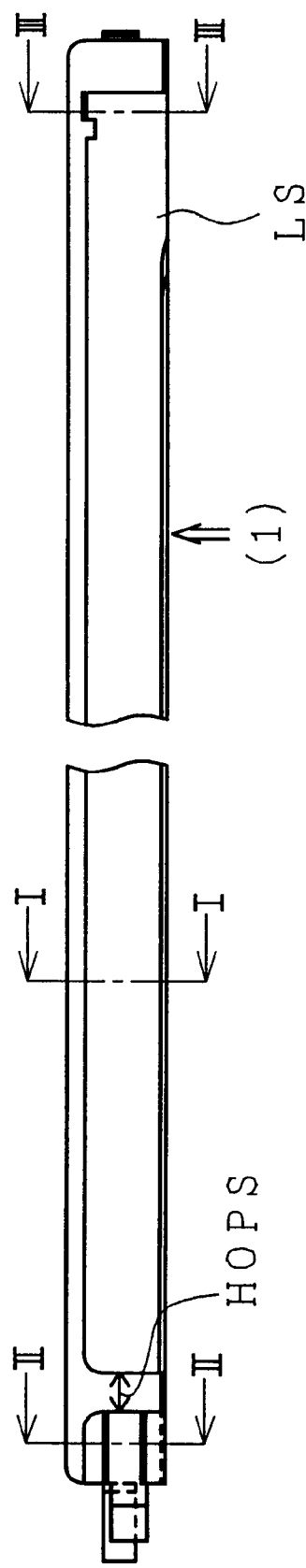
FIG. 23A is a plan view of a lamp reflector LS.
Figure 23B:
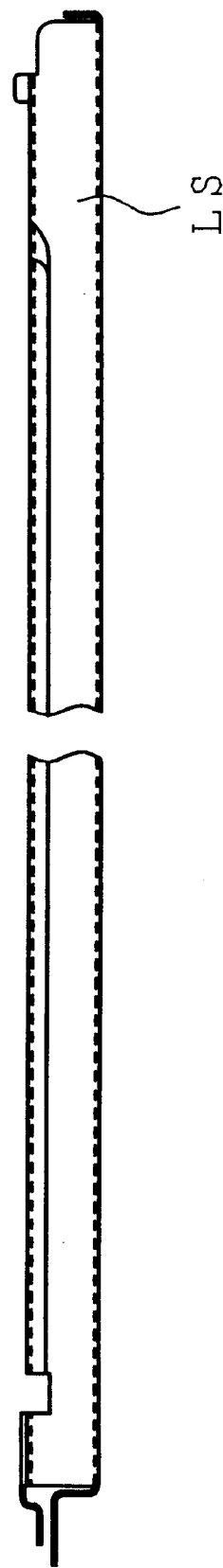
FIG. 23B is a view of the lamp reflector LS as viewed from direction 1 of FIG. 23A.
Figure 24A:
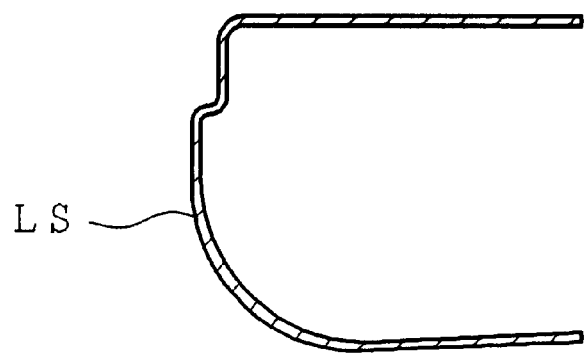
FIG. 24A is a cross section of the lamp reflector LS taken along the line I—I of FIG. 23A.
Figure 24B:
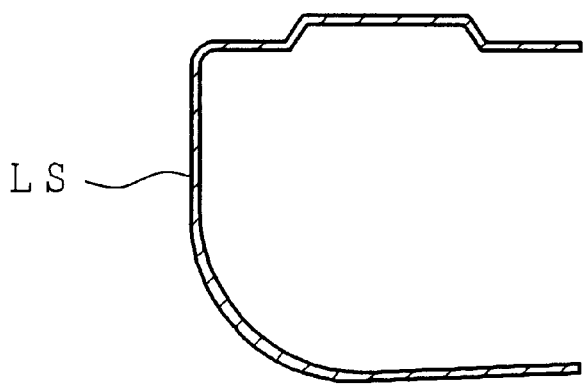
FIG. 24B is a cross section of the lamp reflector LS taken along the line II—II of FIG. 23A.
Figure 24C:
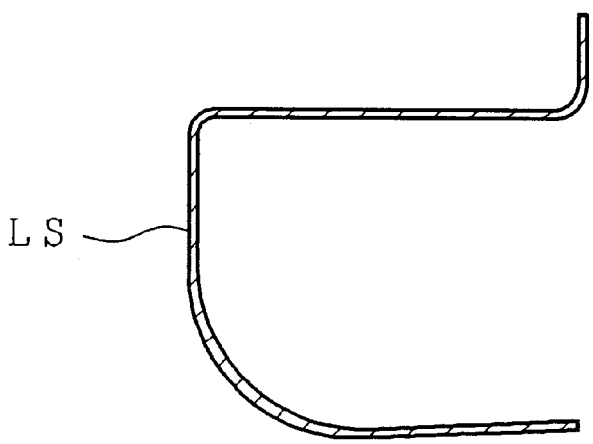
FIG. 24C is a cross section of the lamp reflector LS taken along the line III—III of FIG. 23A.

FIG. 23A shows the lamp reflector LS, as viewed from one direction, which reflects light from the fluorescent tube LP and directs light to the light guide plate GLB. The lamp reflector LS as viewed from direction 1 is shown in FIG. 23B. A cross section taken along the line I—I is shown in FIG. 24A, a cross section along the line II—II is shown in FIG. 24B, and a cross section along the line III—III is shown in FIG. 24C.

Silver is deposited on the surface of the lamp reflector LS on which the fluorescent tube LP is provided by vacuum evaporation to enhance the light reflectance. The lamp reflector LS is U-shaped in cross section to hold the fluorescent tube LP through the rubber bushings GB1, GB2, and made by bending a stiff metal plate, such as a brass plate.

The lamp reflector LS may be made by bending an aluminum plate. When aluminum is used for the lamp reflector LS, a light reflection surface can be formed by surface-processing the surface on which the fluorescent tube LP is installed. The lamp reflector LS made of aluminum is characterized by a low parts cost but is inferior in terms of the light reflectance (or light emitting efficiency of the backlight) to the lamp reflector LS whose reflection surface is silver-vaporized.

The lamp reflector LS has a slit HOPS through which the lamp cable LPC3 is passed. As shown in FIG. 1B, the lamp cable LPC3, after being connected to the electrode E2 of the fluorescent tube LP, is passed through the slit of the rubber bushing GB1 and the slit HOPS to come out of the lamp reflector LS. The lamp cable LPC3 that is led out of the lamp reflector LS is, as shown in FIG. 1A, led along the outside of the lamp reflector LS to the rubber bushing GB2 side and is connected to the lamp cable LPC2. Hence, because the space between the lamp cable LPC3 and the fluorescent tube LP is maintained by the lamp reflector LS, there is no risk that the luminance of the fluorescent tube LP decreases or power consumption increases due to a leakage current between the lamp cable LPC3 and the fluorescent tube LP.

Further, as shown in FIG. 1A, because the lamp reflector LS supports the rubber bushings GB1, GB2 and the lamp cable LPC3 is secured to the lamp reflector LS with the double-sided adhesive tape BAT, it is possible to handle the fluorescent tube LP, the rubber bushings GB1, GB2, the lamp reflector LS and the lamp cable LPC3 as one lamp unit, making the assembly of the liquid crystal display module and the replacement of the fluorescent tube easy.

O-Ring OL

FIG. 25A shows the O-ring OL that prevents the fluorescent tube LP from coming into contact with the lamp reflector LS. A cross section taken along the line I—I is shown in FIG. 25B.

The fluorescent tube LP fitted in the center hole of the O-ring OL is, as shown in FIG. 1A, installed together with the O-ring OL inside the lamp reflector LS. The O-ring OL thus prevents the contact between the fluorescent tube LP and the lamp reflector LS. The O-ring OL is made of a transparent elastic material, such as silicone rubber, to ensure that the luminance of the fluorescent tube LP at locations where the O-rings OL are installed is not lowered.

Light Guide plate GLB

Figure 26B:
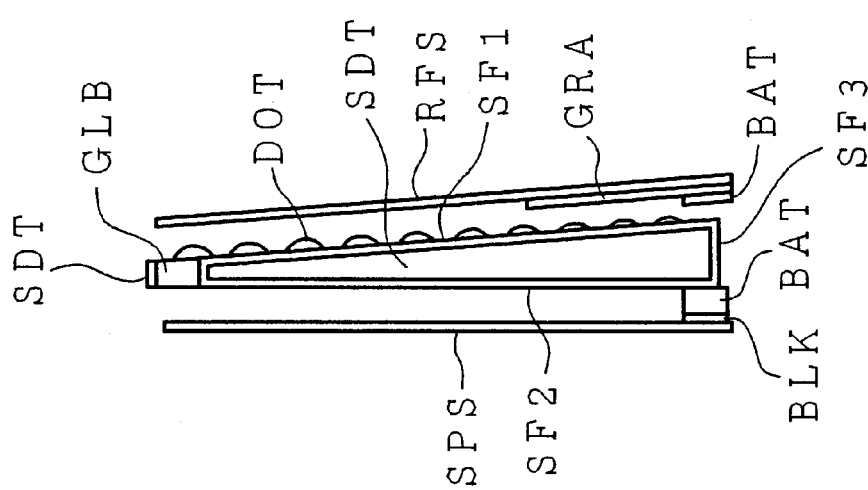
FIG. 26B is a side view of a unit of a combination of the light guide plate GLB, the reflection sheet RFS and the diffusion sheet SPS.
Figure 26A:
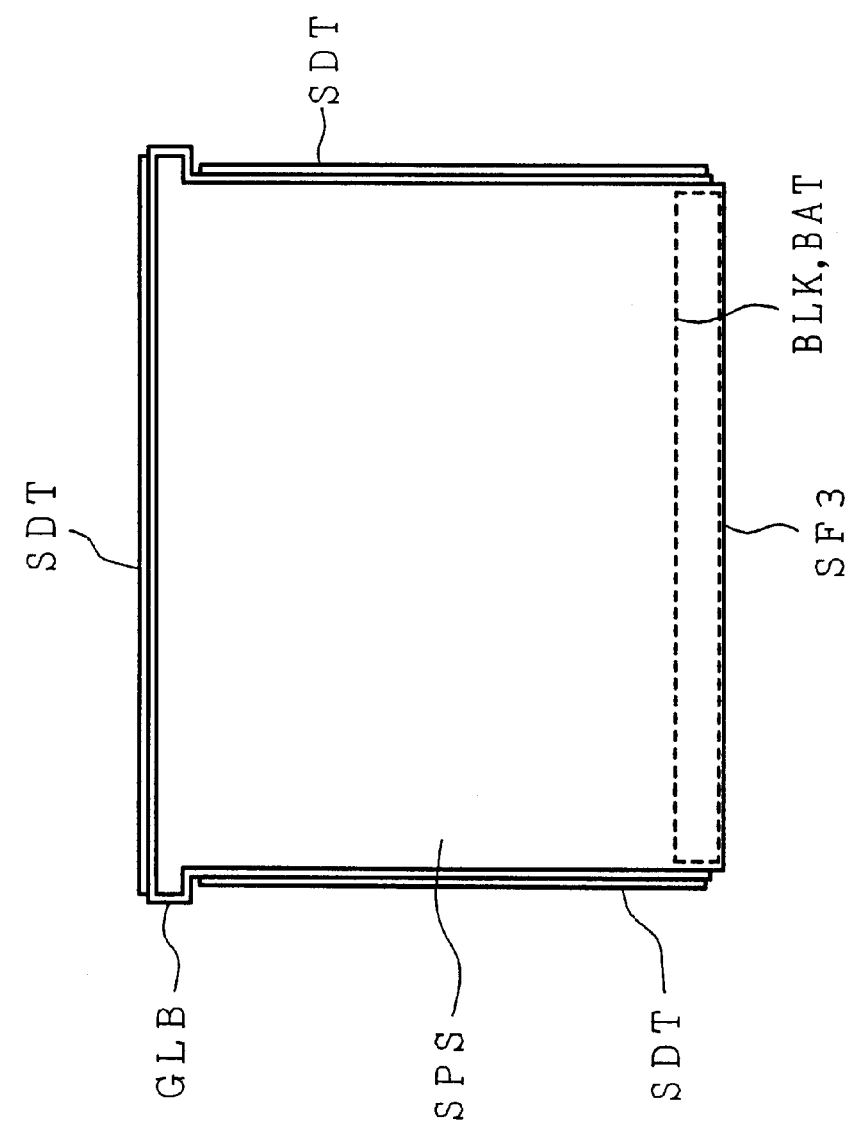
FIG. 26A is a plan view of a unit of a combination of a light guide plate GLB, a reflection sheet RFS and a diffusion sheet SPS, as viewed from the diffusion sheet SPS side.

FIG. 26 shows a unit that combines the light guide plate GLB, the reflection sheet RFS and the diffusion sheet SPS. FIG. 26A is a plan view of the unit of the GLB, RFS and SPS, as viewed from the diffusion sheet SPS side. FIG. 26B is a side view of the unit.

Figure 27B:
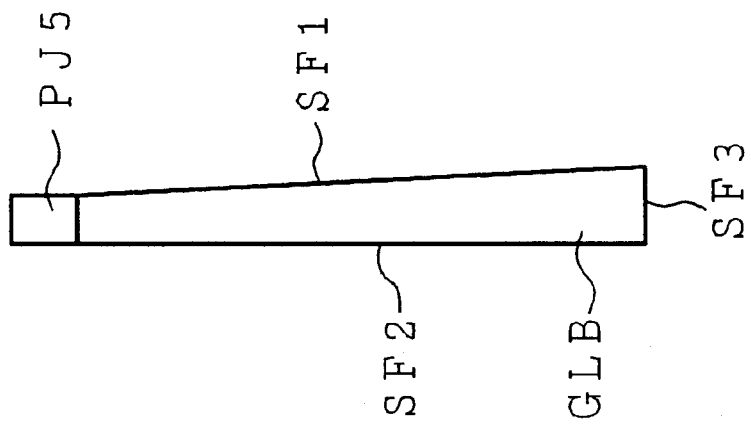
FIG. 27B is a side view of the light guide plate GLB as viewed from direction 1 of FIG. 27A.
Figure 27A:
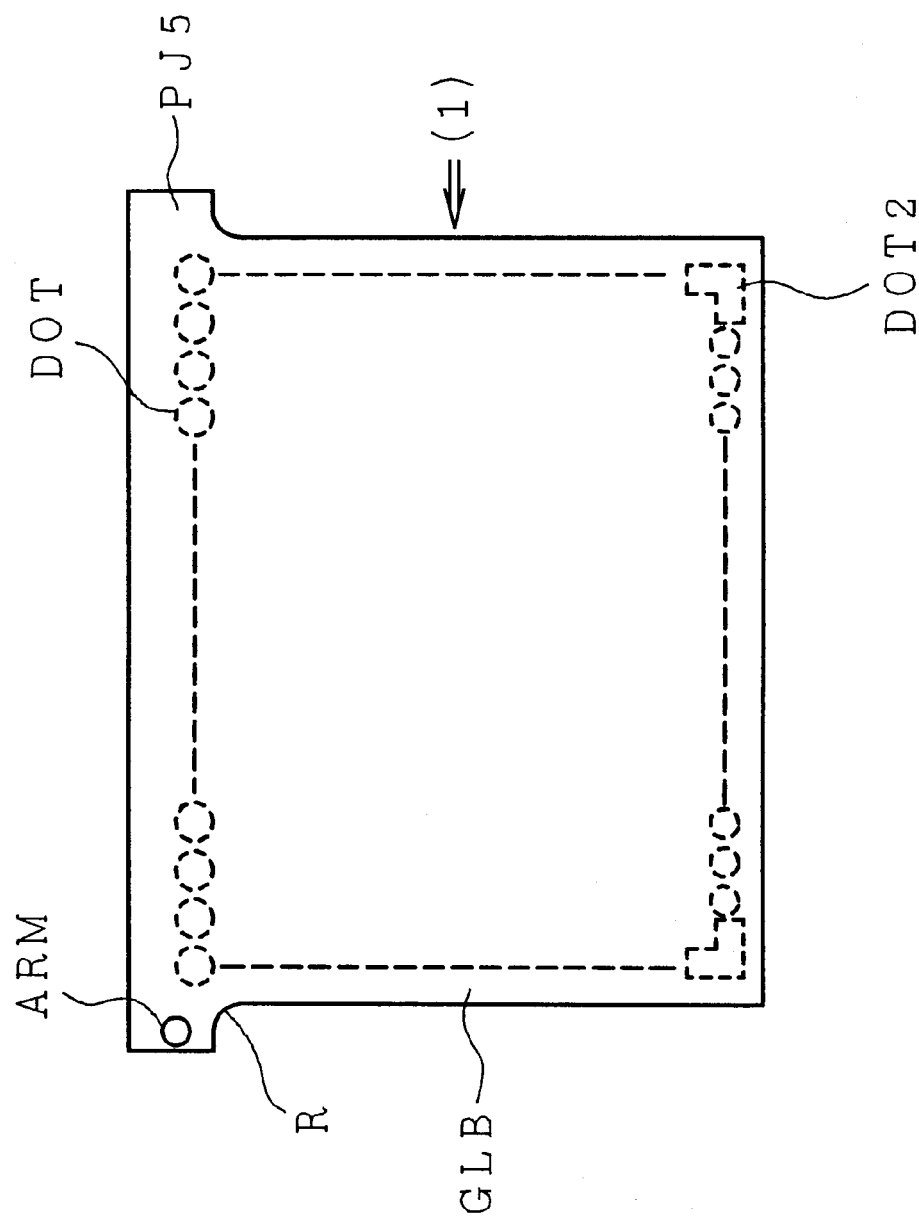
FIG. 27A is a plan view of the light guide plate GLB.

FIG. 27 is a plan view of the light guide plate GLB that guides light from the fluorescent tube LP and forms a surface light source. FIG. 27B is a side view as viewed from direction 1. The light guide plate GLB is formed of a transparent solid material, such as acrylic resin. On one of the surfaces SF1 of the light guide plate GLB a pattern DOT (for example, a dot pattern) is formed by printing or the like, so that the light entering from the other surface SF3 is irregularly reflected by the pattern DOT and goes out from the surface SF2 opposite to the surface SF1. A pattern DOT2 at the corner of the light guide plate GLB is shaped like the letter L as shown in FIG. 27A. Because the corner portions of the light guide plate GLB decrease in luminance, the L-shaped patterns DOT2 are provided at the corners of the light guide plate GLB to enhance the luminance by increasing the area of irregular reflection. PJ5 denotes projections provided to the light guide plate GLB which are intended to define the direction in which the light guide plate GLB is mounted on the mold case ML and to prevent the light guide plate GLB from moving in the mold case ML. The projections PJ5 have curved surfaces R at their bases on the body of the light guide plate GLB to minimize the risk of breakage due to impacts. ARM denotes a marker on the surface SF1 side to indicate the surface to be printed with the pattern DOT. The marker ARM is provided not only in the effective area (where the pattern DOT is formed) but also in other areas such as the projection PJ5 to maintain uniformity of the light emerging from the light guide plate GLB. As shown in FIG. 26A and 26B, the side surface of the light guide plate GLB, except for the light incident surface SF3, is provided with an end-face tape SDT, which is made of a white film to return the light coming out of the side surface of the light guide plate GLB to the GLB.

Reflection Sheet RFS

As shown in FIG. 26B, the reflection sheet RFS is laid over the surface SF1 of the light guide plate GLB where the pattern DOT is formed.

Figure 28A:
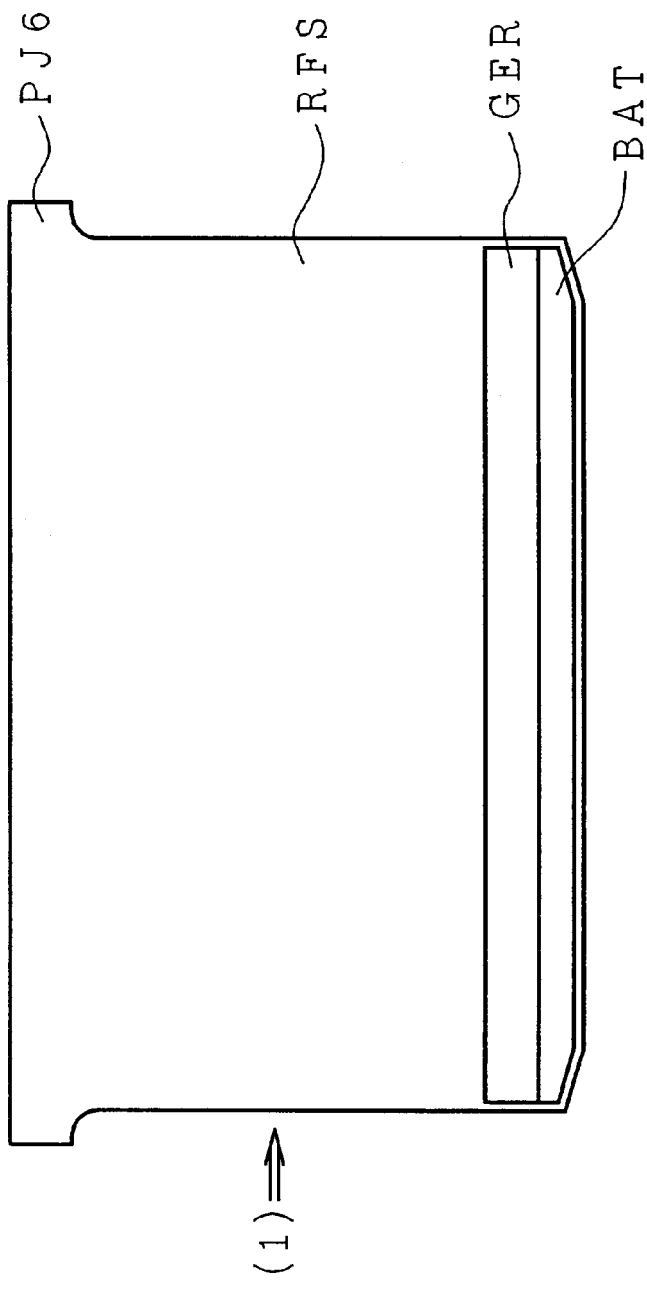
FIG. 28A is a plan view of the reflection sheet RFS.
Figure 28B:
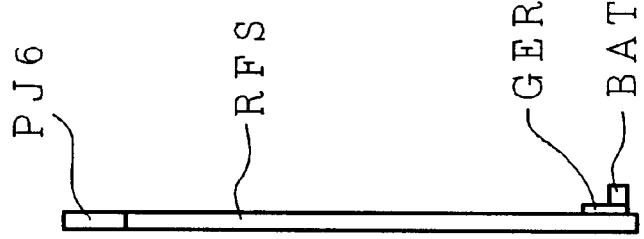
FIG. 28B is a side view of the reflection sheet RFS as viewed from direction 1 of FIG. 28A.

FIG. 28A is a plan view of the reflection sheet RFS, and FIG. 28B is a side view of the reflection sheet RFS as viewed from direction 1. The reflection sheet RFS is made of a white film to return the light coming out of the surface SF1 of the light guide plate GLB, where the pattern DOT is formed, to the light guide plate GLB.

Symbol PJ6 denotes projections provided to the reflection sheet RFS which are intended to define the direction in which the reflection sheet RFS is mounted on the mold case ML and to prevent the reflection sheet RFS from moving in the mold case ML. GER denotes a gray printed pattern, and BAT denotes a double-sided adhesive tape. As shown in FIG. 26B, the reflection sheet RFS is bonded to the light guide plate GLB with the double-sided adhesive tape BAT in such a way that the gray printed pattern GER is on the light incident surface SF3 of the light guide plate GLB. The reason why the gray printed pattern GER is placed on the light incident surface SF3 of the light guide plate GLB is to prevent the generation of so-called bright lines that increase the luminance on the light incident surface SF3 side compared with other regions of the light guide plate GLB.

Diffusion Sheet SPS

As shown in FIG. 26B, the diffusion sheet SPS is laid over the surface SF2 of the light guide plate GLB from which light is sent out. The reflection sheet RFS diffuses the light coming out of the surface SF2 of the light guide plate GLB to form a uniform surface light source.

Figure 29B:
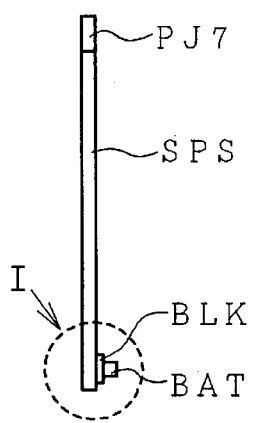
FIG. 29B is a side view of the diffusion sheet SPS as viewed from direction 1 of FIG. 29A.
Figure 29A:
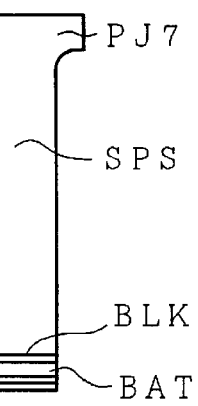
FIG. 29A is a plan view of the diffusion sheet SPS.

FIG. 29A shows a plan view of the diffusion sheet SPS and FIG. 29B is a side view of the diffusion sheet SPS as viewed from direction 1. The diffusion sheet SPS is made by roughening the surface of a transparent film. PJ7 denotes projections provided to the diffusion sheet SPS which are intended to define the direction in which the diffusion sheet SPS is mounted on the mold case ML and to prevent the diffusion sheet SPS from moving in the mold case ML.

Figure 29C:
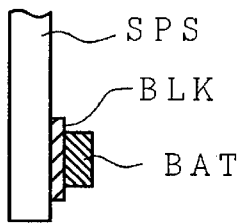
FIG. 29C is an enlarged view of part I of FIG. 29B.
Figure 29D:
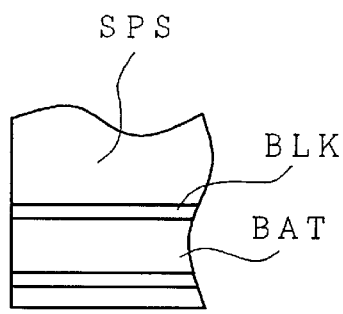
FIG. 29D is an enlarged view of part II of FIG. 29A.

FIG. 29C is an enlarged view of part I, and FIG. 29D an enlarged view of part II. BLK denotes a black printed pattern BLK, and BAT denotes a double-sided adhesive tape. The double-sided adhesive tape BAT is provided in the area where the black printed pattern BLK is formed. As shown in FIG. 26B, the diffusion sheet SPS is bonded to the light guide plate GLB with the double-sided adhesive tape BAT in such a way that the black printed pattern BLK is on the light incident surface SF3 of the light guide plate GLB. The reason why the diffusion sheet SPS is provided with the black printed pattern BLK on the light incident surface SF3 side of the light guide plate GLB is to prevent the generation of generally-called bright lines.

The rough surface of the diffusion sheet SPS is provided on the side opposite to the surface facing the light guide plate GLB. That is, in this embodiment, the prism sheet PRS is laid over the diffusion sheet SPS and the rough surface of the diffusion sheet SPS is provided on the surface facing the prism sheet PRS, as shown in FIG. 4A. Roughening the surface of the diffusion sheet SPS facing the prism sheet PRS can prevent the generation of Newton's rings described earlier on the contact surface between the diffusion sheet SPS and the prism sheet PRS.

Liquid Crystal Display Element PNL

Figures 30A, 30B:
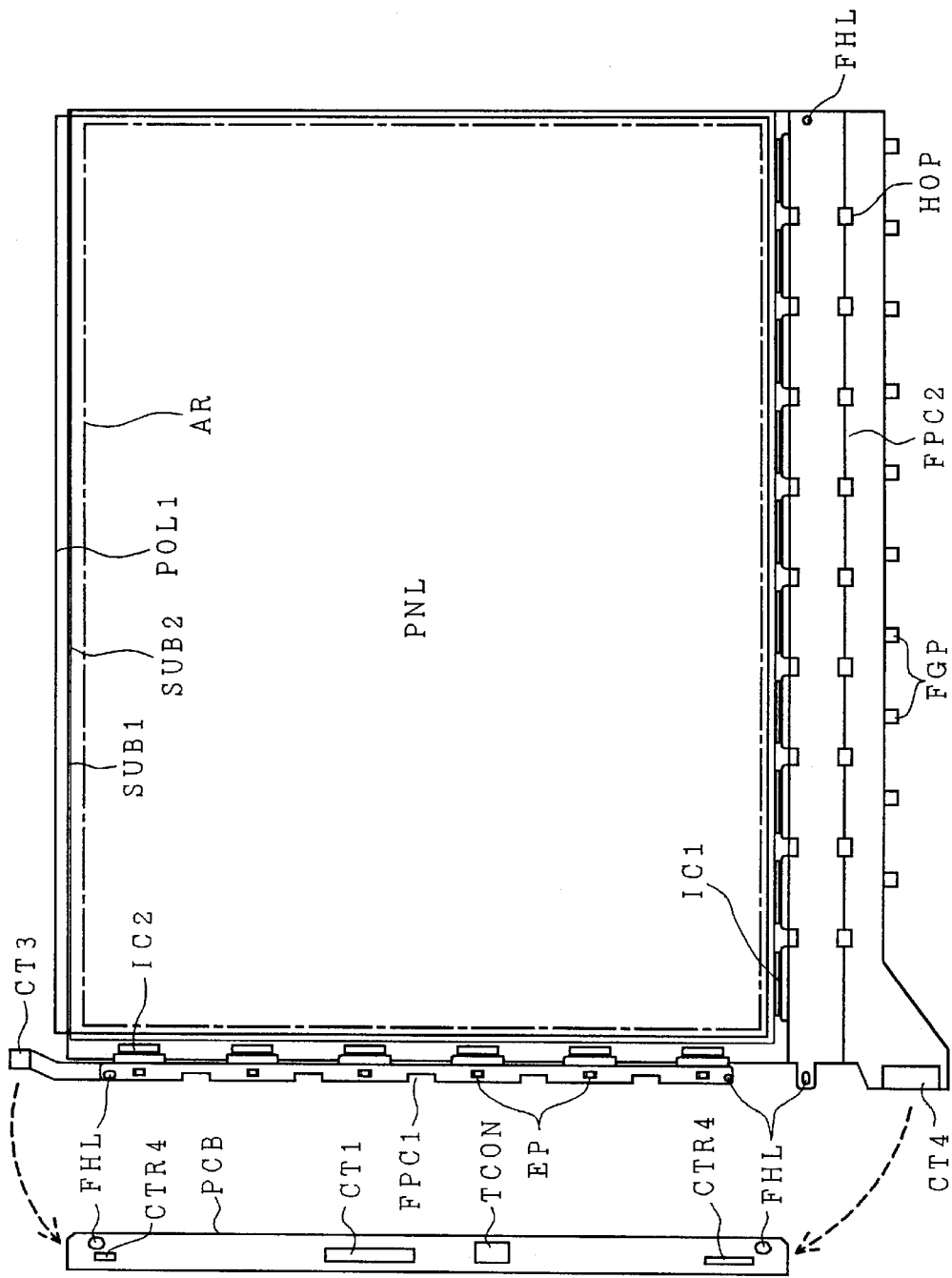
FIG. 30A is a plan view of a liquid crystal display element PNL mounted at its outer periphery with a scan signal line-side flexible printed circuit board FPC1 and with a video signal line-side flexible printed circuit board FPC2 before being bent.
FIG. 30B is a plan view showing an interface printed circuit board PCB.

FIG. 30 shows the scan signal line-side flexible printed circuit board FPC1 and the video signal line-side flexible printed circuit board FPC2 before being bent, both mounted at the peripheral part of the liquid crystal display element PNL.

Figure 34:
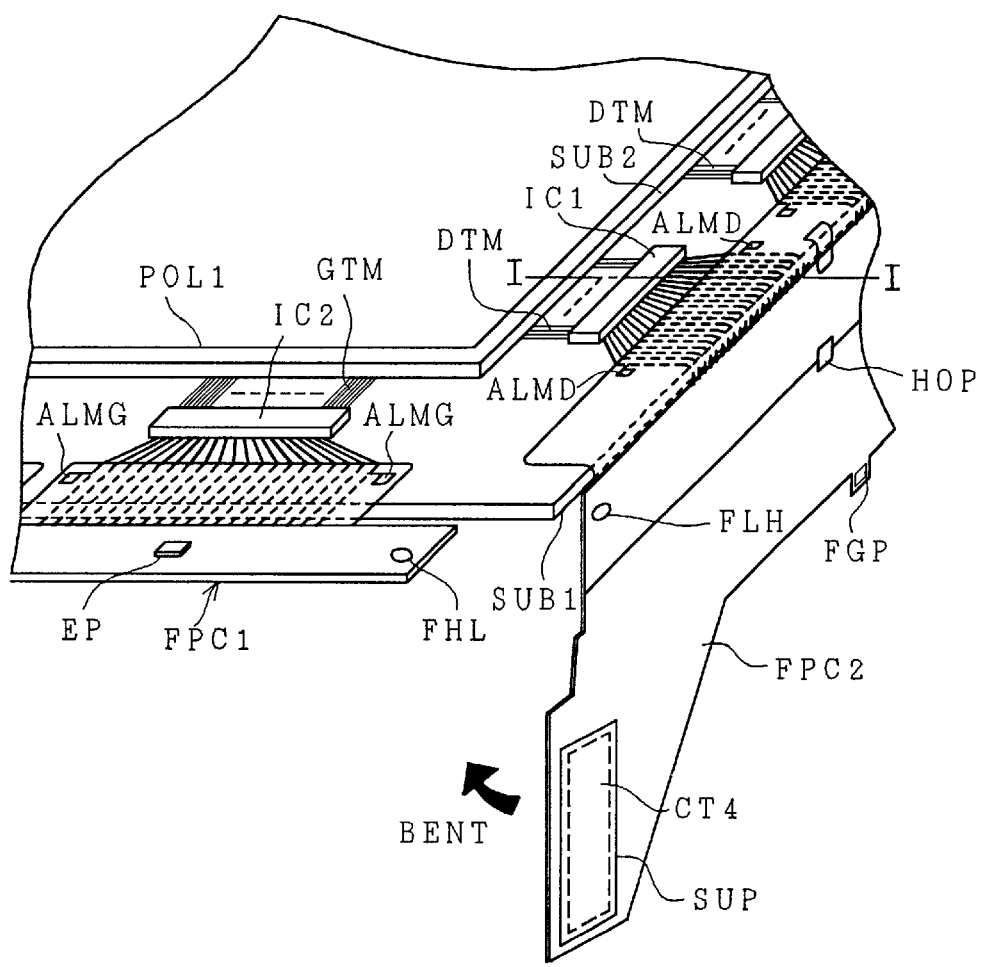
FIG. 34 is an enlarged perspective view of a part where the liquid crystal display element PNL is connected with the FPC1 and the FPC2.

FIG. 34 is an enlarged view of a portion where the liquid crystal display element PNL is connected with the flexible printed circuit boards FPC1, FPC2.

Figure 35:
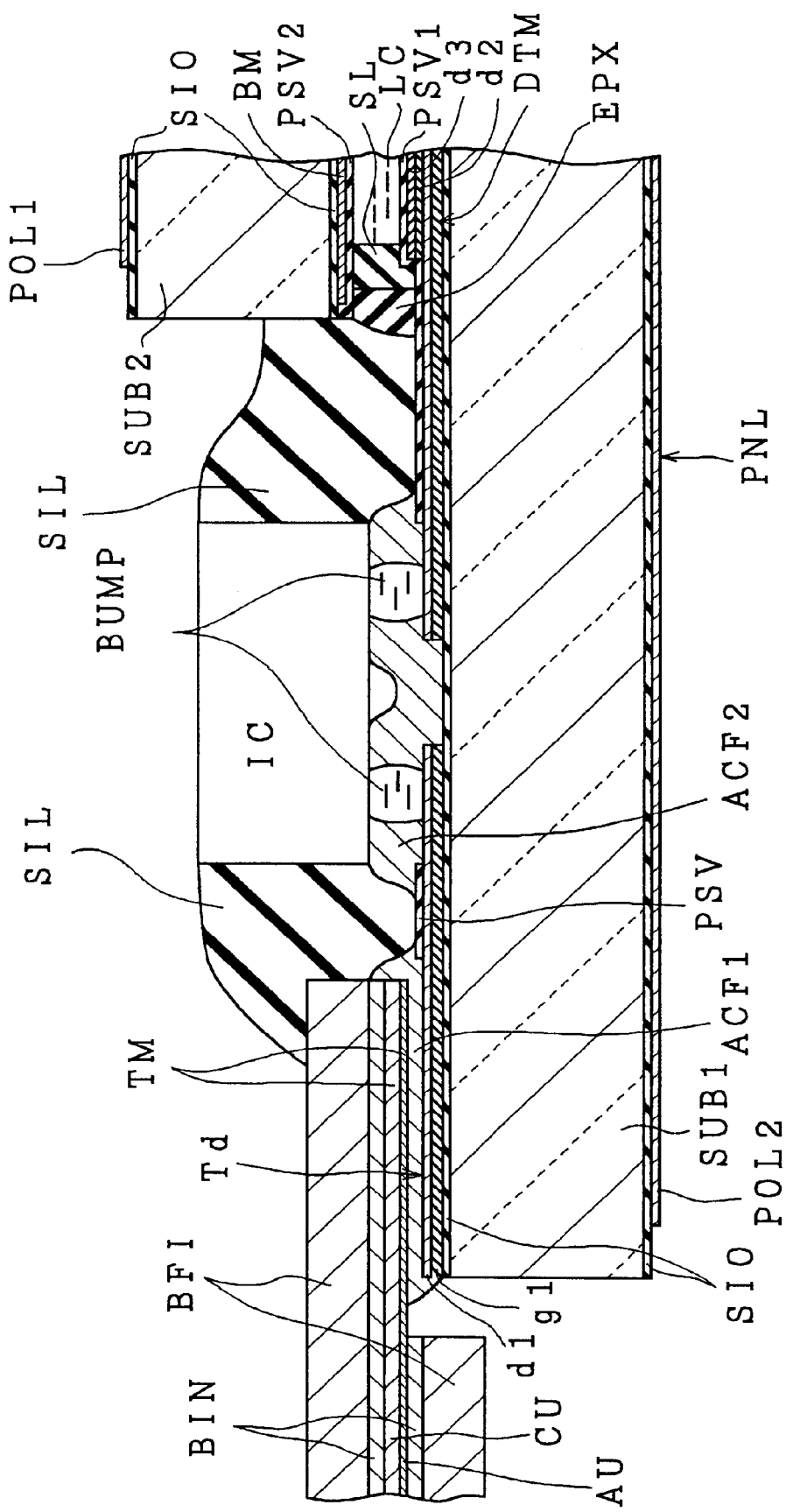
FIG. 35 is a cross section taken along the line I—I of FIG. 34.

FIG. 35 is a cross section taken along the line I—I of FIG. 34.

IC1 denotes a drain driver chip and IC2 denotes a gate driver chip.

In this embodiment, the driver chips IC1, IC2 are directly mounted on the substrate of the liquid crystal display element PNL by using the anisotropic conductive films ACF1, ACF2 and an ultraviolet setting resin (chip-on-glass mounting: COG mounting), as shown in FIG. 35. The COG mounting is suited for a high resolution liquid crystal display element PNL with large numbers of pixels. For a tape carrier package mounted with driver IC chips, for example, the connection of the driver chips with the liquid crystal display element PNL is difficult when the distance between the connection terminals becomes smaller than 100 microns due to elongation and shrinkage of the tape carrier film. For the COG mounting, however, connection can be made between the drive IC chips and the liquid crystal display element PNL even if the distance between the connection terminals DTM and GTM is less than 70 microns.

In this embodiment, the drain driver chips IC1 are arranged in a row along one long side of the liquid crystal display element PNL and the drain lines are led out to the long side. The pitch between the gate lines is relatively large, so that in this embodiment the terminals GTM are led out at one short side. If the definition becomes higher, the gate terminals GTM may be led out at the two opposite shorter sides.

In a system where the drain lines and the gate lines are alternately led out, although the connection between the drain terminals DTM or the gate terminals GTM and the bumps BUMP on the output side of the drive ICs becomes easy, a need arises to arrange the peripheral circuit boards at the peripheral portions along the two opposing long sides of the liquid crystal display element PNL, making the external dimension larger than that of the system where the terminals are led out at one side. Thus, this embodiment employs a multilayer flexible board and the drain lines are led out to only one side to reduce the picture-frame area.

Scan Signal Line-Side Flexible Printed Circuit Board FPC1

Figure 31A:
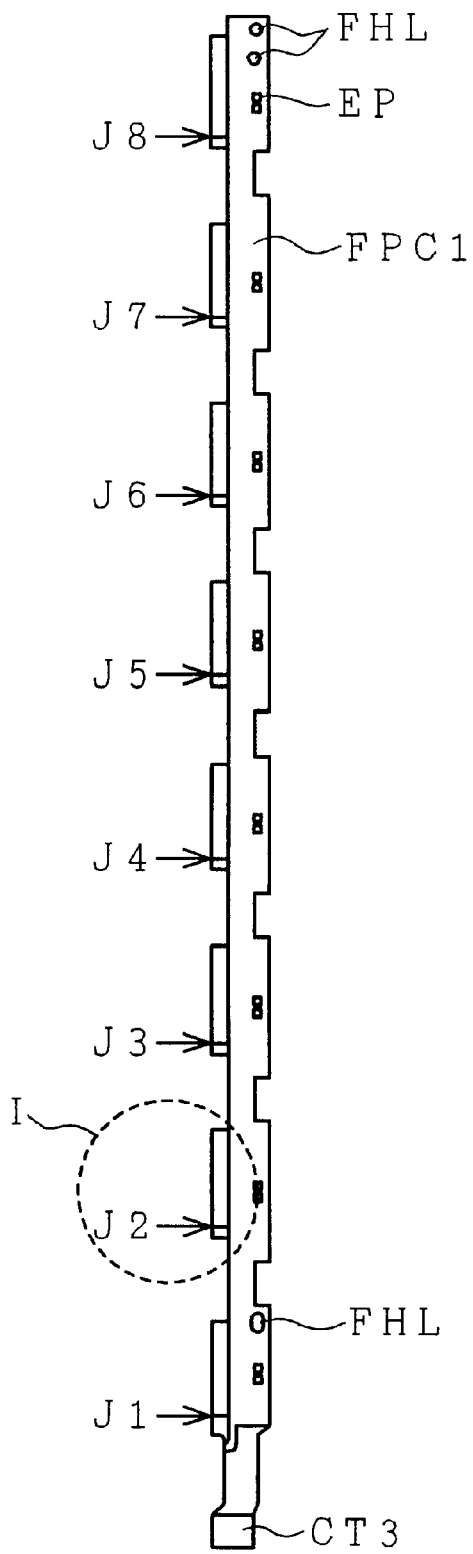
FIG. 31A is a plan view of the scan signal line-side flexible printed circuit board FPC1.
Figure 31B:
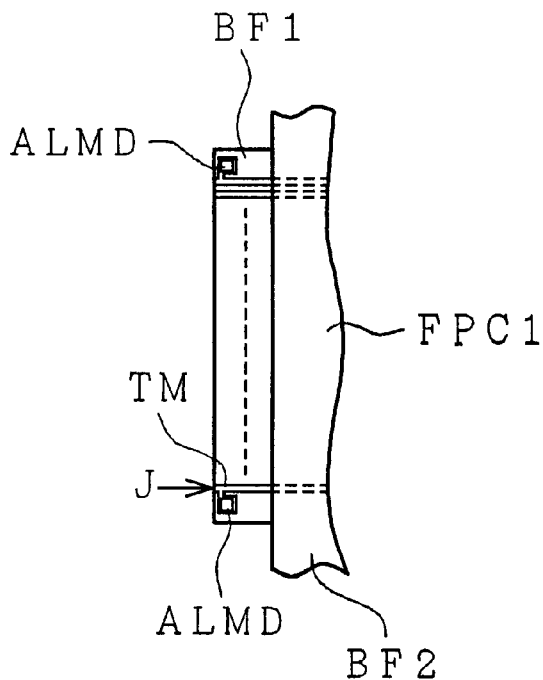
FIG. 31B is an enlarged plan view of part I of the scan signal line-side flexible printed circuit board FPC1 that is connected to the terminal of the liquid crystal display element PNL.

FIG. 31A is a plan view of the scan signal line-side flexible printed circuit board FPC1 that supplies electricity and signals to the gate driver chip IC2. FIG. 31B is an enlarged plan view of a portion of the scan signal line-side flexible printed circuit board FPC1 that is connected to the terminal of the liquid crystal display element PNL.

J1 to J8 denote first terminals of the divided connecting portions. FIIL denotes holes for positional alignment. EP denotes chip parts such as resistors and capacitors. TM denotes metal leads. ALMD denotes alignment marks for positional alignment between the FPC1 and the liquid crystal display element PNL. BF1 and BF2 denote base films of the scan signal line-side flexible printed circuit board FPC1. The metal leads TM of the connecting portions are provided on the base film BF1 and exposed from the base film BF2. CT3 denotes a connector to make electrical connection with the interface printed circuit board PCB.

FIG. 34 shows the scan signal line-side flexible printed circuit board FPC1 connected to the liquid crystal display element PNL.

Video Signal Line-Side Flexible Printed Circuit Board FPC2

Figure 32:
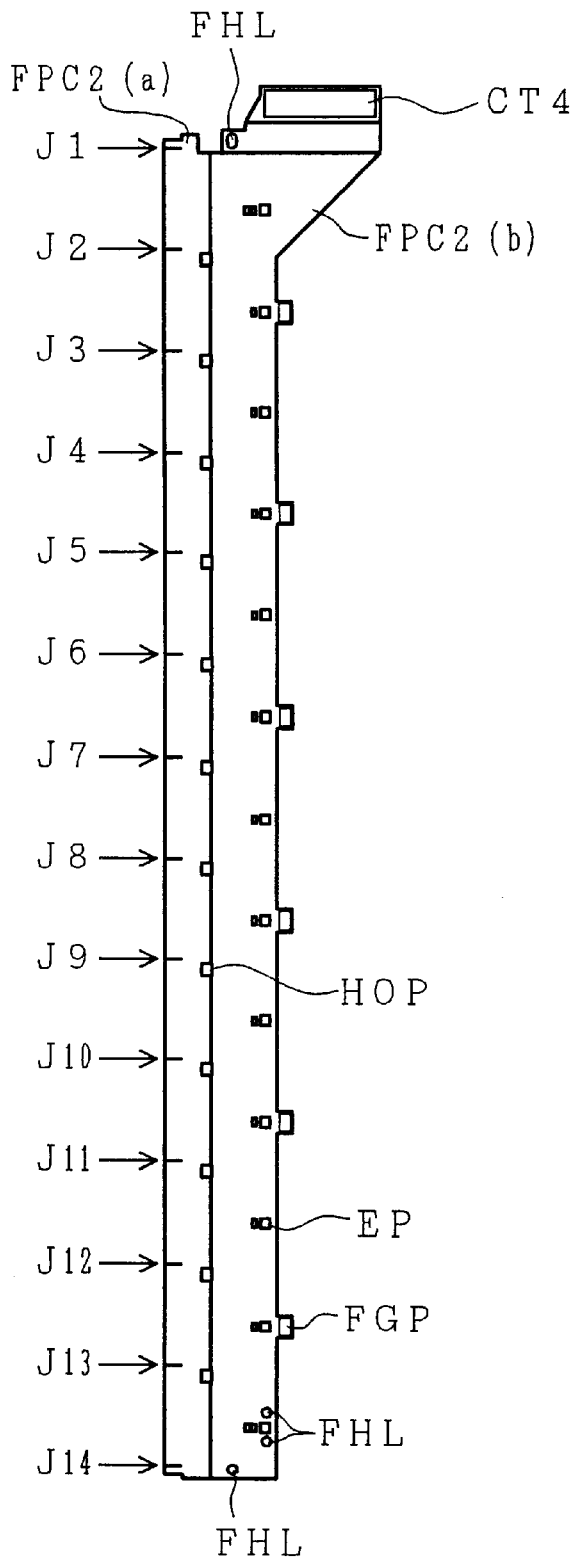
FIG. 32 is a plan view of the video signal line-side flexible printed circuit board FPC2.

FIG. 32 shows a plan view of the video signal line-side flexible printed circuit board FPC2 that supplies electricity and signals to the drain driver chip IC1.

J1 to J14 denote first terminals of divided connecting portions. Like the FPC1, the connecting portions of the FPC2 have the structure of FIG. 31B. A part a of the FPC2 is a bent portion formed thin so that it can be bent easily. A part b of the FPC2 is a multilayer wiring portion in which two or more wiring layers are formed in multilayer to increase the wiring density. FHL denotes holes for positional alignment. EP denotes chip parts EP such as resistors and capacitors. HOP denotes an opening provided in the FPC2.

FGP denotes a frame ground pad FGP electrically connected to the ground line of the video signal line-side flexible printed circuit board FPC2. In the frame ground pad FGP a conductive foil which is electrically connected to the ground line is exposed from the base film of the FPC2 and is in contact with the frame ground FG1 of the lower shield case LF2 to electrically connect the ground line of FPC2 to the LF2. The video signal line-side flexible printed circuit board FPC2 supplies video signals to the drain driver chip IC1, and hence high-frequency current flows through the wiring of the board FPC2, giving rise to a possibility of electromagnetic waves being emitted from the FPC2. In this embodiment, a plurality of frame ground pads FGP are provided on the FPC2 and electrically connected to the lower shield case LF2 covering the FPC2, so that the electromagnetic waves emitted from the FPC2 are blocked by the lower shield case LF2, thus eliminating EMI.

CT4 denotes a connector for electrical connection with the interface printed circuit board PCB. On the back side of a part of the FPC2 where the connector CT4 is mounted, a hard plate SUP such as a glass epoxy board is attached to facilitate the connection of the connector CT4 to the connector of the interface printed circuit board PCB.

FIG. 34 shows the FPC2 connected to the liquid crystal display element PNL.

Interface Printed Circuit Board PCB

Figure 33:
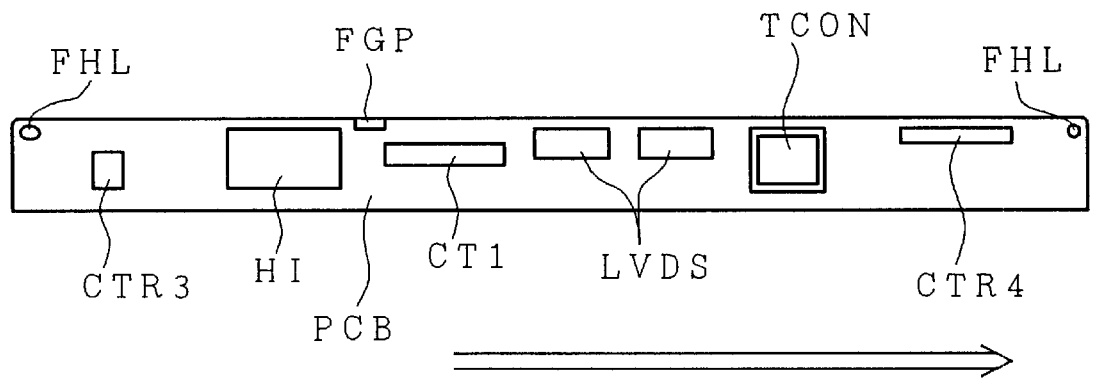
FIG. 33 is a plan view of the interface printed circuit board PCB.

FIG. 33 shows a plan view of the interface printed circuit board PCB that receives a display signal from the host computer and controls the scan signal line drive circuit and the video signal line drive circuit to display data on the liquid crystal display element PNL. The interface printed circuit board PCB has a plurality of electronic parts mounted on a multilayer printed circuit board, such as a multilayer board of glass epoxy resin. CT1 denotes an interface connector which makes electrical connection with external devices of the liquid crystal display module MDL, such as a computer. LVDS denotes a signal converter that converts signals sent from external devices into signals that can be processed by the liquid crystal display device. In this embodiment, display signals supplied from an external device are digital signals. Although, in the case of a CRT display, analog signals are more advantageously employed as the display signals supplied from an external device, the liquid crystal display device can use display signals sent from the external device more advantageously if they are digital signals because the drain driver chip that outputs video signals to the liquid crystal display element is a digital driver. Further, by making the display signals digital, the signal converter LVDS can send the display signals from the host computer to the liquid crystal module efficiently, reducing the number of signal lines in the cable for transferring the display signals and reducing EMI. TCON denotes a controller that controls the scan signal line drive circuit and the video signal line drive circuit according to the display signals converted by the signal converter LVDS and displays data on the liquid crystal display element PNL. The number of connection terminals of the controller TCON increases with the number of gradation levels, so that in this embodiment the IC chip of TCON is mounted in the BGA (ball grid array) package, which mounted on the interface printed circuit board PCB. CTR4 denotes a connector for connection with the connector CT4 of the FPC2.

In this embodiment, because the signal converter LVDS and the controller TCON are mounted in this order between the interface connector CT1 and the connector CTR4 on the interface printed circuit board PCB, the flows of the display signals are aligned in the direction of the arrow, eliminating redundancy in the wiring layout and reducing the size of the interface printed circuit board PCB and therefore the frame area of the liquid crystal display module. HI denotes a hybrid IC having electronic circuits integrated on a child board. In this embodiment, the HI has an integrated power supply circuit that supplies electricity to the controller TCON, the signal converter LVDS, the gate driver chip IC2 and the drain driver chip IC1. CTR3 denotes a connector CTR3 connected with the connector CT3 of the FPC1. The connection between the FPC1 and the PCB and between the FPC2 and the PCB is made by bending the FPC1 and FPC2 and inserting their connectors into the connectors of the PCB, as shown in FIG. 30. FGP is a frame ground pad electrically connected to the ground line of the PCB and is used to make an electrical connection with the upper shield case SHD. The interface printed circuit board PCB, because it processes video signals, has a possibility that high-frequency current flowing through the circuit wiring can emit electromagnetic waves. Thus, this embodiment connects the shield case SHD covering the PCB to the ground of the PCB at the frame ground pad FGP to eliminate EMI.

Equivalent Circuit of the Liquid Crystal Display Module

Figure 36:
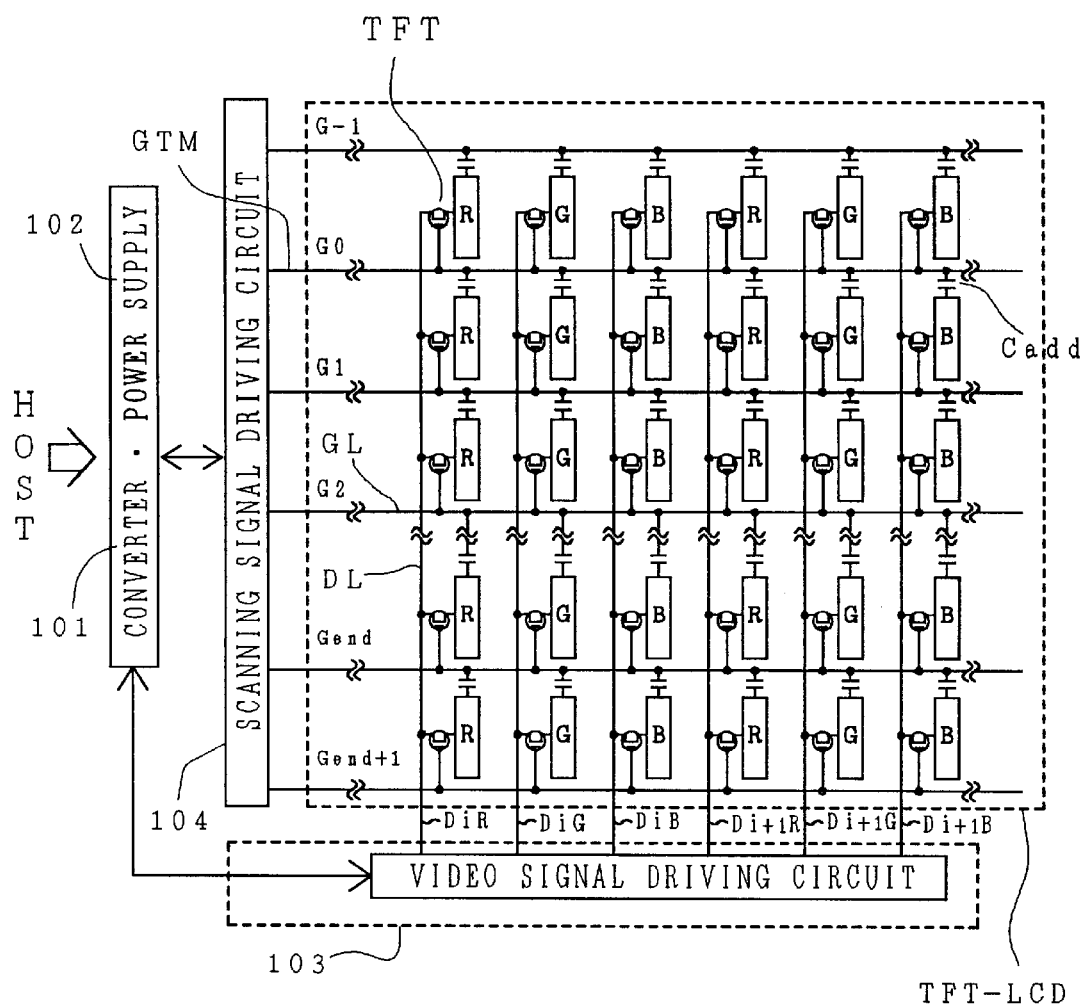
FIG. 36 is a block diagram showing an equivalent circuit of the liquid crystal display module MDL.

FIG. 36 is a block diagram showing an equivalent circuit of the liquid crystal display module MDL. A video signal line drive circuit 103 is provided only under the TFT liquid crystal display element TFT-LCD. On the side surfaces of the TFT-LCD are arranged a scan signal line drive circuit 104, a controller 101 and a power supply circuit 102. The video signal line drive circuit 103 is mounted by bending the multilayer flexible board, as described earlier, to reduce the picture-frame area of the liquid crystal display module MDL.

The controller 101 and the power supply circuit 102 are mounted on the multilayer printed circuit board (interface printed circuit board PCB). The interface printed circuit board PCB mounted with the elements 101 and 102 is stacked under the back of the scan signal line drive circuit 104 to reduce the picture-frame area of the liquid crystal display module MDL.

As shown in FIG. 36, the thin film transistor TFT is provided in an intersecting region between two adjacent drain signal lines DL and two adjacent gate signal lines GL. The drain electrode and the gate electrode of the thin film transistor TFT are connected to the DL and the GL, respectively. The source and the drain are determined fundamentally by the bias polarity between them. In the circuit of this liquid crystal display device, the polarity is inverted during operation and it should be understood that the source electrode is alternately changed. In the following description, however, the electrode connected to the DL is fixedly a drain electrode and the electrode connected to the pixel electrode is a source electrode.

The source electrode of the thin film transistor TFT is connected to the pixel electrode. Since a liquid crystal layer is provided between the pixel electrode and the common electrode, a voltage is applied from the pixel electrode to the liquid crystal layer.

The thin film transistor TFT becomes conductive when a positive bias voltage is applied to the gate electrode and becomes non-conductive when a negative bias voltage is applied to the gate electrode. Thus, it is possible to select a pixel electrode to which a video signal is to be applied through the drain signal line DL by controlling the voltage applied to each gate signal line GL.

Figure 44:
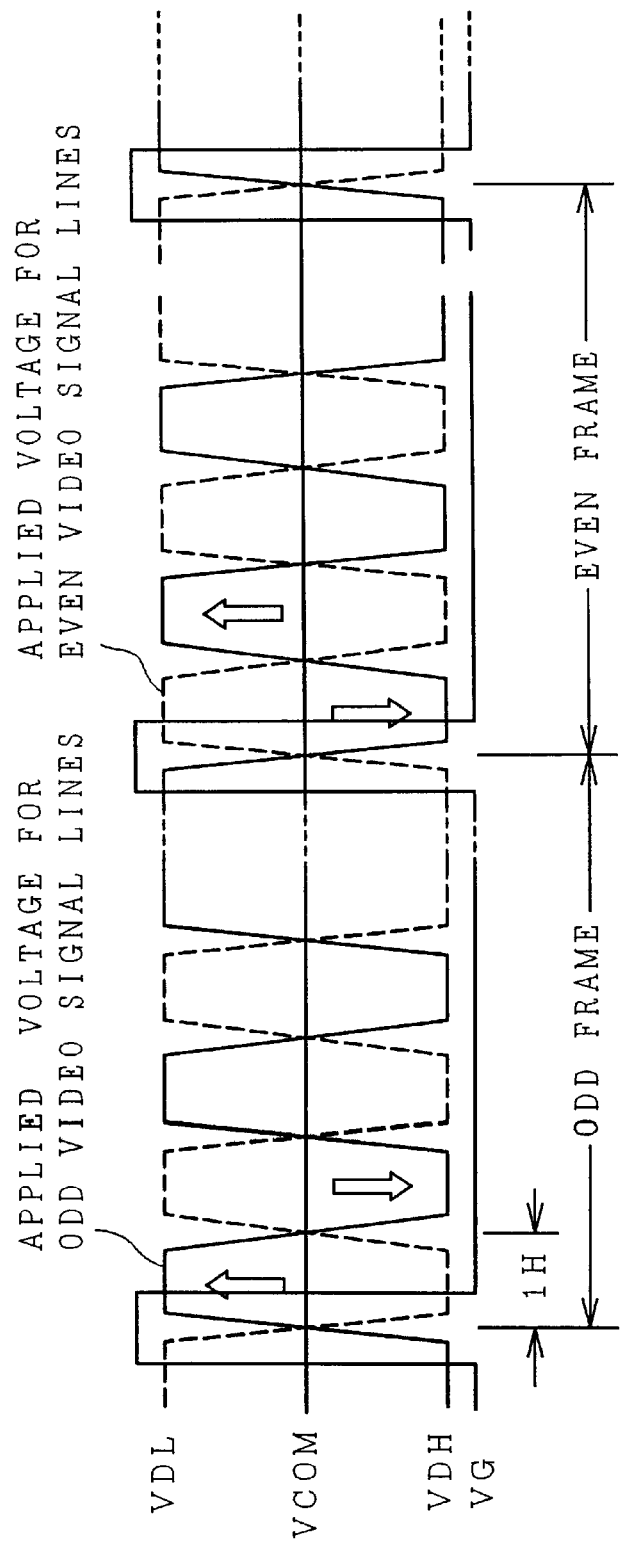
FIG. 44 illustrates drive signal waveforms of a TFT liquid crystal display element TFT-LCD.

FIG. 44 shows drive waveforms of the TFT liquid crystal display element TFT-LCD of FIG. 36. VG denotes a voltage waveform applied to the gate signal line GL, VCOM denotes a voltage waveform applied to the common electrode, VDH denotes a voltage waveform applied to odd-numbered drain signal lines DL, and VDL is a voltage waveform applied to even-numbered drain signal lines DL. VG denotes a period of one frame and changes in its level between high and low, and at the timing that the VG goes low, the voltages VDH, VDL are written into the pixel electrodes. The voltages VDH and VDL change signal polarities in the cycle of one horizontal scan 1H with VCOM as their center. The voltages VDH and VDL change signal polarities in one frame cycle, too. Further, VDH and VDL are in the relation of opposite polarity. By performing the drive method (dot inversion drive) shown in FIG. 44, a problem is solved that the signals of GL or DL leak into unrelated pixel electrodes to degrade the display quality of the liquid crystal display module MDL. Further, because the drain driver chip IC1 of the video signal line drive circuit 103 has a function of changing the polarities of the odd-numbered output and the even-numbered output and outputting both of them simultaneously, the dot inversion drive that ensures good display quality can be performed and the video signal line drive circuit 103 is provided at one side of the liquid crystal display module MDL to reduce the picture-frame area. It is noted that FIG. 44 shows VCOM in an ideal case where there is no coupling between the gate electrode and the source electrode of the thin film transistor TFT. Actually, however, a bias to cancel the coupling is applied to VCOM.

Between a pixel electrode and a GL that selects a preceding stage pixel electrode is connected a capacitor Cadd that holds a voltage of the pixel electrode. It is also possible to form a capacitive line different from the gate signal line GL to provide the Cadd between the pixel electrode and the capacitive line. In this case, to the capacitive line a voltage equivalent to the voltage applied to the common electrode is applied.

Controller 101

FIG. 37A and FIG. 37B illustrate the flow of display data between the host computer and the controller 101. As shown in one example of FIG. 37A, the display signal output from the display controller of the host computer PC is divided into two signals. The two divided signals are then supplied to the signal converters LVDS on the sending side where they are converted into differential signals, which are sent through a cable to the interface connector CT1 of the liquid crystal display module MDL. The controller 101 transfers the two differential signals that are supplied to the interface connector CT1 to the respective signal converters LVDS on the receiving side where the differential signals are reconverted into two divided display signals, which are then input to the controller TCON that controls the scan signal line drive circuit and the video signal line drive circuit. The display signal sent from the display controller to the controller TCON is digital data and the number of bits and frequency at each stage are shown in FIG. 37A. Because the display signal output from the display controller is divided by data conversion into two before being sent to the liquid crystal display module MDL, the frequency of the signals handled by the liquid crystal display module MDL decreases, making EMI hardly occur. The signal converter LVDS on the PC side converts the parallelly input digital data into serial data and transfers them to the liquid crystal display module MDL. The signal converter LVDS on the liquid crystal display module MDL side converts the serial data into parallel data to recover the display signal. This arrangement reduces the number of terminals of the interface connector CT1 to enhance the reliability of connection and also reduces the number of lines between the PC and the MDL and therefore the number of lines carrying high frequency currents, thus hardly generating EMI. It is noted that the differential signals output from the signal converter LVDS lower the frequency by compressing the data of the display signals and thereby prevent EMI. By providing the liquid crystal display module MDL with a signal converter LVDS that converts the incoming display signal in the form of serial data into parallel data to recover the display signal as in this embodiment, various advantages can be produced which include the ability to prevent an increase in the number of terminals of the interface connector CT1 even when the number of levels of gradation in the display increases and also the ability to reduce the electromagnetic emission from the liquid crystal display module MDL and eliminates their adverse influences on other devices.

FIG. 37B shows another example of the flow of display data between the host and the controller 101. In this example, the data modulator that has the function of dividing the display signal and the function of converting parallel data into serial data and outputting a differential signal is provided on the PC side, and the data demodulator that converts the differential signal sent from the PC into parallel data to reproduce the divided display signals is provided on the liquid crystal display module MDL. The example of FIG. 37B, although it increases the frequency of the differential signal, offers the advantage that the number of terminals of the interface connector CT1 decreases further, the connection reliability is enhanced, the size of the interface printed circuit board PCB can be reduced, and the picture-frame area of the liquid crystal display module MDL can be reduced.

Power Supply Circuit 102

Figure 38:
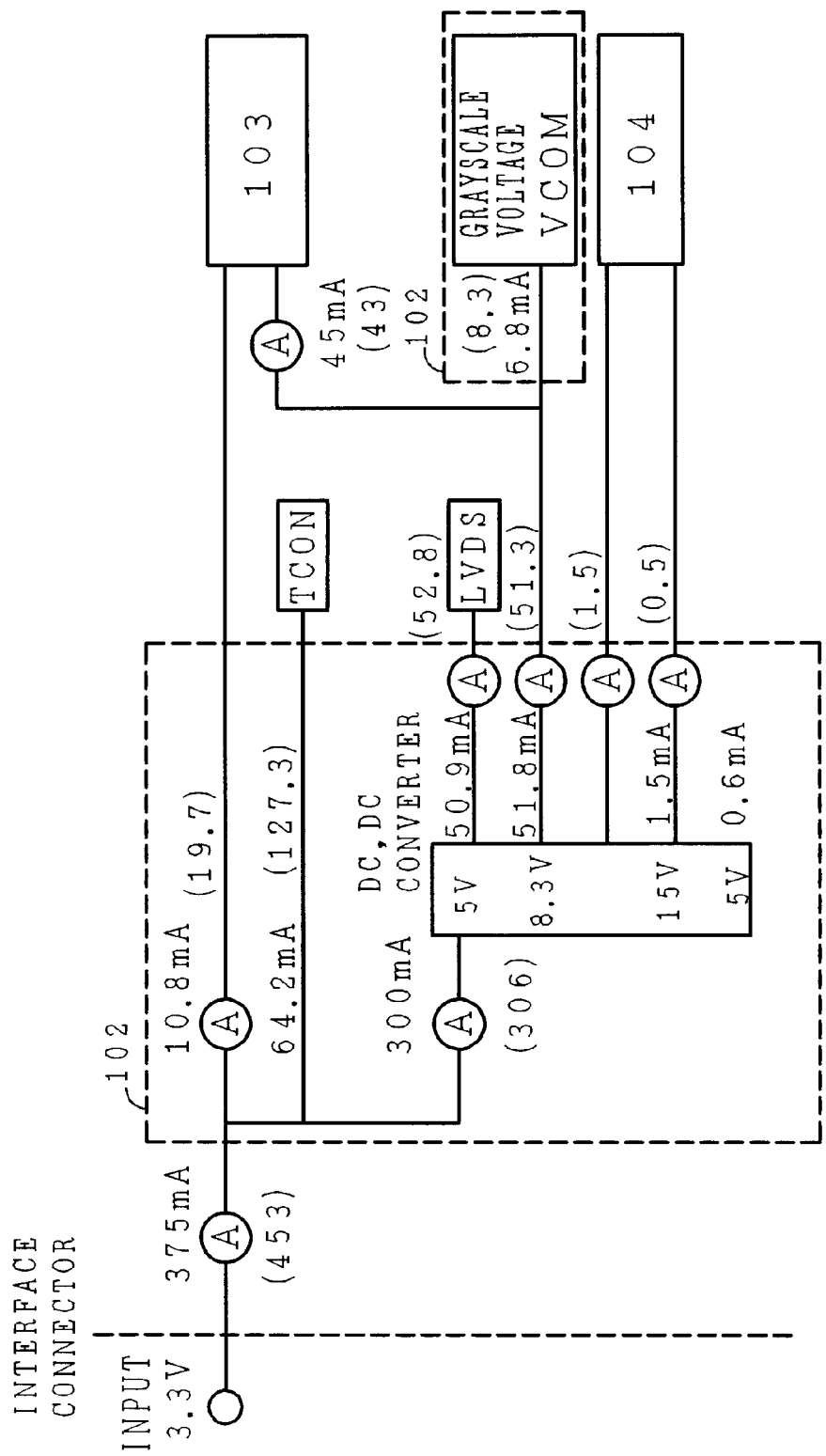
FIG. 38 illustrates the relation of supply of electricity to the liquid crystal display module MDL.

FIG. 38 illustrates the supply of electricity to the liquid crystal display module MDL. A part enclosed by a dashed line in FIG. 38 belongs to the power supply circuit. The power supply circuit converts a voltage supplied through a power source terminal of the interface connector CT1 into voltages required by individual parts and outputs the converted voltages to them. Currents flowing through individual lines and applied voltages in the liquid crystal display module MDL are also shown in FIG. 38. A denotes points where currents are measured. The numeric values in parentheses represent power consumption in mW. In the power supply circuit 102 a DC-DC converter that produces a plurality of voltages has the largest power consumption. In this embodiment, to enhance heat dissipation of the DC-DC converter, a hybrid IC configuration is employed in which the DC-DC converter is formed on a child printed circuit board HI on the interface printed circuit board PCB.

Measures against EMI of Controller Circuit 101 and Power Supply Circuit 102

Figure 39:
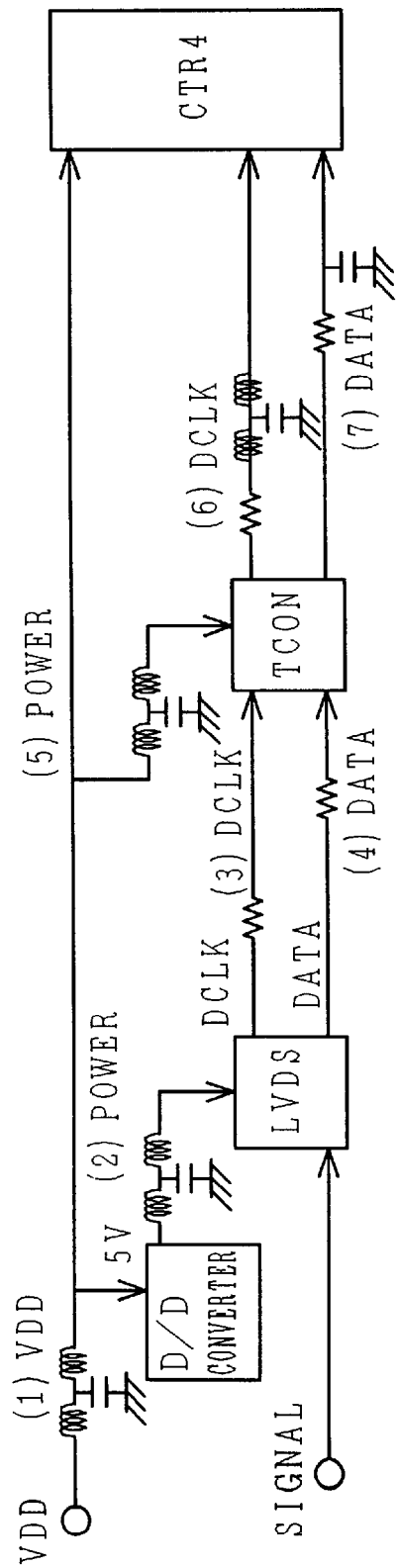
FIG. 39 illustrates the arrangement of an EMI filter on the interface printed circuit board PCB.

FIG. 39 shows the arrangement of filters (EMI filters) to attenuate electromagnetic waves, the source of EMI. The EMI filters include an LC filter, an RC filter and an R filter in the order of magnitude of attenuation. The EMI filters attenuate high frequency components of a signal and therefore should be appropriately used according to signal frequency, and the signal may be attenuated if not. In this embodiment, LC filters shown at (1), (2), (5) are inserted between the VDD of the DC power source and the signal processing circuits TCON and LVDS to cut off high frequency components. Because the frequencies of the data line and clock line DCLK between LVDS and TCON are high, R filters are used. The data line between the TCON and the video signal line drive circuit 103 carries signals with relatively high frequencies and thus the RC filter shown at (7) is used.

Thin Film Transistor Substrate SUB1 and Opposed Substrate SUB2

Figure 40:
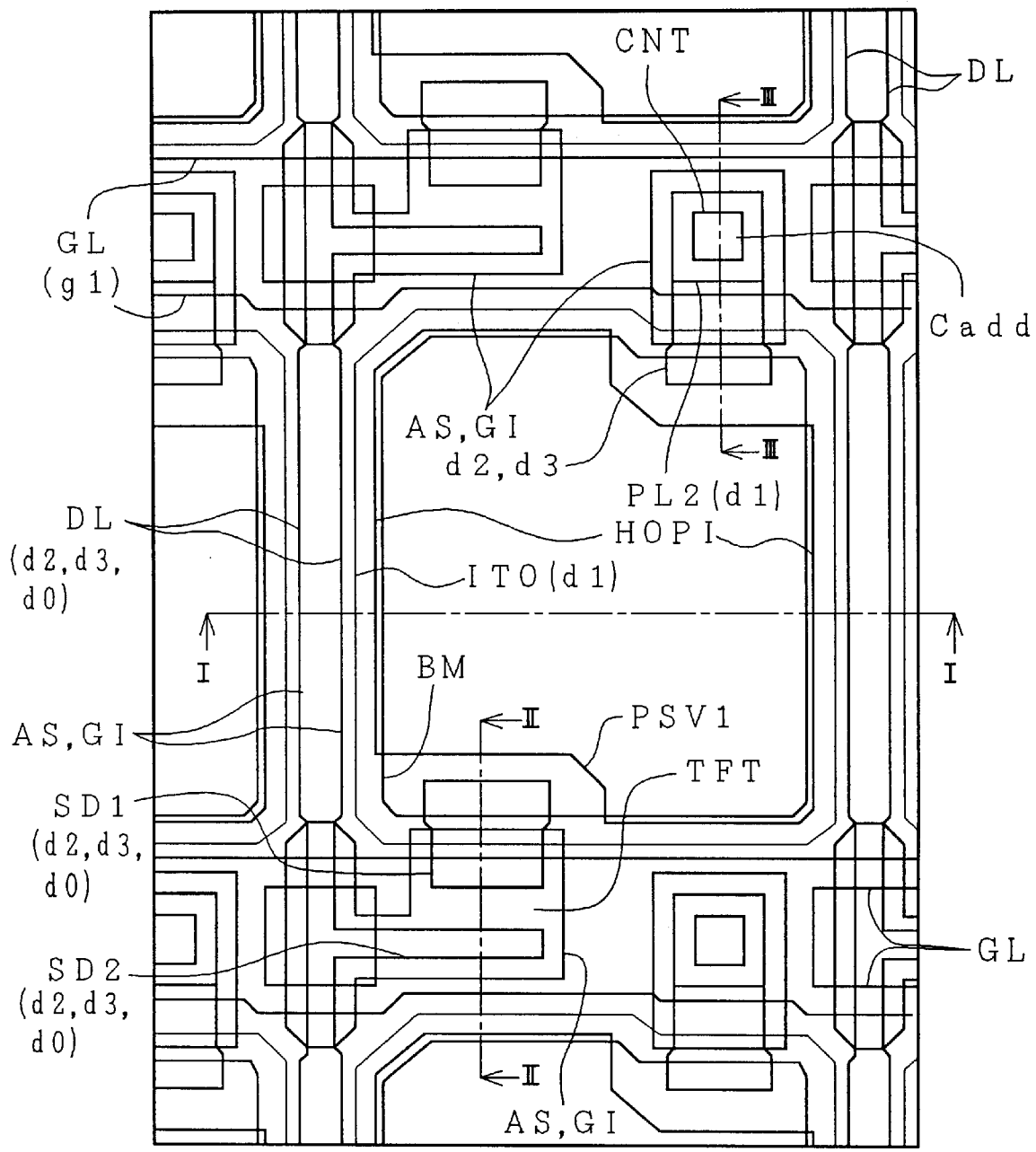
FIG. 40 is a plan view of a pixel portion of the liquid crystal display element PNL.
Figure 41:
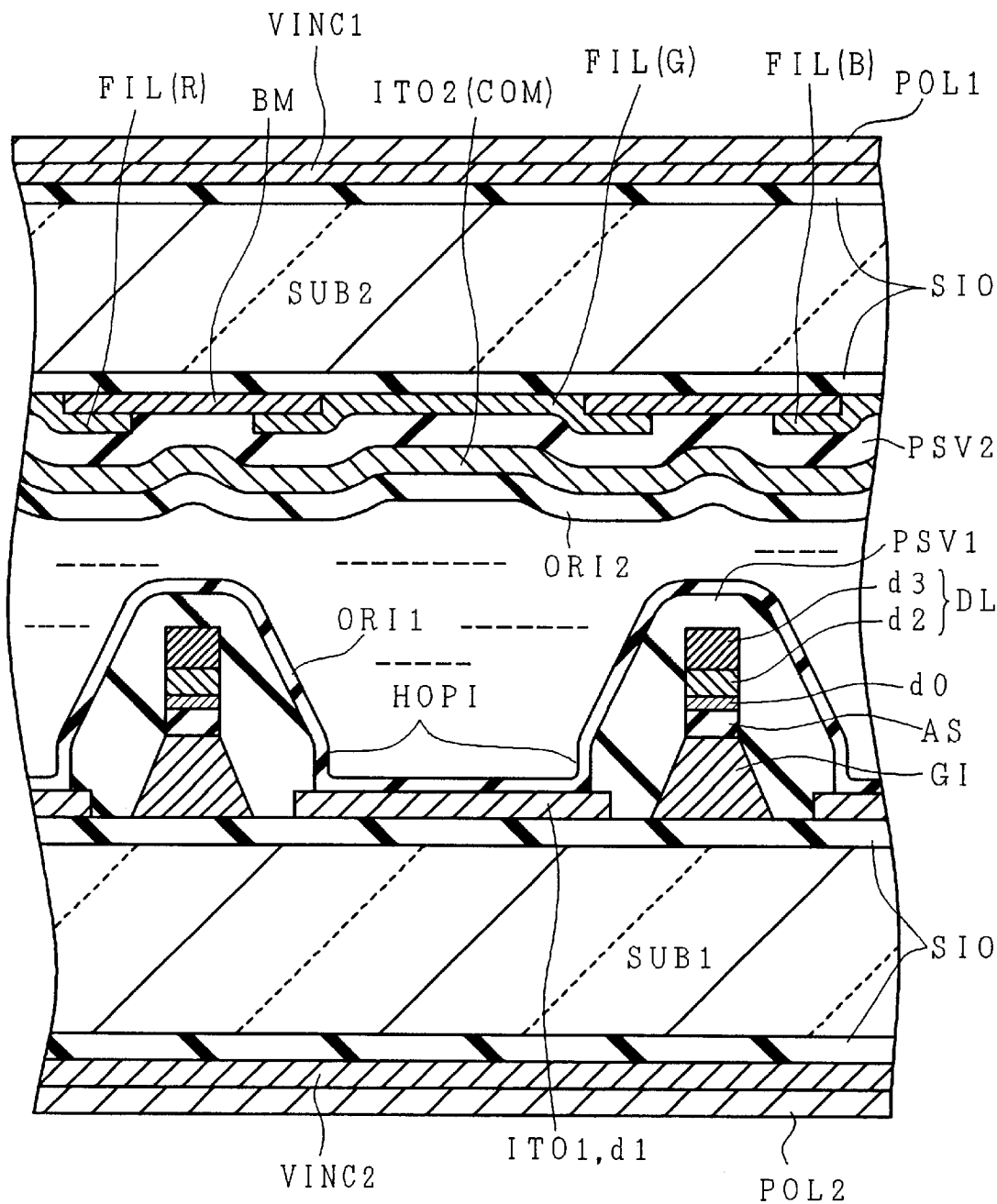
FIG. 41 is a cross section taken along the line I—I of FIG. 40.

FIG. 40 shows a plan view of a pixel area of the liquid crystal display element PNL. A cross section along the line I—I of FIG. 40 is shown in FIG. 41; a cross section along the line II—II is shown in FIG. 42; and a cross section along the line III—III is shown in FIG. 43.

As shown in FIG. 40, each pixel is disposed in an intersecting region between two adjacent scan signal lines GL and two adjacent video signal lines DL. Each pixel includes a thin film transistor TFT, a pixel electrode ITO1 and a capacitor Cadd. As shown in FIG. 42, the thin film transistor TFT and the transparent pixel electrode ITO1 are formed on the first transparent glass substrate SUB1 side of the liquid crystal layer. On the second transparent glass substrate SUB2 side there are formed a color filter FIL and a light shielding black matrix pattern BM are formed. On both surfaces of each substrate SUB1, SUB2 are deposited oxide silicon films SIO.

On the surface of the SUB2 on the inner side (LC side) are formed a light shielding film BM, a color filter FIL, a passivation film PSV2, a transparent common electrode ITO2 and an upper orientation film ORI2 in this order. Symbol POL1 and POL2 denote polarizing plates provided on the outer surfaces of the SUB1 and SUB2. VINC1 and VINC2 denote viewing angle enlarging films provided on the outer surfaces of the SUB1 and SUB2.

Figure 42:
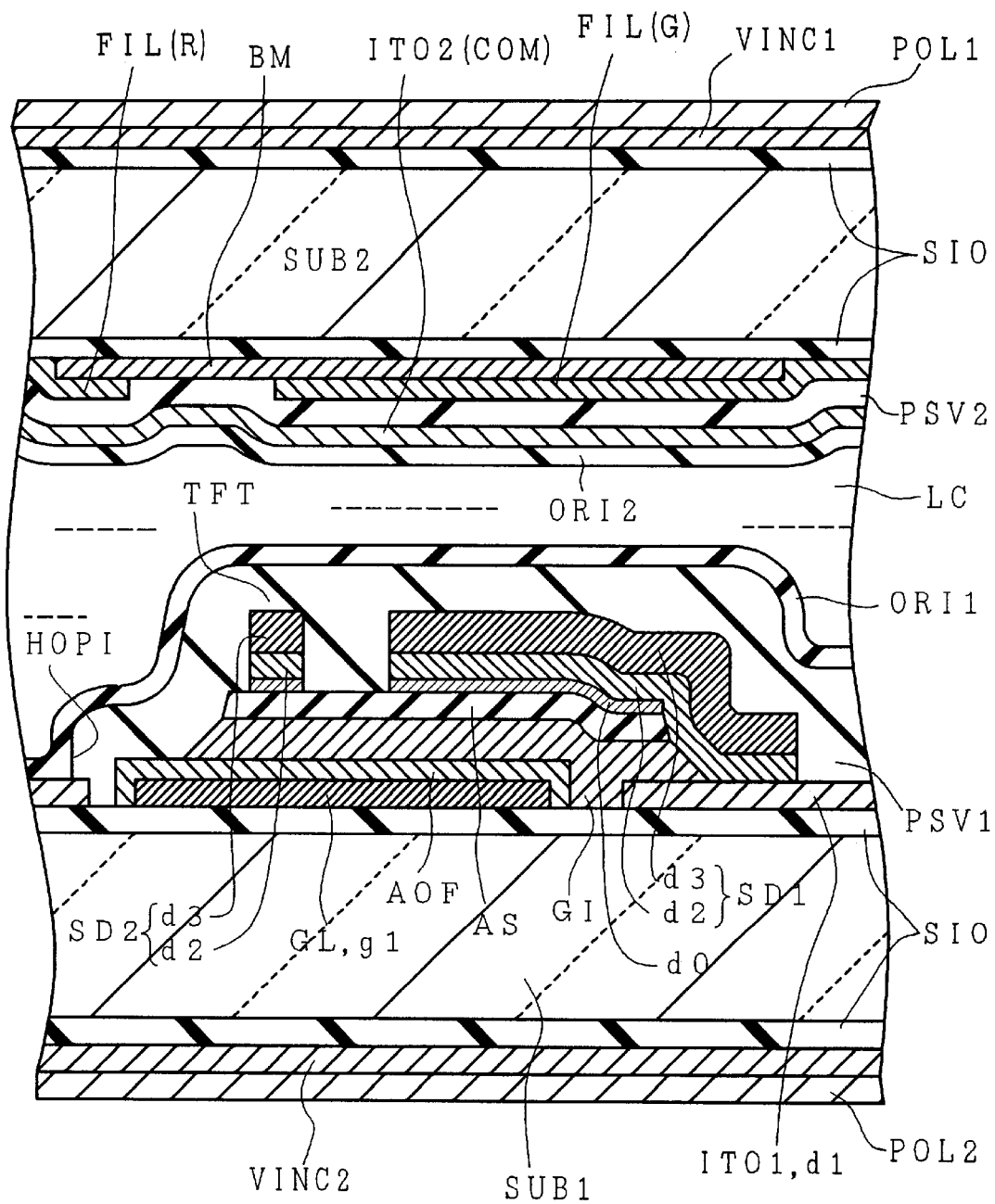
FIG. 42 is a cross section taken along the line II—II of FIG. 40.
Figure 43:
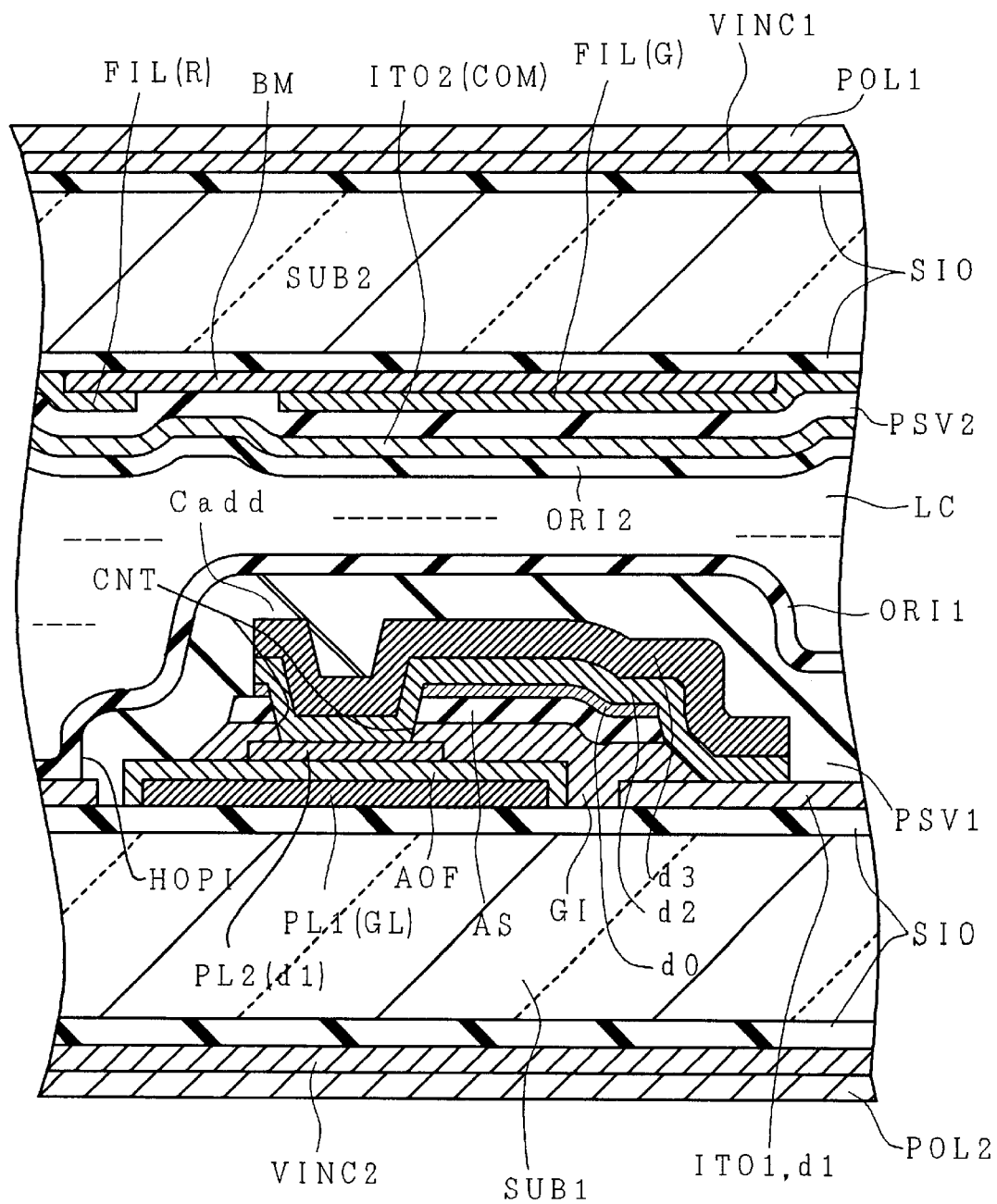
FIG. 43 is a cross section taken along the line III—III of FIG. 40.

The thin film transistor TFT is made by depositing in multilayer, as shown in FIG. 42, a gate electrode formed integrally with the scan signal lines GL, a surface oxide film AOF of the scan signal lines GL, an insulating film GI of silicon nitride, an i-type semiconductor layer AS of intrinsic amorphous silicon, an impurity-doped semiconductor layer do, and a source electrode SD1 and a drain electrode SD2.

The thin film transistor TFT is covered with a passivation film PSV1 formed of an organic film of silicon nitride and polyimide. Over the PSV1 and ITO is provided a lower orientation film ORI1.

The GL is formed of a first conductive film g1 of aluminum. Hence, the surface oxide film AOF of the GL is made of aluminum. The GL may be formed of tantalum. If the GL is formed of tantalum, the AOF is a tantalum oxide film.

The pixel electrode ITO1 is formed of a transparent conductive film d1 such as an ITO (indium-tin oxide) film.

The SD1 and SD2 are formed of a multilayer film having a second conductive film d2 of chromium and a third conductive film d3 of aluminum. The DL is also formed of a multilayer film of d2 and d3.

The AS and GI are formed along and below the DL in addition to within the TFT. By forming the AS and GI along the DL, the DL is prevented from being broken due to the steps of the AS and GI. The GI does not cover all of the pixel area and there are portions where the GI is removed, such as parts on the ITO1. By providing the portions where the GI is removed in the pixel area, the stresses of the GI is alleviated to prevent it from being peeled off.

Over the pixel electrode ITO1 there is an opening HOPI where the passivation film PSV1 is removed. By providing the opening HOPI in the passivation film PSV1, the stresses in the PSV1 is alleviated to prevent it from being peeled off. Further, the provision of the HOPI over the ITO1 intensifies the electric field that the ITO1 applies to the liquid crystal layer LC.

The capacitor Cadd comprises a first electrode PL1 formed of the g1, a second electrode PL2 formed of d1, and a dielectric film formed of the AOF. The second electrode PL2 is connected through a hole CNT formed in the AS and GI to a wiring made of a multilayer film of d2 and d3, and the wiring made of d2 and d3 is connected to the pixel electrode ITO1 at a portion where the AS and GI are removed, so that the PL1 and the ITO1 are electrically connected. The aluminum oxide film AOF has a higher dielectric constant than those of silicon nitride and silicon oxide, and consequently the use of a single-layer AOF film for the dielectric film of the Cadd can reduce the size of the Cadds thereby improving the aperture ratio of the pixel. Further, because the ends of the first electrode PL1 are covered with the GI and AS over which a wiring connecting the PL2 and the ITO1 is formed, a possibility of concentrated electric fields produced at the ends of the PL1 causing dielectric breakdown is eliminated. Further, because the dielectric constant of the tantalum oxide film is also high, it is also possible to use tantalum for the PL1 to form a tantalum oxide film as the AOF.

Embodiment 2

Figure 45A:
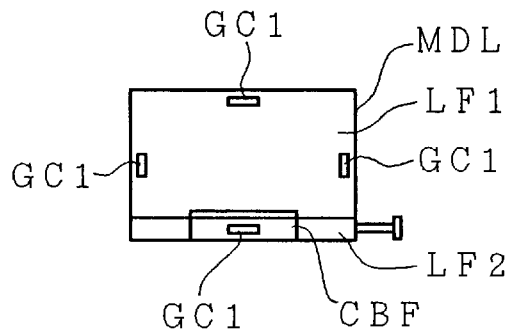
FIG. 45A is a bottom view of a liquid crystal display module of a second embodiment of this invention.
Figure 45B:
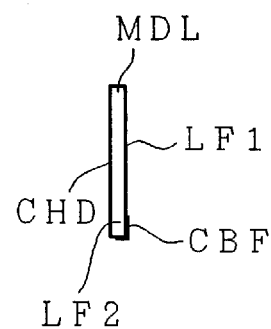
FIG. 45B is a side view of the liquid crystal display module of a second embodiment of this invention.

FIG. 45 shows a second embodiment of this invention. FIG. 45A is a bottom view of the liquid crystal display module MDL and FIG. 45B a side view of the liquid crystal display module MDL. In the second embodiment, the liquid crystal display module MDL is provided with rubber cushions GC1, GC2, GC3, GC4 at the centers of its four sides for reinforcement. Provision of the rubber cushions GC1, GC2, GC3, GC4 at the centers of the four sides of the liquid crystal display module MDL improves the strength of the MDL against impacts and vibrations.

Further, in the second embodiment, a cover film CBF is bonded to the MDL near the centers of the lower long sides to fix the lower shield cases LF1, LF2. The cover film CBF bonded to the lower long sides of the MDL prevents the lower shield cases LF1, LF2 from coming off even if strong vibrations and impacts are applied to the MDL.

The other constructions of the second embodiment are the same as those of the first embodiment.

Embodiment 3

Figure 46A:
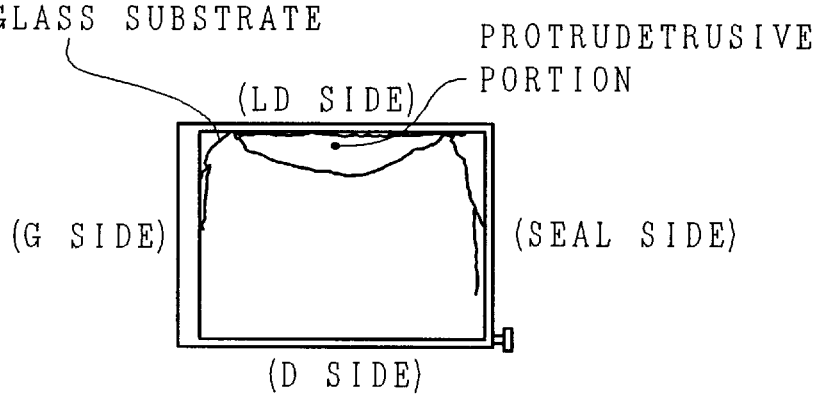
FIG. 46A illustrates a liquid crystal display device broken by a destructive test.
Figure 46B:
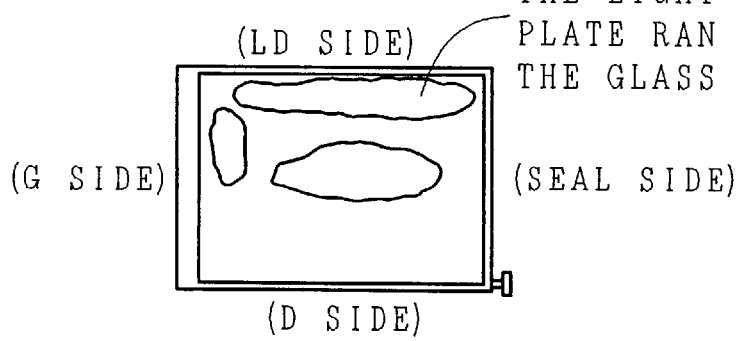
FIG. 46B illustrates a part where the light guide plate GLB abuts against the glass substrate SUB1 during the destructive test.

In a destructive test whereby a liquid crystal display device equipped with a drain driver on one lateral side was subjected to strong impacts which do not occur normally, a phenomenon was observed in which, as shown in FIG. 46A, the glass substrates SUB1, SUB2 on the LD side where the drain driver is not mounted were broken and came out from the shield case SHD. The investigation into the cause of breakage of the SUB1 and SUB2 has found that application of strong impacts to the liquid crystal display module MDL caused the light guide plate GLB to butt against the glass substrate SUB1 which could not withstand the impacts and broke.

Figure 47A:
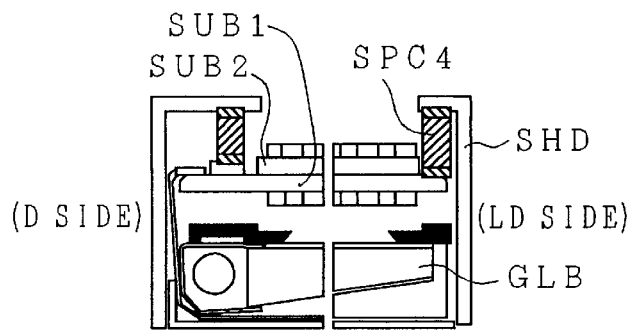
FIGS. 47A, 47B and 47C are cross sections of the liquid crystal display module MDL of a third embodiment of this invention provided with a measure for preventing the glass substrate of the liquid crystal display element PNL from being broken by strong impacts.
Figure 47B:
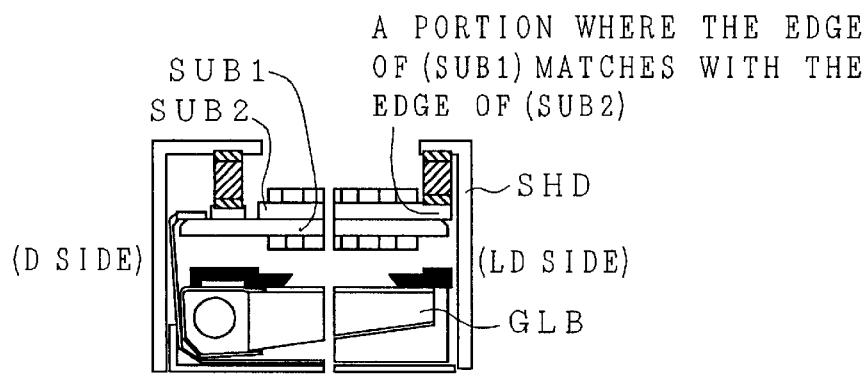
Figure 47C:
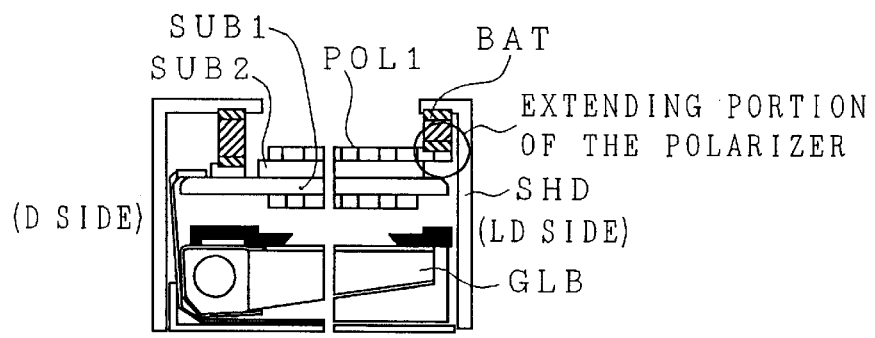

FIG. 47A, 47B and 47C show cross sections of the liquid crystal display module MDL where measures are taken to prevent the glass substrates of the liquid crystal display element PNL from being broken by strong impacts.

In the embodiment shown in FIG. 47A, the glass substrate SUB1 and the opposing glass substrate SUB2 on the LD side are extended to form extended portions and a spacer SPC4 of rubber or vinyl chloride is provided between the shield case SHD and the extended part of the SUB1. In the embodiment of FIG. 47A, while the spacer SPC4 absorbs to some extent the impacts applied to the SUB1, the impact concentrates on the SUB1 and the possibility still remains of the SUB1 being broken by strong impacts.

In the embodiment shown in FIG. 47B, the glass substrate SUB1 and the opposing glass substrate SUB2 are aligned at their end portions on the LD side, and the glass substrate SUB2 and the shield case SHD are bonded together with a double-sided adhesive tape BAT. In the embodiment of FIG. 47B, because the impacts that the liquid crystal display element PNL receives are sustained by the glass substrates SUB1 and SUB2, strong impacts greater than 200G can be tolerated. Although it is possible to bond the SUB2 to the SHD with a BAT without aligning the end portions of the SUB1 and SUB2, the aligning of the end portions can reduce the picture-frame area of the liquid crystal display element PNL.

In the embodiment shown in FIG. 47C, the upper polarizing plate POL1 on the LD side is extended from the glass substrate SUB2 to which the POL1 is bonded, and the extended portion of the POL1 is bonded to the shield case SHD with a double-sided adhesive tape BAT. In the embodiment of FIG. 47C, because the impacts that the liquid crystal display element PNL receives are sustained by the glass substrates SUB1 and SUB2 and the upper polarizing plate POL1, strong impacts greater than 100G can be tolerated. Further, in the embodiment of FIG. 47C, because there is no need to cut the glass substrates so that the ends of the SUB1 and SUB2 may be aligned, the fabrication of the liquid crystal display element PNL is easy.

In the embodiment described above, the other constructions not described are the same as those of the first embodiment.

Embodiment 4

When the liquid crystal display module MDL is subjected to strong impacts, the light guide plate GLB is moved, as described above. The light guide plate GLB is formed of one acrylic plate and has a great mass, so that when subjected to impacts, the light guide plate GLB tends to move inside the liquid crystal display module MDL by the action of the inertia force. Hence, when strong impacts are applied to the liquid crystal display module MDL, the projection PJ5 that secures the light guide plate GLB to the liquid crystal display module MDL may break.

Figures 48A, 48B:
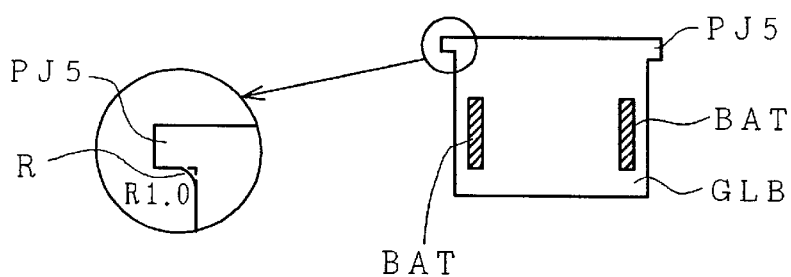
FIG. 48A is a plan view of the light guide plate GLB of a fourth embodiment of this invention.

As shown in FIG. 48, this embodiment provides the base portion of the projection PJ5 on the light guide plate with a curved surface R for reinforcement to prevent breakage of the PJ5. With the curved surface of 1.0 formed at the base of the PJ5, the PJ5 did not come off the GLB when impacts greater than 100G were applied.

Further, by bonding the light guide plate GLB to the mold case ML that accommodates the GLB with a double-sided adhesive tape BAT, as shown in FIG. 48, the light guide plate GLB can be prevented from moving in the ML even when strong impacts greater than 220G are applied.

The other constructions not described above are the same as those of the first embodiment.

Embodiment 5

In cases where the drain driver chip IC1 or gate driver chip IC2 is directly mounted on the glass substrate SUB1 of the liquid crystal display element PNL, when the liquid crystal display element PNL is held by the shield case SHD there is a risk that the IC1 or IC2 will butt against the SHD and be broken.

An example of the liquid crystal display module MDL with a provision for preventing breakage of the IC1 is shown in FIGS. 49A, 49B, 49C, 49D, 49E and 49F.

Figure 49A:
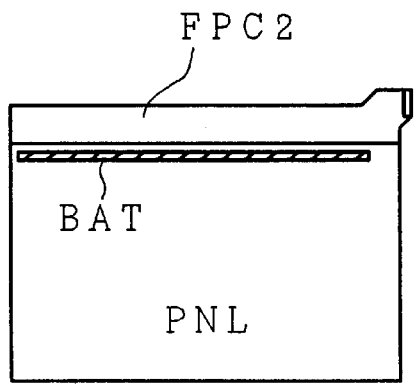

FIG. 49A shows an example in which the chip IC1 on the liquid crystal display element PNL is bonded to the shield case SHD with a double-sided adhesive tape BAT. Although the PNL is firmly secured to the shield case SHD, the impact that the shield case SHD receives is directly transferred to the IC1, which may be destroyed.

Figure 49B:
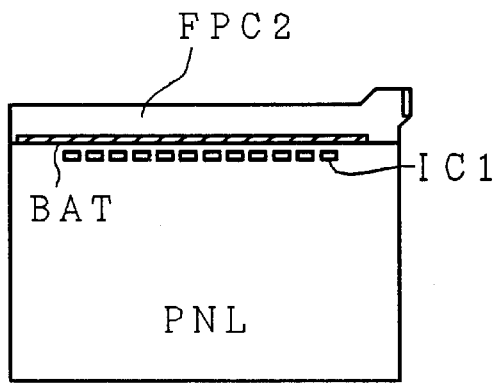

FIG. 49B shows an example in which the PNL is secured to the SHD by attaching a double-sided adhesive tape BAT to a connecting portion of the PNL where the liquid crystal display element PNL and the video signal line-side flexible printed circuit board FPC2 are stacked together to make electrical connection. In the example shown in FIG. 49B there is little possibility that the IC1 is broken but a problem remains that when the PNL is peeled from the SHD, the video signal line-side flexible printed circuit board FPC2 may be peeled off the PNL.

Figure 49C:
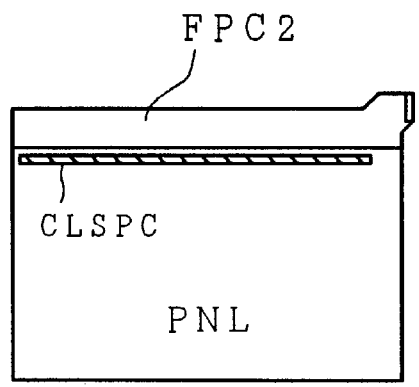
Figure 49D:
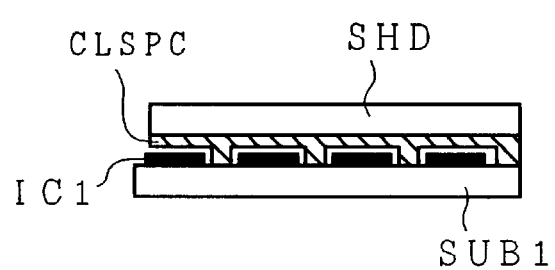

FIGS. 49C and 49D show an example in which the vinyl chloride spacer CLSPC is provided between the drain driver chips IC1. In the example of FIG. 49C and 49D, because the space where the IC1s are installed is secured by the vinyl chloride spacer CLSPC, the IC1s are not damaged even when the display device is subjected to strong impacts. In the embodiment shown in FIG. 49C and 49D, because the portions where the vinyl chloride spacer CLSPC are in contact with the glass substrate SUB1 are narrow, impacts may concentrate on the portions where the CLSPC are in contact with the SUB1 and hence may break the SUB1.

Figure 49E:
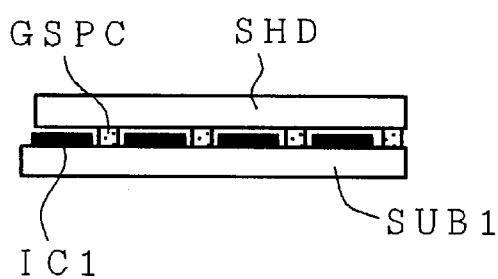

FIG. 49E represents a case where the rubber spacer GSPC is installed between the drain driver chips IC1 to protect them. To support the liquid crystal display element PNL, however, it is necessary to provide a rubber spacer in a wide area, making it impossible to narrow the picture-frame area of the liquid crystal display module MDL.

Figure 49F:
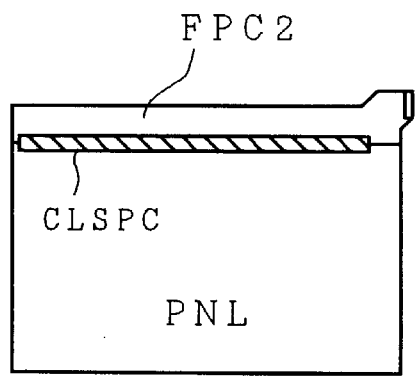

FIG. 49F represents a case where the vinyl chloride spacer CLSPC is provided between the drain driver chips IC1 and on a connecting portion where the liquid crystal display element PNL and the video signal line-side flexible printed circuit board FPC2 are stacked together. In the example of FIG. 49F, the space where the IC1s are mounted is secured by the vinyl chloride spacer CLSPC as shown in FIG. 49D and because the CLSPC covers up to the connecting portion of the FPC2 and the PNL, the stresses which the CLSPC imparts to the SUB1 can be distributed, preventing the IC1 and the SUB1 from being broken even when subjected to impacts of 100G or more. In the example of FIG. 49F, because the CLSPC supports the connecting portion of the PFC2 and the PNL, the reliability of the connecting portion improves.

While the above description of the case of the drain driver chip IC1 has been made, the same can apply to the gate driver chip IC2.

The other constructions not described in the above are similar to those of the first embodiment.

Embodiment 6

Narrowing the picture-frame area of the liquid crystal display module MDL gives rise to a problem in that the liquid crystal display element PNL, when subjected to strong impacts, may be displaced from its position in the liquid crystal display module MDL. It is thus necessary to firmly fix the PNL to the shield case SHD.

Figure 50A:
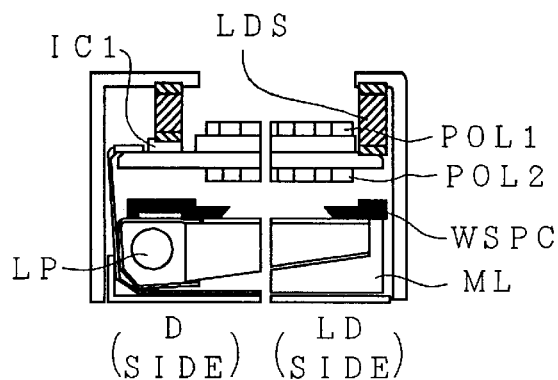
Figure 50B:
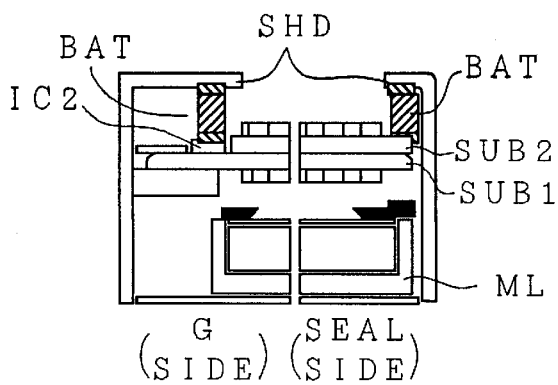

FIG. 50A and FIG. 50B show one example in which the glass substrates SUB1, SUB2 of the liquid crystal display element PNL are fixed to the shield case SHD. In the example of FIG. 50A and FIG. 50B, the PNL is bonded to the SHD with a double-sided adhesive tape BAT along three sides of the PNL on the drain driver chip IC1 side (D side), the gate driver chip IC2 side (G side) and the liquid crystal injection port side. By securing the three sides of the PNL to the SHD with the BAT, the position of the PNL does not change relative to the SHD even when it is subjected to impacts. Further, by securing four sides of the PNL to the SHD with a BAT, the PNL does not shift in position with respect to the SHD even when subjected to impacts greater than 220G.

Although the PNL may be bonded to the backlight, or more specifically the frame spacer WSPC, to protect the PNL against damage due to impacts, there is a possibility of the side surface of the PNL being shifted.

Figure 51A:
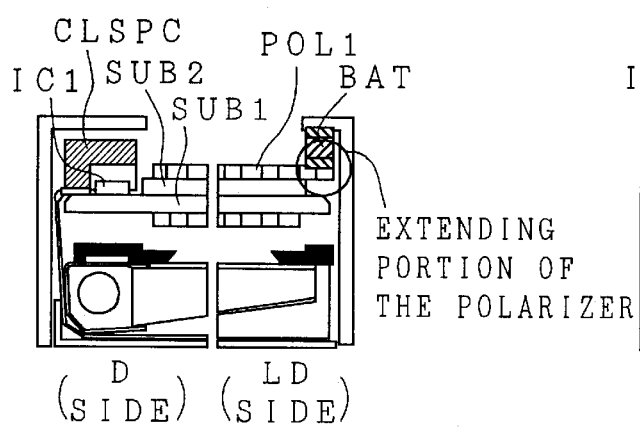
Figure 51B:
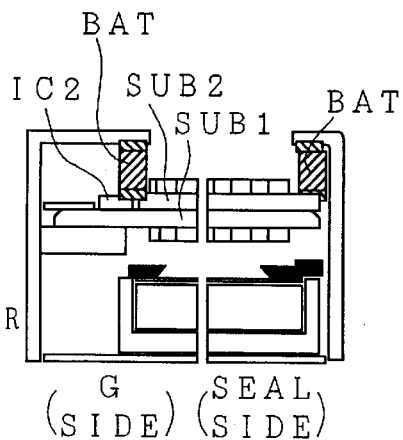

FIGS. 51A and 51B represent an example in which the glass substrates SUB1, SUB2 of the liquid crystal display element PNL are secured to the shield case SHD. Because it incorporates measures against breakage of the glass substrates and the breakage of the drain driver chip described in Embodiment 3 and Embodiment 5, the embodiment of FIG.

51A and FIG. 51B has greater strength than the embodiment shown in FIG. 50A and FIG. 50B. In the embodiment of FIG. 51A and FIG. 51B, the PNL is secured to the SHD with a double-sided adhesive tape BAT at three sides except for the D side and thus the position of the PNL can be kept from being shifted relative to the SHD. Further, as shown in FIG. 51B, the opposing substrate SUB2 is bonded to the SHD with a BAT on the G side to prevent the SHD from butting against and breaking the gate driver chip IC2.

The other constructions of this embodiment not described above are the same as those of the first embodiment.

As described above, this invention can reduce the picture-frame area of the liquid crystal display device not contributing to the image display and realize a liquid crystal display device which is compact but has a large display screen.

What is claimed is:

1. A liquid crystal display device comprising:

a liquid crystal display element;

a backlight for supplying light to the liquid crystal display element; and a case for accommodating the liquid crystal display element and the backlight;

wherein a lamp cable for supplying voltage to the backlight is formed of a flat cable which is made by laminating a conductive foil and insulating films, and the lamp cable is installed between the backlight and the liquid crystal display element.

2. A liquid crystal display device comprising:

a liquid crystal display element;

a backlight for supplying light to the liquid crystal display element; and a case for accommodating the liquid crystal display element and the backlight;

wherein a lamp cable for supplying voltage to the backlight is formed of a flat cable which is made by laminating a conductive foil and insulating films;

wherein the backlight has a light emitting fluorescent tube and an insulating bushing that covers electrodes at the ends of the fluorescent tube;

wherein the lamp cable is connected to one of the electrodes of the fluorescent tube and bent along the surface of the fluorescent tube;

wherein the bushing covers that portion of the lamp cable which is bent along the surface of the fluorescent tube.

3. A liquid crystal display device comprising:

a liquid crystal display element;

a backlight for supplying light to the liquid crystal display element; and a case for accommodating the liquid crystal display element and the backlight;

wherein a lamp cable for supplying voltage to the backlight is formed of a flat cable which is made by laminating a conductive foil and insulating films;

wherein the lamp cable has a terminal connected to an electrode of the fluorescent tube;

wherein the terminal of the lamp cable is connected to one of the electrodes of the fluorescent tube by solder;

wherein the solder is exposed from the terminal of the lamp cable.

* * * * *